US012548914B2

(12) United States Patent
Tai et al.

(10) Patent No.: US 12,548,914 B2
(45) Date of Patent: Feb. 10, 2026

(54) BROADSIDE ANTENNA, ANTENNA IN PACKAGE, AND COMMUNICATION DEVICE

(71) Applicant: Huawei Technologies Co., Ltd., Shenzhen (CN)

(72) Inventors: Chen-Fang Tai, Taipei (CN); Chih-Wei Hsu, Taipei (CN); Chien-Ming Lee, Taipei (CN); Chih Yu Tsai, Taipei (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 57 days.

(21) Appl. No.: 18/573,036

(22) PCT Filed: Jun. 21, 2022

(86) PCT No.: PCT/CN2022/100213
§ 371 (c)(1),
(2) Date: Dec. 21, 2023

(87) PCT Pub. No.: WO2022/268086
PCT Pub. Date: Dec. 29, 2022

(65) Prior Publication Data

US 2024/0222874 A1 Jul. 4, 2024

(30) Foreign Application Priority Data

Jun. 24, 2021 (CN) ......................... 202110707696.1

(51) Int. Cl.
*H01Q 13/10* (2006.01)
*H01Q 1/22* (2006.01)
(Continued)

(52) U.S. Cl.
CPC ............... *H01Q 13/10* (2013.01); *H01Q 1/22* (2013.01); *H01Q 1/36* (2013.01); *H01Q 1/48* (2013.01)

(58) Field of Classification Search
CPC ............ H01Q 13/10; H01Q 1/22; H01Q 1/36; H01Q 1/48; H01Q 21/24; H01Q 21/26; H01Q 25/001
See application file for complete search history.

(56) References Cited

U.S. PATENT DOCUMENTS 6,650,299 B2 * 11/2003 Zhang .................... H01Q 21/26
343/770
8,643,554 B1 * 2/2014 Manry, Jr. .............. H01Q 5/378
343/705
(Continued)

FOREIGN PATENT DOCUMENTS

CN 212434829 U 1/2021

OTHER PUBLICATIONS

Chang Yin Chen et al., "A Novel Dual-Polarized Wideband and Miniaturized Low Profile Magneto-Electric Dipole Antenna Array for mmWave 5G Applications", IEEE Open Journal of Antennas and Propagation, IEEE, vol. 2, Feb. 24, 2021, total 9 pages.

*Primary Examiner* — Hai V Tran
(74) *Attorney, Agent, or Firm* — Slater Matsil, LLP

(57) ABSTRACT

A broadside antenna includes a first radiation element and a second radiation element arranged at an interval, a first grounding element and a second grounding element arranged at an interval, and a first excitation element. A first gap is formed between the first radiation element and the second radiation element. The first excitation element includes a first feeding structure and a first extension stub that are arranged at an interval. The first feeding structure includes a first feed-in part connected to a feed source. The first extension stub is located on a side of the first feeding structure adjacent close to the first feed-in part. The first extension stub includes a first grounding part adjacent to the first feed-in part. The first grounding part is connected to the grounding surface.

20 Claims, 44 Drawing Sheets

(51) Int. Cl.
*H01Q 1/36* (2006.01)
*H01Q 1/48* (2006.01)

(56) References Cited

U.S. PATENT DOCUMENTS

| | | | | |
|---|---|---|---|---|
| 9,705,205 | B2 * | 7/2017 | Liu | H01Q 21/24 |
| 2012/0075155 | A1 * | 3/2012 | Lindmark | H01Q 19/106 343/834 |
| 2019/0044232 | A1 * | 2/2019 | Tseng | H01Q 1/245 |
| 2021/0408672 | A1 * | 12/2021 | Lv | H01Q 1/50 |
| 2022/0320716 | A1 * | 10/2022 | Zhang | H01Q 15/0013 |

* cited by examiner

BROADSIDE ANTENNA, ANTENNA IN PACKAGE, AND COMMUNICATION DEVICE

CROSS-REFERENCE TO RELATED APPLICATIONS

This application is a National Stage of International Application No. PCT/CN2022/100213, filed on Jun. 21, 2022, which claims priority to Chinese Patent Application No. 202110707696.1, filed on Jun. 24, 2021, both of which are hereby incorporated by reference in their entireties.

TECHNICAL FIELD

This application relates to the field of communication technologies, and in particular, to a broadside antenna, an antenna in package, and a communication device.

BACKGROUND

As an apparatus for transmitting and receiving electromagnetic waves, an antenna is an important part of an electronic device. However, an existing broadside antenna has a high profile height and a large volume, which not only increases a load of an electronic device, but also occupies large space of the electronic device, and consequently is not conducive to a smaller, lighter, and thinner design of the electronic device.

SUMMARY

This application provides a broadside antenna, an antenna in package, and a communication device. The broadside antenna has a low profile feature and a small volume, which can effectively reduce a load of an electronic device and reduce space occupied by the broadside antenna in the electronic device.

According to a first aspect, this application provides a broadside antenna, including a first radiation element, a second radiation element, a first grounding element, a second grounding element, and a first excitation element.

The first radiation element and the second radiation element are arranged at an interval in a first direction. A first gap extending in a second direction is formed between the first radiation element and the second radiation element. The second direction is different from the first direction. The first radiation element is provided with a first sub-gap in connection with the first gap. The second radiation element is provided with a second sub-gap in connection with the first gap. Both the first sub-gap and the second sub-gap extend in the first direction.

The first grounding element and the second grounding element are arranged at an interval in the first direction. One end of the first grounding element is connected to a side that is of the first radiation element and that is close to the second radiation element, and the other end is configured to connect to a grounding surface. The second grounding element is connected to a side that is of the second radiation element and that is close to the first radiation element, and the other end is configured to connect to the grounding surface.

The first excitation element includes a first feeding structure and a first extension stub that are arranged at an interval in the first direction. The first feeding structure includes a first feed-in part and a first feeding part. The first feed-in part is connected to a side that is of the first feeding part and that faces the grounding surface. The first feed-in part is located in the first sub-gap and is configured to connect to a feed source. A part of the first feeding part is located in the first gap. A part of the first feeding part is located in the second sub-gap. The first extension stub is located in the first sub-gap. The first extension stub includes a first grounding part close to the first feed-in part. The first grounding part is configured to connect to the grounding surface.

The first excitation element is configured to excite the first radiation element and the second radiation element to generate an electric field in the first direction.

The first feeding structure is in a "Γ" shape.

An end that is of the first feed-in part and that is away from the first feeding part is a first feed-in end, and the first feed-in end is configured to connect to the feed source.

The first grounding part includes a first grounding end close to the first feed-in end, and the first grounding end is configured to connect to the grounding surface.

In an implementation, the first direction is a vertical direction, and the second direction is a horizontal direction. In this case, the first excitation element is configured to excite the first radiation element and the second radiation element to generate an electric field in the vertical direction, so that the broadside antenna generates vertically polarized radiation.

In the first excitation element of the broadside antenna shown in this application, in addition to the first feeding structure connected to the feed source, the first extension stub close to the first feed-in part is further provided. A reflection coefficient of the broadside antenna in a low frequency band is improved by using the first extension stub, and a profile height (clearance height) of the broadside antenna is reduced, so that the broadside antenna has a low profile feature, which helps reduce a volume of the broadside antenna.

In another implementation, the first direction is a horizontal direction, and the second direction is a vertical direction. In this case, the first excitation element is configured to excite the first radiation element and the second radiation element to generate an electric field in the horizontal direction, to generate horizontally polarized radiation.

In an implementation, the first extension stub further includes a first extension part and a second extension part, both the first grounding part and the second extension part are located on a side that is of the first extension part and that faces the grounding surface, the first grounding part is connected to a side that is of the first extension part and that is close to the first feeding structure, and the second extension part is connected to a side that is of the first extension part and that faces away from the first feeding structure.

The first extension stub is in an inverted U shape.

An end that is of the first grounding part and that faces away from the first extension part is the first grounding end.

In an implementation, the first radiation element includes a first radiator and a second radiator that are arranged at an interval in the second direction, the first sub-gap is formed between the first radiator and the second radiator, the second radiation element includes a third radiator and a fourth radiator that are arranged at an interval in the second direction, and the second sub-gap is formed between the third radiator and the fourth radiator.

A third sub-gap extending in the second direction is formed between the first radiator and the third radiator. A fourth sub-gap extending in the second direction is formed between the second radiator and the fourth radiator. The first gap includes the third sub-gap, the fourth sub-gap, and a fifth sub-gap. The fifth sub-gap communicates the third sub-gap and the fourth sub-gap and communicates the first sub-gap and the second sub-gap.

The first sub-gap, the second sub-gap, and the fifth sub-gap form a second gap, and the second gap extends in the first direction. In this case, the first excitation element is located in the second gap. A part of the first feeding part is located in the first sub-gap and is connected to the first feed-in part. A part of the first feeding part is located in the fifth sub-gap, and a part of the first feeding part is located in the second sub-gap.

The broadside antenna further includes a second excitation element, and the second excitation element is located in the first gap. The second excitation element includes a second feeding structure and a second extension stub that are arranged at an interval in the second direction. The second feeding structure includes a second feed-in part and a second feeding part, and the second feed-in part is connected to a side that is of the second feeding part and that faces the connection surface. The second feed-in part is located in the third sub-gap and is configured to connect to the feed source. A part of the second feeding part is located in the third sub-gap and is connected to the second feed-in part. A part of the second feeding part is located in the fifth sub-gap and crosses the first feeding part. A part of the second feeding part is located in the fourth sub-gap. The second extension stub is located in the third sub-gap, the second extension stub includes a second grounding part close to the second feed-in part, and the second grounding part is configured to connect to the grounding surface.

The second excitation element is configured to excite the first radiation element and the second radiation element to generate an electric field in the second direction.

The second feeding structure is in a "Γ" shape.

An end that is of the second feed-in part and that is away from the second feeding part is a second feed-in end, and the second feed-in end is configured to connect to the feed source.

The second grounding part includes a second grounding end close to the second feed-in end, and the second grounding end is configured to connect to the grounding surface.

In an implementation, the first direction is a vertical direction, and the second direction is a horizontal direction. In this case, the second excitation element is configured to excite the first radiation element and the second excitation element to generate an electric field in the horizontal direction, so that the broadside antenna generates horizontally polarized radiation.

In the broadside antenna shown in this implementation, the first excitation element and the second excitation element respectively excite the first radiation element and the second radiation element to generate electric fields in the vertical direction and the horizontal direction, so that the broadside antenna can generate both vertically polarized radiation and horizontally polarized radiation. In this case, the broadside antenna has a dual polarization feature, which helps improve reliability of wireless communication by using the broadside antenna.

In addition, in the second excitation element of the broadside antenna shown in this application, in addition to the second feeding structure connected to the feed source, the second extension stub close to the second feed-in part is further provided. A reflection coefficient of the broadside antenna in a low frequency band is improved by using the second extension stub, and a profile height (clearance height) of the broadside antenna is reduced, so that the broadside antenna has a low profile feature, which helps reduce a volume of the broadside antenna.

In an implementation, the first radiation element includes a first radiator, a second radiator, and a first auxiliary radiator. The first radiator and the second radiator are arranged at an interval in the second direction. The first auxiliary radiator is connected between the first radiator and the second radiator. The first radiator, the second radiator, and the first radiator form the first sub-gap.

The second radiation element includes a third radiator, a fourth radiator, and a second auxiliary radiator. The third radiator and the fourth radiator are arranged at an interval in the second direction. The second auxiliary radiator is connected between the third radiator and the fourth radiator. The third radiator, the fourth radiator, and the second auxiliary radiator form the second sub-gap.

In the broadside antenna shown in this application, the first excitation element is configured to excite the first radiation element and the second radiation element to generate an electric field in the first direction, so that the broadside antenna generates single-polarized radiation. In this case, the broadside antenna has a single polarization feature.

In an implementation, the second extension stub further includes a third extension part and a fourth extension part. Both the second grounding part and the fourth extension part are located on a side that is of the third extension part and that faces the grounding surface. The second grounding part is connected to a side that is of the third extension part and that is close to the second feeding structure. The fourth extension part is connected to a side that is of the third extension part and that faces away from the second feeding structure.

The first extension stub is in an inverted U shape.

An end that is of the second grounding part and that faces away from the third extension part is the second grounding end.

In an implementation, the first radiator, the second radiator, the third radiator, and the fourth radiator are of a same structure, to improve impedance matching of the broadside antenna and improve bandwidth of the broadside antenna.

In an implementation, the first radiator, the second radiator, the third radiator, and the fourth radiator are arranged in a four-leaf clover shape.

In an implementation, a width of the first sub-gap gradually increases in a direction from an inner side to an outer side of the first sub-gap.

A width of the second sub-gap gradually increases in a direction from an inner side to an outer side of the second sub-gap.

A width of the third sub-gap gradually increases in a direction from an inner side to an outer side of the third sub-gap.

A width of the fourth sub-gap gradually increases in a direction from an inner side to an outer side of the fourth sub-gap.

In the broadside antenna shown in this implementation, the width of each sub-gap gradually increases in the direction from the inner side to the outer side of each sub-gap, which helps improve impedance matching of the broadside antenna and improve bandwidth of the broadside antenna.

In an implementation, the first grounding element includes a first grounding stub and a second grounding stub that are arranged at an interval in the second direction. One end of the first grounding stub is connected to a side that is of the first radiator and that is close to the second radiator, and the other end is configured to connect to the grounding surface. One end of the second grounding stub is connected to a side that is of the second radiator and that is close to the first radiator, and the other end is configured to connect to the grounding surface.

The second grounding element includes a third grounding stub and a fourth grounding stub that are arranged at an interval in the second direction. One end of the third grounding stub is connected to a side that is of the third radiator and that is close to the fourth radiator, and the other end is configured to connect to the grounding surface. The fourth grounding stub is connected to a side that is of the fourth radiator and that is close to the third radiator, and the other end is configured to connect to the grounding surface.

In an implementation, the first grounding stub, the second grounding stub, the third grounding stub, and the fourth grounding stub are of a same structure, to improve impedance matching of the broadside antenna and improve bandwidth of the broadside antenna.

In an implementation, the first grounding stub, the second grounding stub, the third grounding stub, and the fourth grounding stub are arranged in a rectangular or square shape. The first grounding stub, the second grounding stub, the third grounding stub, and the fourth grounding stub may alternatively be arranged in an approximately rectangular or square shape.

In an implementation, the first grounding stub includes a first part, a second part, and a third part that are sequentially connected, the first part is located on a side that is of the second part and that is away from the grounding surface, an end that is of the first part and that is away from the second part is connected to the first radiator, the third part is located on a side that is of the second part and that is close to the grounding surface, an end that is of the third part and that is away from the second part is configured to connect to the grounding surface, and the first part is misaligned with the third part in a third direction, to improve impedance matching of the broadside antenna and improve bandwidth of the broadside antenna.

The third direction is different from the first direction and the second direction.

For example, the third direction is vertical to the grounding surface. In this case, that the first part is misaligned with the third part in the third direction means that projections of the first part and the third part on the grounding surface do not completely overlap.

In an implementation, the broadside antenna has an electric dipole first mode in a first frequency band, a wavelength corresponding to the first frequency band is $\lambda_1$, and a profile height of the broadside antenna is between $0.1\lambda_1$ and $0.2\lambda_1$.

For example, the profile height of the broadside antenna is $0.12\lambda_1$.

A sum of lengths of the first grounding part, the first extension part, and the second extension part of the first extension stub is between $0.3\lambda_1$ and $0.4\lambda_1$.

A sum of lengths of the second grounding part, the third extension part, and the fourth extension part of the second extension stub is between $0.3\lambda_1$ and $0.4\lambda_1$.

In an implementation, the broadside antenna has a magnetic dipole first mode in a second frequency band, and a minimum frequency in the second frequency band is higher than a maximum frequency in the first frequency band.

In an implementation, the broadside antenna has an electric dipole second mode in a third frequency band, and a minimum frequency in the third frequency band is higher than a maximum frequency in the second frequency band.

In an implementation, a wavelength corresponding to the third frequency band is $\lambda_3$, the first radiator is heart-shaped, the first radiator has two inner edges and two outer edges, both the inner edges and the outer edges are elliptical arcs, and lengths of both the inner edges and the outer edges are between $0.2\lambda_3$ and $0.3\lambda_3$.

For example, the lengths of both the inner edges and the outer edges are $0.25\lambda_3$.

In an implementation, a working frequency band of the broadside antenna supports at least one of bands n257, n258, n259, n260, and n261.

For example, the working frequency band of the broadside antenna is 24.5 GHz to 43.5 GHz, and the working frequency band of the broadside antenna supports a 5G millimeter wave full band. In the electric dipole first mode, a frequency is 21 GHz. In the magnetic dipole first mode, a frequency is 29.5 GHz. In the electric dipole second mode, a frequency is 40 GHz.

According to a second aspect, this application provides an antenna in package, including a transmitter and/or receiver chip and the broadside antenna above. The transmitter and/or receiver chip is configured to send an electromagnetic wave signal to the broadside antenna or receive an external electromagnetic wave signal received by the broadside antenna.

The broadside antenna shown in this application has a low profile feature and a small volume, which helps reduce a volume of the antenna in package and implement a miniaturization design of the antenna in package.

In an implementation, the antenna in package further includes a substrate, and the broadside antenna is embedded inside the substrate to reuse a volume of the substrate, which further reduces the volume of the antenna in package, and implements the miniaturization design of the antenna in package.

In an implementation, the antenna in package further includes a substrate, and the broadside antenna is mounted on the substrate.

In an implementation, the broadside antenna and the substrate are formed by using a same process, to simplify a manufacturing process of the antenna in package.

According to a third aspect, this application provides a communication device, including a housing and the antenna in package. The antenna in package is located on an inner side of the housing.

The broadside antenna shown in this application has a low profile feature and a small volume, which helps reduce a volume of the antenna in package, effectively reduce a load of an electronic device, and reduce space occupied by the broadside antenna in the electronic device.

In an implementation, an antenna aperture of the broadside antenna faces the housing, and the broadside antenna may transmit an electromagnetic wave signal through the housing or receive an electromagnetic wave signal through the housing.

In an implementation, the communication device further includes a display, the display is mounted on the housing, an antenna aperture of the broadside antenna faces the display, and the broadside antenna may transmit an electromagnetic wave signal through the display or receive an electromagnetic wave signal through the display.

BRIEF DESCRIPTION OF THE DRAWINGS

To describe technical solutions in embodiments of this application or in the background more clearly, the following describes accompanying drawings used in embodiments of this application or in the background.

DETAILED DESCRIPTION OF THE EMBODIMENTS

The following describes embodiments of this application with reference to the accompanying drawings in embodiments of this application.

Figure 1:
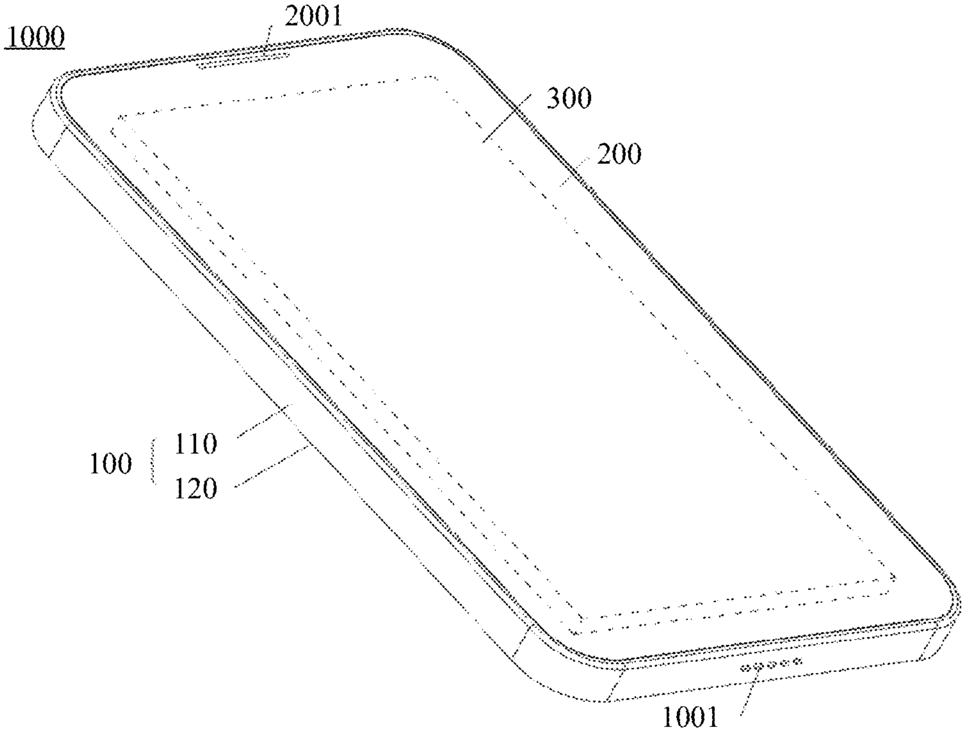
FIG. 1 is a schematic diagram of a structure of a communication device according to an embodiment of this application.

FIG. 1 is a schematic diagram of a structure of a communication device 1000 according to an embodiment of this application.

The communication device 1000 may be an electronic product that has a wireless communication function, such as a handheld device, an on-board device, a wearable device, a computer device, a wireless local area network (wireless local area network, WLAN) device, or a router. In some application scenarios, the communication device 1000 may also be called different names, such as user equipment, an access terminal, a subscriber unit, a subscriber station, a mobile station, a remote station, a remote terminal, a mobile device, a user terminal, a wireless communication device, a user agent or user apparatus, a cellular phone, a wireless phone, a session initiation protocol (session initiation protocol, SIP) phone, a wireless local loop (wireless local loop, WLL) station, personal digital processing (personal digital assistant, PDA), or a terminal device in a 5G network or a future evolved network.

In some embodiments, the communication device 1000 may alternatively be a device that is deployed in a radio access network and that is for providing a wireless communication function, including but not limited to a base station, a relay station, an access point, an on-board device, a wireless-fidelity (wireless-fidelity, Wi-Fi) station, a wireless backhaul node, a small cell, a micro base station, and the like. The base station may be a base transceiver station (base transceiver station, BTS), a NodeB (NodeB, NB), an evolved NodeB (evolved NodeB, eNB or eNodeB), a transmission node or a transmission reception point (transmission reception point, TRP or TP) in an NR (new radio) system or a next generation NodeB (generation NodeB, gNB), or a base station or a network device in a future communication network. This embodiment of this application is described by using an example in which the communication device 1000 is a mobile phone.

The communication device 1000 includes a housing 100, a display module 200, a circuit board 300, a receiver (not shown in the figure), and a speaker (not shown in the figure). The display module 200 is mounted on the housing 100, and the circuit board 300, the receiver, and the speaker are all mounted on an inner side of the housing 100.

The housing 100 may include a frame 110 and a rear cover 120, and the rear cover 120 is fixed on one side of the frame 110. The frame 110 and the rear cover 120 may be of an integrally formed structure, to ensure structural stability of the housing 100. Alternatively, the frame 110 and the rear cover 120 may be fixed on each other in an assembly manner. The housing 100 is provided with a speaker hole 1001, and there may be one or more speaker holes 1001. For example, there are a plurality of speaker holes 1001, and the plurality of speaker holes 1001 are provided on the frame 110. The speaker hole 1001 communicates an inner side of the housing 100 and an outer side of the housing 100. It should be noted that the "hole" described in embodiments of this application is a hole having a complete hole wall, and descriptions of the "hole" are the same in the following.

The display module 200 is fixed on the other side of the frame 110. The display module 200 and the rear cover 120 are respectively fixed on both sides of the frame 110. When a user uses the communication device 1000, the display module 200 is placed facing the user, and the rear cover 120 is placed facing away from the user. The display module 200 is provided with a receiver hole 2001, and the receiver hole 2001 is a through hole that runs through the display module 200.

In some other embodiments, the receiver hole 2001 may be formed between an edge of the display module 200 and the housing 100. For example, the receiver hole 2001 is formed between the display module 200 and a top edge of the frame 1001 of the housing 100. Alternatively, in some other embodiments, the housing 100 is provided with the receiver hole 2001. For example, the receiver hole 2001 is formed on a top region of the frame 110 of the housing 100. It should be understood that a specific formed structure and position of the receiver hole 2001 are not strictly limited in this application.

The circuit board 300 is located between the rear cover 120 and the display module 200. The circuit board 300 may be a mainboard (mainboard) of the communication device 1000. The receiver is located at a top of the communication device 1000. Sound emitted by the receiver is transmitted to an outside of the communication device 1000 through the receiver hole 2001, to implement a sound playing function of the communication device 1000. The speaker is located at a bottom of the communication device 1000. Sound emitted by the speaker can be transmitted to the outside of the communication device 1000 through the speaker hole 1001, to implement a sound playing function of the communication device 1000.

It should be understood that, when the communication device 1000 is described in this embodiment of this application, orientation terms such as "top" and "bottom" are used for description mainly based on a position in which a user holds the communication device 1000. A position facing a top side of the communication device 1000 is described as "top", and a position facing a bottom side of the communication device 1000 is described as "bottom". It does not indicate or imply that an apparatus or element needs to have a specific orientation and be constructed and operated in a specific orientation. Therefore, it cannot be understood as a limitation on the orientation of the communication device 1000 in actual application scenarios.

Figure 2:
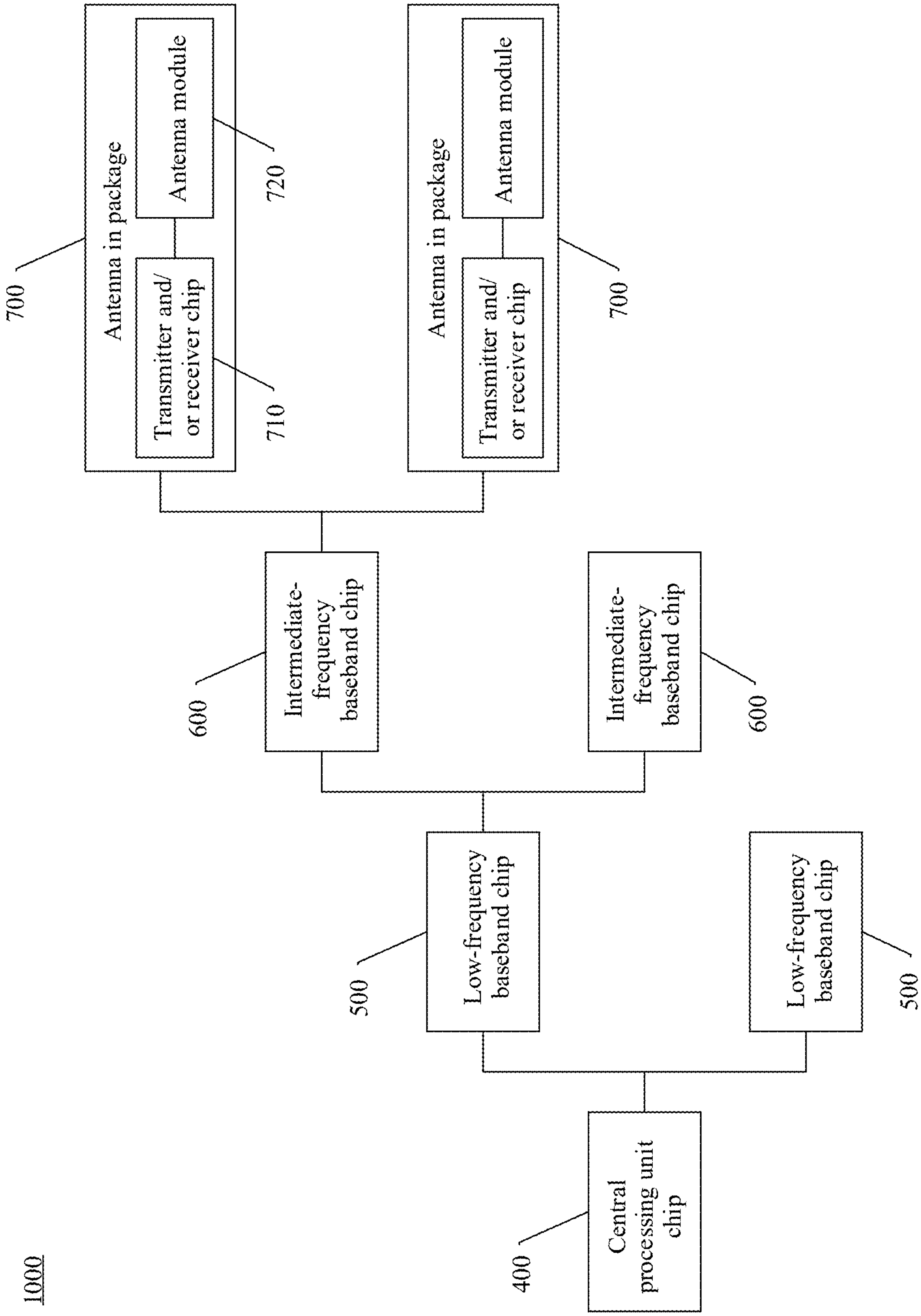
FIG. 2 is a schematic diagram of a partial structure of the communication device shown in FIG. 1.

FIG. 2 is a schematic diagram of a partial structure of the communication device 1000 shown in FIG. 1.

The communication device 1000 further includes a central processing unit (central processing unit, CPU) chip 400, a low-frequency baseband chip 500, an intermediate-frequency baseband chip 600, and an antenna in package (also referred to as a substrate antenna, antenna-in-package, AIP) 700. The central processing unit chip 400, the low-frequency baseband chip 500, the intermediate-frequency baseband chip 600, and the antenna in package 700 are all mounted on an inner side of the housing 100. The central processing unit chip 400, the low-frequency baseband chip 500, the intermediate-frequency baseband chip 600, and the antenna in package 700 may all be mounted on the circuit board 300. Alternatively, the central processing unit chip 400 may be mounted on the circuit board 300, and the low-frequency baseband chip 500, the intermediate-frequency baseband chip 600, and the antenna in package 700 may be mounted on a connection board (not shown in the figure). The connection board is electrically connected to the circuit board 300, and the connection board may be a rigid circuit board or a flexible circuit board. There are two low-frequency baseband chips 500, and the two low-frequency baseband chips 500 may be electrically connected to the central processing unit chip 400. There are two intermediate-frequency baseband chips 600, and the two intermediate-frequency baseband chips 600 may be electrically connected to one low-frequency baseband chip 500. There are two antennas in package 700, and the two antennas in package 700 may be electrically connected to one intermediate-frequency baseband chip 600.

In some other embodiments, there may be one or three or more low-frequency baseband chips 500, and/or there may be one or three or more intermediate-frequency baseband chips 600, and/or there may be one or three or more antennas in package 700, and/or the low-frequency baseband chip 500 and the intermediate-frequency baseband chip 600 are integrated into one chip. It should be noted that in this embodiment of this application, "A and/or B" includes three cases: "A", "B", and "A and B". Related descriptions in the following may be understood in a same way.

The antenna in package 700 includes a transmitter and/or receiver (transmitter and/or receiver, T/R) chip 710 and an antenna module (antenna-in-module) 720, and the transmitter and/or receiver chip 710 is electrically connected to the antenna module 720. The transmitter and/or receiver chip 710 is configured to send an electromagnetic wave signal to the antenna module 720 and/or receive an electromagnetic wave signal from the antenna module 720. The antenna module 720 is configured to radiate an electromagnetic wave based on a received electromagnetic signal, and/or send an electromagnetic signal to the transmitter and/or receiver chip 710 based on a received electromagnetic wave, to implement wireless communication of the communication device 1000. The transmitter and/or receiver chip 710 is a millimeter wave (millimeter wave, mmW) transmitter and/or receiver chip. In this case, the communication device 1000 is a mobile phone having a millimeter wave function, and the communication device 1000 may work in a millimeter wave frequency band. In some other embodiments, the transmitter and/or receiver chip 710 may alternatively be another radio frequency module (radio frequency module, AF module) that can transmit and/or receive a radio frequency signal.

Figure 3:
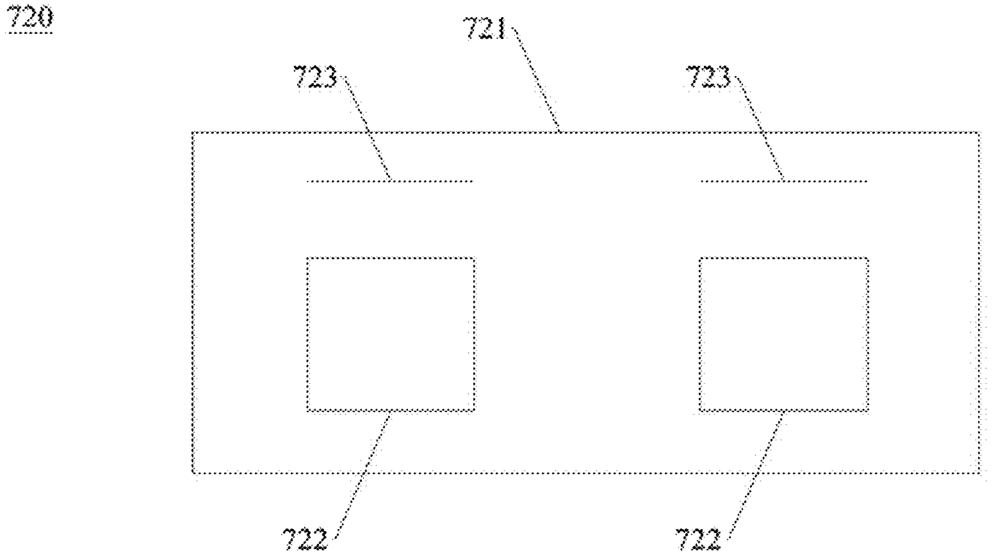
FIG. 3 is a schematic diagram of a structure of an antenna module of an antenna in package in the communication device shown in FIG. 2 in an implementation.

FIG. 3 is a schematic diagram of a structure of the antenna module 720 of the antenna in package 700 in the communication device 1000 shown in FIG. 2 in an implementation.

The antenna module 720 includes a substrate 721, a broadside antenna (broadside antenna, BR Antenna) 722, and an end-fire antenna (end-fire antenna, EF Antenna) 723. Both the broadside antenna 722 and the end-fire antenna 723 are embedded inside the substrate 721. The substrate 721 may be a circuit board (which may be a flexible circuit board or a rigid circuit board). The broadside antenna may also be referred to as a vertical antenna or a wide-side antenna. The broadside antenna 722 and the end-fire antenna 723 may be formed by using a same process as the substrate 721, to simplify a forming process of the antenna module 720. For example, the antenna module 720 may be formed by using a flexible soft-board process such as a liquid crystal polymer (liquid crystal polymer, LCP) or heterogeneous polyimide (modified PI), or may be formed by using a hard-board process such as a multi-layer laminated (laminate) circuit board, or may be formed by using a packaging process such as fan-out wafer level package (fan-out wafer level package) or low temperature co-fired ceramic (low temperature co-fired ceramic, LTCC).

It should be understood that a main radiation direction of the broadside antenna 722 is a first radiation direction, a main radiation direction of the end-fire antenna 723 is a second radiation direction, and the first radiation direction is different from the second radiation direction. For example, the first radiation direction is a direction vertical to the substrate 721, and the second radiation direction is a direction parallel to the substrate 721. In some other embodiments, the broadside antenna 722 and the end-fire antenna 723 may alternatively be mounted on the substrate 721, or mounted on a support disposed on the substrate 721.

It should be noted that, qualifiers related to a relative position relationship, such as parallel and vertical, mentioned in embodiments of this application are all for a current process level, but are not absolute and strict definitions in a mathematical sense, which allows a small deviation, and may be approximately parallel and approximately vertical. For example, that A and B are parallel means that A and B are parallel or approximately parallel, which allows an included angle of 0 degrees to 10 degrees between A and B. For example, that A is vertical to B means that A is vertical to or approximately vertical to B, which allows an included angle of 80 degrees to 100 degrees between A and B.

There are two broadside antennas 722, and the two broadside antennas 722 are arranged at an interval on an extension surface of the substrate 721. A main radiation direction of the broadside antenna 722 is a first radiation direction. The broadside antenna 722 radiates outward from the substrate 721 in the first radiation direction. For example, the first radiation direction is a direction vertical to the substrate 721. The main radiation direction of the broadside antenna 722 is a direction vertical to the substrate 721, and an antenna aperture (not marked in the figure) of the broadside antenna 722 is vertical to a thickness direction of the substrate 721. In this case, the broadside antenna 722 is configured to transmit and/or receive a millimeter wave signal vertical to the substrate 721. Each broadside antenna 722 may have a dual polarization feature, and each broadside antenna 722 may have both a first polarization feature and a second polarization feature. A direction of the first polarization is different from a direction of the second polarization, to implement polarization diversity (polarization diversity) of the antenna module 720, which helps improve transmission throughput and signal stability of a weak-signal region, thereby meeting a 5G signal transmission requirement. For example, the first polarization is vertical polarization, and the second polarization is horizontal polarization. In this case, each broadside antenna 722 may have both a vertical polarization feature and a horizontal polarization feature. It should be understood that, in electromagnetics and antenna theories, an antenna aperture is also referred to as an antenna aperture or an effective radiation aperture, and is a measure of an effective degree of power of electromagnetic radiation (for example, a radio wave) received by an antenna.

In some other implementations, one broadside antenna 722 may have both a first polarization feature and a second polarization feature, for example, a vertical polarization feature and a horizontal polarization feature, and the other broadside antenna 722 may have a first polarization feature or a second polarization feature, for example, a vertical polarization feature or a horizontal polarization feature. It may be understood that there may be one or three or more broadside antennas 722. A quantity of broadside antennas 722 is not specifically limited in this application.

There are two end-fire antennas 723, and the two end-fire antennas 723 are arranged at an interval on an extension surface of the substrate 721. A main radiation direction of the end-fire antenna 723 is a second radiation direction, and the end-fire antenna 723 radiates outward from the substrate 721 in the second radiation direction. The second radiation direction is different from the first radiation direction. For example, the second radiation direction is a direction parallel to the substrate 721. The main radiation direction of the end-fire antenna 723 is a direction parallel to the substrate 721, and an antenna aperture (not marked in the figure) of the end-fire antenna 723 is parallel to a thickness direction of the substrate 721. In this case, the end-fire antenna 723 is configured to transmit and/or receive a millimeter wave signal parallel to the substrate 721. Each end-fire antenna 723 may be an end-fire antenna described in the following embodiments. Each end-fire antenna 723 may have a dual polarization feature, and each end-fire antenna 723 may have both a first polarization feature and a second polarization feature. A direction of the first polarization is different from a direction of the second polarization, to implement polarization diversity of the antenna module 720, which helps improve transmission throughput and signal stability of a weak-signal region, thereby meeting a 5G signal transmission requirement. For example, the first polarization is vertical polarization, and the second polarization is horizontal polarization. In this case, each end-fire antenna 723 may have both a vertical polarization feature and a horizontal polarization feature.

In some other implementations, both the two end-fire antennas 723 may have a first polarization feature, for example, a vertical polarization feature; or both the two end-fire antennas 723 may have a second polarization feature, for example, a horizontal polarization feature; or one end-fire antenna 723 has a first polarization feature, for example, a vertical polarization feature, and the other end-fire antenna 723 has a second polarization feature, for example, a horizontal polarization feature; or one end-fire antenna 723 has both the first polarization feature and the second polarization feature, for example, a vertical polarization feature and a horizontal polarization feature, and the other end-fire antenna 723 has a first polarization feature or a second polarization feature, for example, a vertical polarization feature or a horizontal polarization feature. It may be understood that there may be one or three or more end-fire antennas 723. A quantity of end-fire antennas 723 is not specifically limited in this application.

Figure 4:
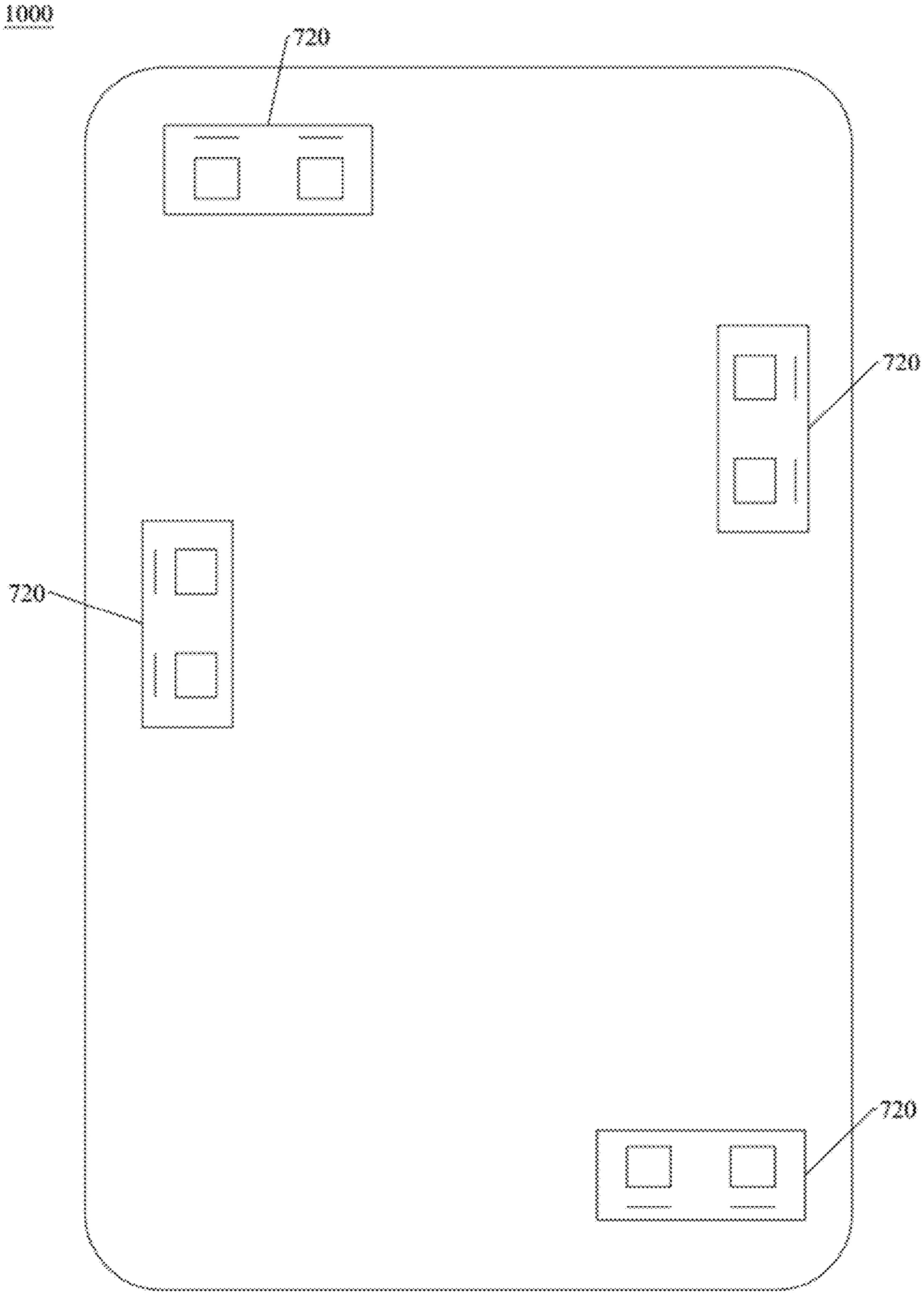
FIG. 4 is a schematic diagram of a planar structure of the communication device shown in FIG. 1 in an implementation.

FIG. 4 is a schematic diagram of a planar structure of the communication device 1000 shown in FIG. 1 in an implementation. The communication device 1000 shown in FIG. 4 includes the antenna module 720 shown in FIG. 3.

In this implementation, the communication device 1000 includes four antenna modules 720. Specifically, one antenna module 720 is disposed at a top of the communication device 1000, for example, near a top inner edge of the communication device 1000; one antenna module 720 is disposed on a left side of the communication device 1000, for example, near a left inner edge of the communication device 1000; one antenna module 720 is disposed at a bottom of the communication device 1000, for example, near a bottom inner edge of the communication device 1000; and one antenna module 720 is disposed on a right side of the communication device 1000, for example, near a right inner edge of the communication device 1000. In an embodiment, "near an inner edge" may be within a range of 0.2 mm to 1 mm from the inner edge. In some other implementations, the communication device 1000 may alternatively include one, two, three, five or more antenna modules 720. A quantity of antenna modules 720 is not specifically limited in this application.

It should be understood that, when the communication device 1000 is described in this embodiment of this application, orientation terms such as "top", "bottom", "left", and "right" are used for description mainly based on a position in which a user holds the communication device 1000. A position facing a top side of the communication device 1000 is described as "top", a position facing a bottom side of the communication device 1000 is described as "bottom", a position facing a right side of the communication device 1000 is described as "right", and a position facing a left side of the communication device 1000 is described as "left". It does not indicate or imply that an apparatus or element has a specific orientation and is constructed and operated in a specific orientation. Therefore, it cannot be understood as a limitation on the orientation of the communication device 1000 in actual application scenarios.

Figure 5:
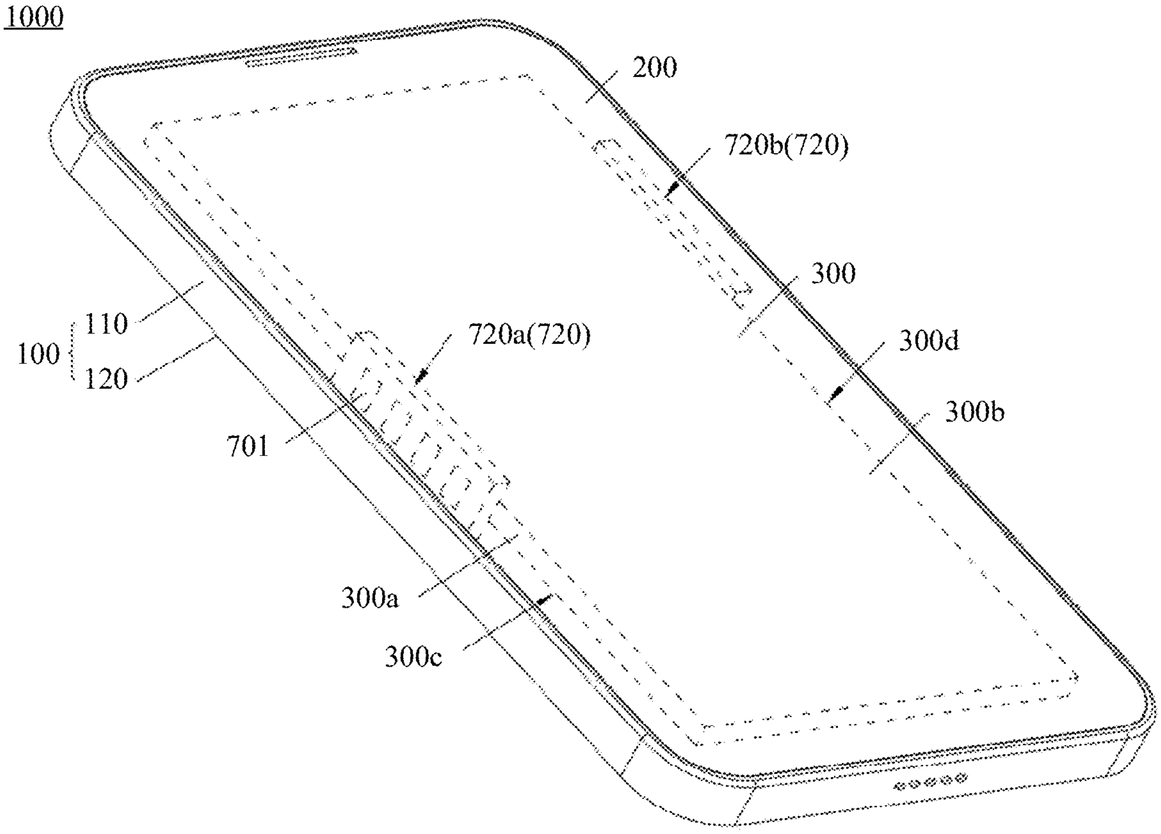
FIG. 5 is a schematic diagram of a structure of the communication device shown in FIG. 1 in another implementation.
Figure 6:
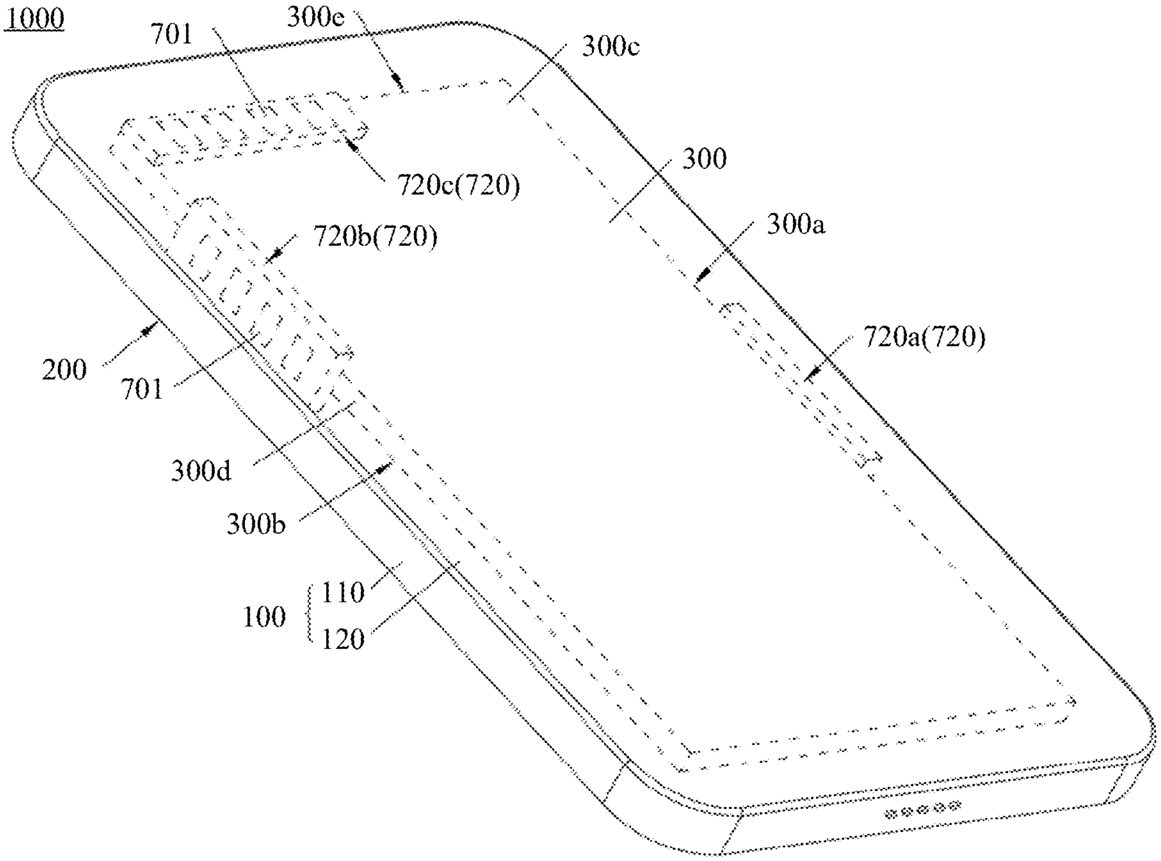
FIG. 6 is a schematic diagram of a structure of the communication device shown in FIG. 5 from another angle.

FIG. 5 is a schematic diagram of a structure of the communication device 1000 shown in FIG. 1 in another implementation, and FIG. 6 is a schematic diagram of a structure of the communication device 1000 shown in FIG. 5 from another angle.

A difference between the communication device 1000 shown in this implementation and the communication device 1000 shown in the foregoing implementation lies in that the communication device 1000 includes three antenna modules 720, and the three antenna modules 720 are all fixedly connected to the circuit board 300. Specifically, one antenna module 720 is fixedly connected to a left side of the circuit board 300, one antenna module 720 is fixedly connected to a right side of the circuit board 300, and one antenna module 720 is fixedly connected to a top side of the circuit board 300.

In some other implementations, the three antenna modules 720 may alternatively be fixedly connected to other positions of the circuit board 300, or one or two or three antenna modules 720 may be integrated with the circuit board 300. In this case, a part of the circuit board 300 forms one or two or three antenna modules 720, or the substrate 721 of one or two or three antenna modules 720 is a part of the circuit board 300, and the antenna module 720 is packaged on the circuit board 300, or the base 721 of one or two or three antenna modules 720 is distributed on an inner side of the housing 100 and is electrically connected to the circuit board 300.

Next, for ease of understanding, the three antenna modules 720 are respectively named a first antenna module 720*a*, a second antenna module 720*b*, and a third antenna module 720*c*, and structures of the three antenna modules 720 are specifically described.

The first antenna module 720*a* is fixedly connected to a left side of the circuit board 300. For example, the first antenna module 720*a* is fixedly connected to a left circumferential surface 300*a* of the circuit board 300, or the first antenna module 720*a* is disposed between the circuit board 300 and the frame 110. In some other implementations, the first antenna module 720*a* may alternatively be fixedly connected to a front surface 300*b* or a back surface 300*c* of the circuit board 300, or the first antenna module 720*a* is disposed between the circuit board 300 and the display module 200 or the rear cover 120.

The first antenna module 720*a* includes four broadside antennas 722 (as shown in FIG. 3). The four broadside antennas 722 of the first antenna module 720*a* are arranged at intervals in a length direction of the substrate 721 (as shown in FIG. 3) of the first antenna module 720*a*. Antenna apertures 701 of the four broadside antennas 722 of the first antenna module 720*a* all face a left side of the frame 110, to transmit and/or receive a millimeter wave signal parallel to the substrate 721 of the first antenna module 720*a*. Each broadside antenna 722 of the first antenna module 720*a* has both a first polarization feature and a second polarization feature. For example, the first polarization is horizontal polarization, and the second polarization is vertical polarization. In this case, each broadside antenna 722 of the first antenna module 720*a* has a dual polarization feature, to implement polarization diversity of the first antenna module 720*a*, which helps improve transmission throughput and signal stability of a weak-signal region, thereby meeting a 5G signal transmission requirement.

The second antenna module 720*b* is fixedly connected to a right side of the circuit board 300. Specifically, the second antenna module 720*b* is fixedly connected to a right circumferential surface 300*d* of the circuit board 300, or the second antenna module 720*b* is disposed between the circuit board 300 and the frame 110. In some other implementations, the second antenna module 720*b* may alternatively be fixedly connected to a front surface 300*b* or a back surface 300*c* of the circuit board 300, or the second antenna module 720*b* is disposed between the circuit board 300 and the display module 200 or the rear cover 120.

The second antenna module 720*b* and the first antenna module 720*a* are of a same structure. The four broadside antennas 722 of the second antenna module 720*b* are arranged at intervals in a length direction of the substrate 721 of the second antenna module 720*b*. Antenna apertures 701 of the four broadside antennas 722 of the second antenna module 720*b* all face a right side of the frame 110, to transmit and/or receive a millimeter wave signal parallel to the substrate 721 of the second antenna module 720*b*. Each broadside antenna 722 of the second antenna module 720*b* has both a first polarization feature and a second polarization feature. For example, the first polarization is horizontal polarization, and the second polarization is vertical polarization. In this case, each broadside antenna 722 of the second antenna module 720*b* has a dual polarization feature, to implement polarization diversity of the second antenna module 720*b*, which helps improve transmission throughput and signal stability of a weak-signal region, thereby meeting a 5G signal transmission requirement.

In an implementation, the frame 110 is made of a non-metal material. The non-metal material does not cause interference on transmission of an electromagnetic wave. In this case, both the broadside antenna 722 of the first antenna module 720*a* and the broadside antenna 722 of the second antenna module 720*b* can normally transmit and/or receive a millimeter wave signal, to ensure normal working of the broadside antenna 722 of the first antenna module 720*a* and the broadside antenna 722 of the second antenna module 720*b*.

In some other implementations, the frame 110 includes a main body part, and a first auxiliary part and a second auxiliary part (not shown in the figure) that are fixedly connected to the main body part. The main body part may be made of a metal material, or may be made of a combination of a metal material and a non-metal material. The main body part may be provided with a first through hole and a second through hole, and both the first through hole and the second through hole run through the main body part along the main body part. Both the first auxiliary part and the second auxiliary part are made of a non-metal material. The first auxiliary part is embedded in the first through hole, and the second auxiliary part is embedded in the second through hole. In other words, the frame 110 may be made of a combination of a metal material and a non-metal material. In this case, the broadside antenna 722 of the first antenna module 720*a* is disposed opposite to the first auxiliary part, and may transmit and/or receive a millimeter wave signal through the first auxiliary part. The broadside antenna 722 of the second antenna module 720*b* is disposed opposite to the second auxiliary part, and may transmit and/or receive a millimeter wave signal through the second auxiliary part.

The third antenna module 720*c* is fixedly connected to a top side of the circuit board 300. Specifically, the third antenna module 720*c* is fixedly connected to a back surface 300*c* of the circuit board 300, or the third antenna module 720*c* is disposed between the circuit board 300 and the rear cover 120. In some other implementations, the third antenna module 720*c* may alternatively be fixedly connected to the front surface 300*b* of the circuit board 300 or a front circumferential surface 300*e* of the circuit board 300, or the third antenna module 720*c* is disposed between the circuit board 300 and the display module 200 or the frame 110.

The third antenna module 720*c* and the first antenna module 720*a* are of a same structure. In other words, the three antenna modules 720 are of the same structure. The four broadside antennas 722 of the third antenna module 720*c* are arranged at intervals in a length direction of the substrate 721 of the third antenna module 720*c*. Antenna apertures 701 of the four broadside antennas 722 of the third antenna module 720*c* all face the rear cover 120, to transmit and/or receive a millimeter wave signal parallel to the substrate 721 of the third antenna module 720*c*. Each broadside antenna 722 of the third antenna module 720*c* has both a first polarization feature and a second polarization feature. For example, the first polarization is vertical polarization, and the second polarization is horizontal polarization. In this case, each broadside antenna 722 of the third antenna module 720*c* has a dual polarization feature, to implement polarization diversity of the third antenna module 720*c*, which helps improve transmission throughput and signal stability of a weak-signal region, thereby meeting a 5G signal transmission requirement.

In an implementation, the rear cover 120 is made of a non-metal material. The non-metal material does not cause interference on transmission of an electromagnetic wave. In this case, the broadside antenna 722 of the third antenna module 720*c* can normally transmit and/or receive a millimeter wave signal, to ensure normal working of the broadside antenna 722 of the third antenna module 720*c*.

In some other implementations, the rear cover 120 includes a main body part and an auxiliary part fixedly connected to the main body part. The main body part may be made of a metal material or may be made of a combination of a metal material and a non-metal material. The main body part may be provided with a through hole, and the through hole may extend in a thickness direction of the main body part or run through the main body part in the thickness direction of the main body part. The auxiliary part is embedded in the through hole, and the auxiliary part is made of a non-metal material. In other words, the rear cover may be made of a combination of a metal material and a non-metal material. In this case, the broadside antenna 722 of the third antenna module 720*c* is disposed opposite to the auxiliary part, and may transmit and/or receive a millimeter wave signal through the auxiliary part.

It may be understood that antenna apertures 701 of the four broadside antennas 722 of the third antenna module 720*c* may all face the display module 300. It may be understood that, as the display module 300 is substantially made of a non-metal material, the display module 300 does not cause interference on transmission of an electromagnetic wave, and therefore the four broadside antennas 722 of the third antenna module 720*c* can normally transmit and/or receive a millimeter wave signal through the display module 300.

Figure 7:
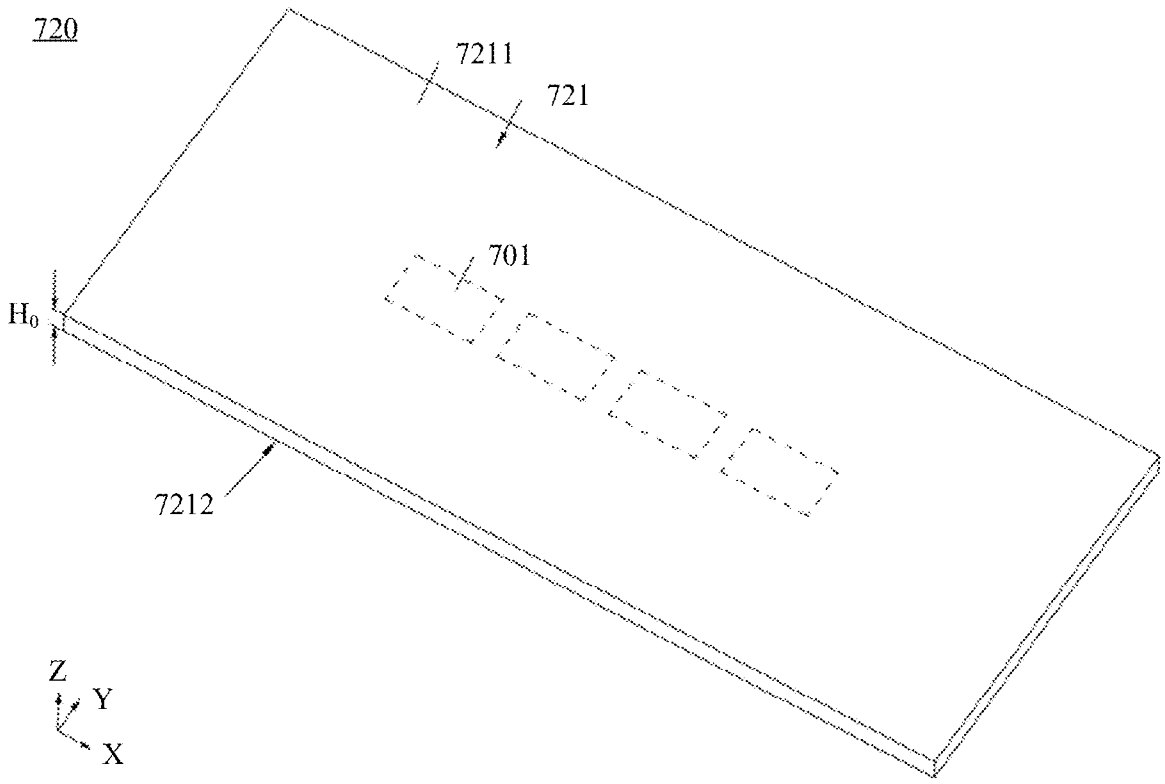
FIG. 7 is a schematic diagram of a structure of an antenna module in the communication device shown in FIG. 5.
Figure 8:
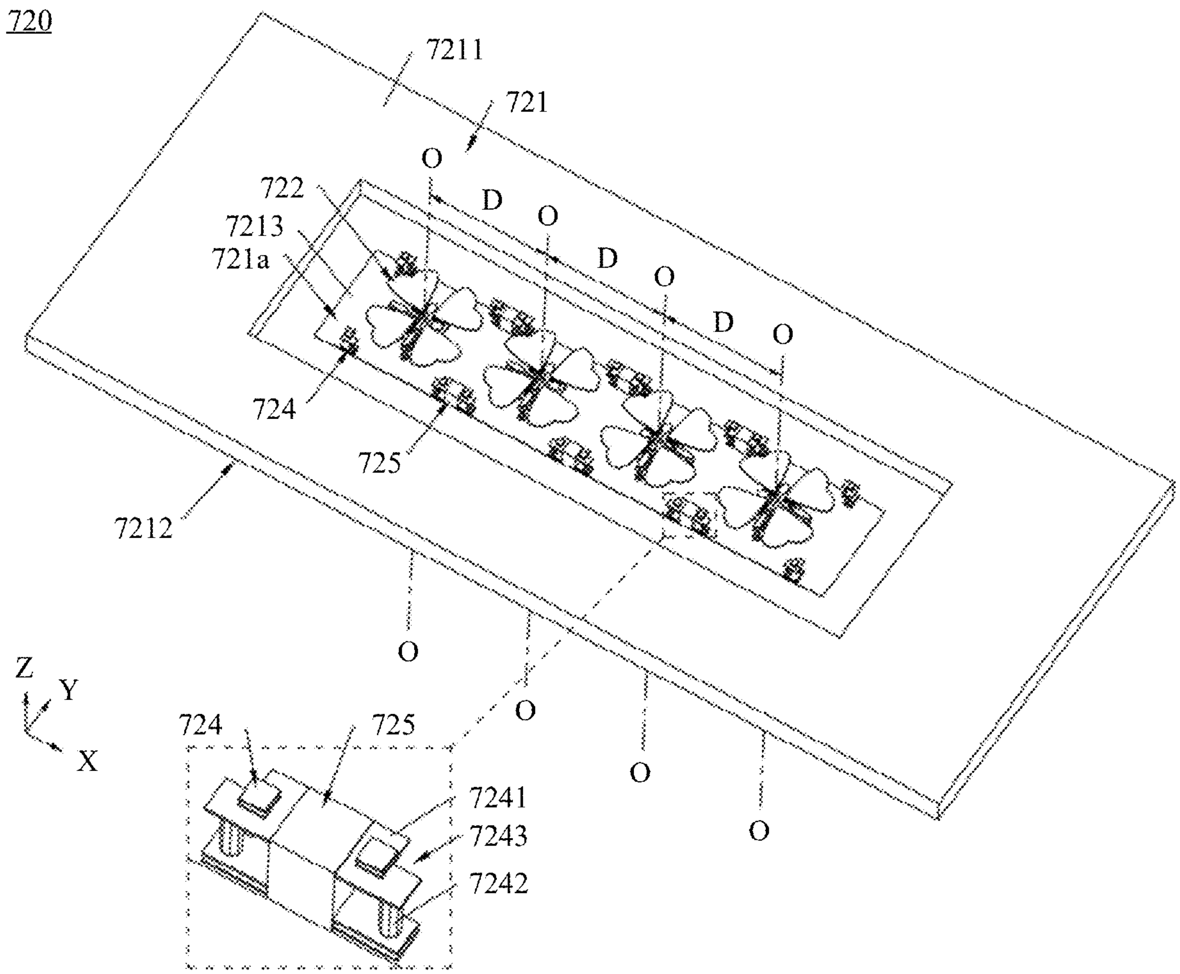
FIG. 8 is a schematic diagram of a partial structure of the antenna module shown in FIG. 7.

FIG. 7 is a schematic diagram of a structure of the antenna module 720 in the communication device 1000 shown in FIG. 5, and FIG. 8 is a schematic diagram of a partial structure of the antenna module 720 shown in FIG. 7. FIG. 8 shows only a part of the substrate 721 of the antenna module 720.

For ease of description below, for example, a length direction of the antenna module 720 in FIG. 7 is defined as an X-axis direction, a width direction of the antenna module 720 is defined as a Y-axis direction, a height direction of the antenna module 720 is defined as a Z-axis direction, and the height direction Z of the antenna module 720 is vertical to the width direction X of the antenna module 720 and the length direction Y of the antenna module 720.

The substrate 721 includes a top surface 7211, a bottom surface 7212, and a grounding surface 7213. The top surface 7211 and the bottom surface 7212 are provided opposite to each other. For example, the top surface 7211 and the bottom surface 7212 are parallel. In an implementation, the substrate 721 includes a grounding layer 721*a*, and the grounding layer 721*a* is located between the top surface 7211 and the bottom surface 7212. For example, the grounding layer 721*a* is parallel to the top surface 7211 and the bottom surface 7212. A side that is of the grounding layer 721*a* and that faces the top surface 7211 is the grounding surface 7213. The grounding surface 7213 is located between the top surface 7211 and the bottom surface 7212. For example, the grounding surface 7213 is provided in parallel with the top surface 7211 and the bottom surface 7212. In an embodiment, the top surface 7211, the bottom surface 7212, and the grounding surface 7213 are all parallel to an X-Y axis plane. In addition, a thickness of the substrate 721 is $H_0$. For example, the thickness $H_0$ of the substrate 721 is between 1 mm and 1.5 mm.

The four broadside antennas 722 are buried inside the substrate 721. In this embodiment, the four broadside antennas 722 are of a same structure. Radiation element groups of the four broadside antennas 722 are spaced from the grounding surface 7213 in the Z-axis direction, and are spaced from each other in the X-axis direction. Specifically, the antenna apertures 701 of the four broadside antennas 722 all face the top surface 7211. The broadside antenna 722 has a center line O-O, and radiation elements of the broadside antenna 722 are rotationally symmetric relative to the center line O-O. A distance D between center lines O-O of two adjacent broadside antennas 722 is large enough to prevent signal interference between the two adjacent broadside antennas 722. D is between 0.4λ and 0.6λ, and X is a wavelength corresponding to a center frequency of a working frequency band of the broadside antenna 722. For example, D is 0.5λ. In this case, the distance D between center lines O-O of two adjacent broadside antennas 722 may be 4.5 mm.

It should be noted that, qualifiers related to a relative position relationship, such as center and symmetric, mentioned in embodiments of this application are all for a current process level, but are not absolute and strict definitions in a mathematical sense, which allows a small deviation, and may be approximately center and approximately symmetric. For example, a center position of A includes a geometric center position of A or a position close to a geometric center of A. That A and B are symmetric relative to C includes two cases: A and B are symmetric relative to C, and A and B are approximately symmetric relative to C.

In addition, the antenna module 720 further includes a grounded parasitic stub 724 and an isolating wall 725, and both the grounded parasitic stub 724 and the isolating wall 725 are buried inside the substrate 721. Both the grounded parasitic stub 724 and the isolating wall 725 are connected to the grounding surface 7213. At least a part of the grounded parasitic stub 724 and at least a part of the isolating wall 725 are spaced from the grounding surface 7213 in the Z-axis direction. The grounded parasitic stub 724 and the isolating wall 725 may be formed by using a same process as the substrate 721, and the grounded parasitic stub 724 and the isolating wall 725 may be formed simultaneously in a manufacturing process of the substrate 721, to simplify a manufacturing process of the antenna module 720.

For example, there are sixteen grounded parasitic stubs 724 and six isolating walls 725. Specifically, every four grounded parasitic stubs 724 are arranged at intervals around one broadside antenna 722. The sixteen grounded parasitic stubs 724 form a first grounded parasitic stub group (not marked in the figure) and a second grounded parasitic stub group (not marked in the figure). The first grounded parasitic stub group and the second grounded parasitic stub group are arranged at an interval in the Y-axis direction. Eight grounded parasitic stubs 724 of the first grounded parasitic stub group and eight grounded parasitic stubs 724 of the second grounded parasitic stub group are all arranged at intervals in the X-axis direction.

The grounded parasitic stub 724 includes a parasitic layer 7241, a first parasitic component 7242, and a second parasitic component (not shown in the figure). There are a plurality of parasitic layers 7241, and the plurality of parasitic layers 7241 are arranged at intervals in the Z-axis direction. The parasitic layer 7241 may be a metal layer made of a metal material such as copper, silver, aluminum, magnesium, or tin. There are a plurality of first parasitic components 7242, and each first parasitic component 7242 is connected between two adjacent parasitic layers 7241, to implement connections between the plurality of parasitic layers 7241. The second parasitic component is connected between the parasitic layer 7241 and the grounding surface 7213, to implement a connection between the grounded parasitic stub 724 and the grounding surface 7213, and implement grounding of the grounded parasitic stub 724.

In addition, the plurality of parasitic layers 7241 include a plurality of first parasitic layers 7241 and a plurality of second parasitic layers 7241, and the plurality of first parasitic layers 7241 are all located on a side that is of the plurality of second parasitic layers 7241 and that faces the top surface 7211. The plurality of first parasitic layers 7241 have a same shape and size. An area of the first parasitic layer 7241 is less than an area of the second parasitic layer 7241. A projection of the first parasitic layer 7241 at the second parasitic layer 7241 is in the second parasitic layer 7241. It should be understood that shapes of the first parasitic layer 7241 and the second parasitic layer 7241 are not limited to the rectangle shown in FIG. 8, and may alternatively be another polygon or special shape.

The plurality of second parasitic layers 7241 have a same shape and size. A notch 7243 is provided at each second parasitic layer 7241, and the notch 7243 runs through the second parasitic layer 7241 in a thickness direction of the second parasitic layer 7241. Specifically, the notch 7243 is provided at an end that is of the second parasitic layer 7241 and that faces the broadside antenna 722, and runs through a circumferential surface of the second parasitic layer 7241, to increase a distance between the grounded parasitic stub 724 and the broadside antenna 722, and prevent the grounded parasitic stub 724 from affecting normal working of the broadside antenna 722. It should be understood that a shape of the notch 7243 is not limited to the rectangle shown in FIG. 8, and may alternatively be another polygon or special shape. In some other embodiments, the notch 7243 may not be provided at the second parasitic layer 7241, provided that the distance between the grounded parasitic stub 724 and the broadside antenna 722 is large enough, and existence of the grounded parasitic stub 724 does not affect working of the broadside antenna 722.

In an implementation, the grounded parasitic stub 724 may be formed by using a same process as the substrate 721, and the grounded parasitic stub 724 may be formed simultaneously in a manufacturing process of the substrate 721, to simplify a manufacturing process of the antenna module 720. Specifically, the substrate 721 is provided with a first parasitic hole and a second parasitic hole (not shown in the figure). There are a plurality of first parasitic holes, and each first parasitic hole communicates two adjacent parasitic layers 7241. The first parasitic hole is a via hole or a buried hole. Each first parasitic component 7242 is located in one first parasitic hole, to connect two adjacent parasitic layers 7241. For example, the first parasitic component 7242 may be a solid metal column formed by filling the first parasitic hole with a metal material, or the first parasitic component 7242 may be a metal layer formed by partially or completely covering a hole wall of the first parasitic hole with a metal material.

The second parasitic hole communicates the parasitic layer 7241 and the grounding surface 7213. The second parasitic hole is a via hole or a buried hole. The second parasitic component is located in the second parasitic hole, to connect the parasitic layer 7241 and the grounding surface 7213. For example, the second parasitic component may be a solid metal column formed by filling the second parasitic hole with a metal material, or the second parasitic component may be a metal layer formed by partially or completely covering a hole wall of the second parasitic hole with a metal material.

The six isolating walls 725 form a first isolating wall group (not marked in the figure) and a second isolating wall group (not marked in the figure). The first isolating wall group and the second isolating wall group are arranged at an interval in the Y-axis direction. Three isolating walls 725 of the first isolating wall group and three isolating walls 725 of the second isolating wall group are all arranged at intervals in the X-axis direction. Specifically, each isolating wall 725 of the first isolating wall group is located between two adjacent broadside antennas 722, and is fixedly connected between two adjacent grounded parasitic stubs 724 in the first grounded parasitic stub group. Each isolating wall 725 of the second isolating wall group is located between two adjacent broadside antennas 722, and is fixedly connected between two adjacent grounded parasitic stubs 724 in the second grounded parasitic stub group. For example, the isolating wall 725 may be made of a metal material such as copper, silver, aluminum, magnesium, or tin.

The grounded parasitic stub 724 and the isolating wall 725 are configured to isolate two adjacent broadside antennas 722, to prevent signal interference between the two adjacent broadside antennas 722, and ensure normal working of the broadside antenna 722 of the antenna module 720. In some other embodiments, a quantity of grounded parasitic stubs 724 in the antenna module 720 may be less than 16 or may be greater than 16, or a quantity of isolating walls 725 in the antenna module 720 may be less than 6 or may be greater than 6. A quantity of grounded parasitic stubs 724 and a quantity of isolating walls 725 in the antenna module 720 are not specifically limited in this application.

Figure 9:
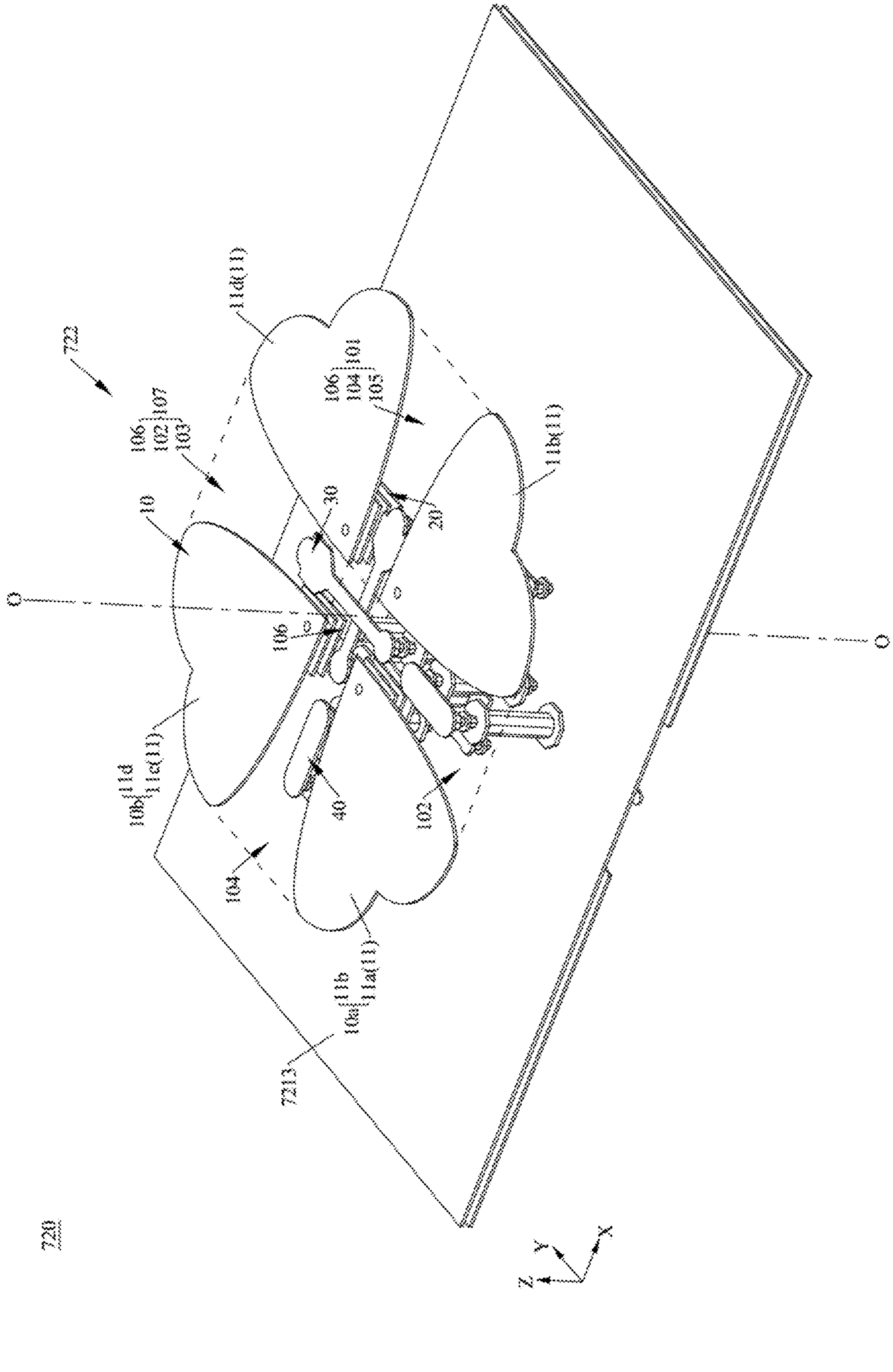
FIG. 9 is a schematic diagram of a partial structure of the antenna module shown in FIG. 8.

FIG. 9 is a schematic diagram of a partial structure of the antenna module 720 shown in FIG. 8. FIG. 9 shows only a part of the substrate 721 and one broadside antenna 722 of the antenna module 720.

The broadside antenna 722 includes a radiation element group 10, a grounding element group 20, a first excitation element 30, and a second excitation element 40. The broadside antenna 722 is a magnetoelectric dipole (magnetoelectric dipole) antenna having a dual polarization feature. The first excitation element 30 is configured to excite the radiation element group 10 to generate an electric field in a first direction, to further excite the broadside antenna 722 to generate first polarized radiation. The second excitation element 40 is configured to excite the radiation element group 10 to generate an electric field in a second direction, to further excite the broadside antenna 722 to generate second polarized radiation. It should be understood that in this embodiment of this application, the first direction is the Y-axis direction, and the second direction is the X-axis direction. For example, the Y-axis direction is a vertical direction, and the X-axis direction is a horizontal direction. In this case, the first polarization is vertical polarization, and the second polarization is horizontal polarization.

The radiation element group 10 is centrosymmetric relative to the center line O-O. The radiation element group 10 includes four radiators 11, and the four radiators 11 are arranged at intervals. The four radiators 11 are respectively a first radiator 11*a*, a second radiator 11*b*, a third radiator 11*c*, and a fourth radiator 11*d*. The first radiator 11*a* and the fourth radiator 11*d* are disposed opposite to each other, and are symmetric relative to the center line O-O. The second radiator 11*b* and the third radiator 11*c* are respectively located on two opposite sides of the first radiator 11*a*, and are symmetric relative to the center line O-O.

In an implementation, the radiation element group 10 includes a first radiation element 10*a* and a second radiation element 10*b*, the first radiation element 10*a* and the second radiation element 10*b* are arranged at an interval in the first direction, and a first gap 101 extending in the second direction is formed between the first radiation element 10*a* and the second radiation element 10*b*. The first radiation element 10*a* is provided with a first sub-gap 102 in connection with the first gap 101, the second radiation element 10*b* is provided with a second sub-gap 103 in connection with the first gap 101, and both the first sub-gap 102 and the second sub-gap 103 extend in the first direction.

The first radiation element 10*a* includes the first radiator 11*a* and the second radiator 11*b* that are arranged at an interval in the second direction, and the first sub-gap 102 is formed between the first radiator 11*a* and the second radiator 11*b*. The second radiation element 10*b* includes the third radiator 11*c* and the fourth radiator 11*d* that are arranged at an interval in the second direction, and the second sub-gap 103 is formed between the third radiator 11*c* and the fourth radiator 11*d*. It should be noted that, the first gap 101 is of a three-dimensional gap structure, and not only includes space between the first radiation element 10*a* and the second radiation element 10*b*, but also includes space on a side that is of the first radiation element 10*a* and the second radiation element 10*b* and that faces the grounding surface 7213 and space on a side that is of the first radiation element 10*a* and the second radiation element 10*b* and that faces away from the grounding surface 7213. The gap mentioned below may be understood in the same way.

In addition, a third sub-gap 104 extending in the second direction is formed between the first radiator 11*a* and the third radiator 11*c*, and a fourth sub-gap 105 is formed between the second radiator 11*b* and the fourth radiator 11*d*. The first gap 101 includes the third sub-gap 104, the fourth sub-gap 105, and a fifth sub-gap 106, and the fifth sub-gap 106 communicates the third sub-gap 104 and the fourth sub-gap 105. In addition, the fifth sub-gap 106 further communicates the first sub-gap 102 and the second sub-gap 103. The first sub-gap 102, the second sub-gap 103, and the fifth sub-gap 106 form a second gap 107 extending in the first direction. The second gap 107 is partially shared with the first gap 101. The second gap 107 and the first gap 101 share the fifth sub-gap 106.

It should be noted that, the second gap 107 is of a three-dimensional gap structure, and not only includes space between the third radiation element 10*c* and the fourth radiation element 10*d*, but also includes space that is of the third radiation element 10*c* and the fourth radiation element 10*d* and that faces the grounding surface 7213 and space that is of the third radiation element 10*c* and the fourth radiation element 10*d* and that faces away from the grounding surface 7213.

In some other embodiments, the first radiation element 10*a* further includes a first auxiliary radiator (not shown in the figure), the first auxiliary radiator is connected between the first radiator 11*a* and the second radiator 11*b*, and the first radiator 11*a*, the second radiator 11*b*, and the first auxiliary radiator form the first sub-gap 102. The second radiation element 10*b* further includes a second auxiliary radiator (not shown in the figure), the second auxiliary radiator is connected between the third radiator 11*c* and the fourth radiator 11*d*, and the third radiator 11*c*, the fourth radiator 11*d*, and the second auxiliary radiator form the second sub-gap 103. In this case, the broadside antenna 722 has only the first excitation element 30, and the first excitation element 30 excites the first radiation element 10*a* and the second radiation element 10*b* to generate an electric field in the first direction, so that the broadside antenna 722 generates single-polarized radiation. In this case, the broadside antenna 722 has only a single polarization feature.

In this embodiment, all the four radiators 11 are metal layers. The four radiators 11 are located on a same plane, and are all parallel to the X-Y axis plane (where a small deviation is allowed). A distance between the radiator 11 and the grounding surface 7213 is H, and a profile height (also referred to as a clearance height) of the broadside antenna 722 is H, where $H<H_0$.

In some implementations, a plurality of metal layers are disposed inside the substrate 721, and the plurality of metal layers are arranged at intervals in the Z-axis direction. One metal layer of the substrate 721 forms the four radiators 11 of the radiation element group 10. In other words, the four radiators 11 of the radiation element group 10 and the metal layer inside the substrate 721 may be formed in a same process, to simplify a manufacturing process of the broadside antenna 722.

Figure 10:
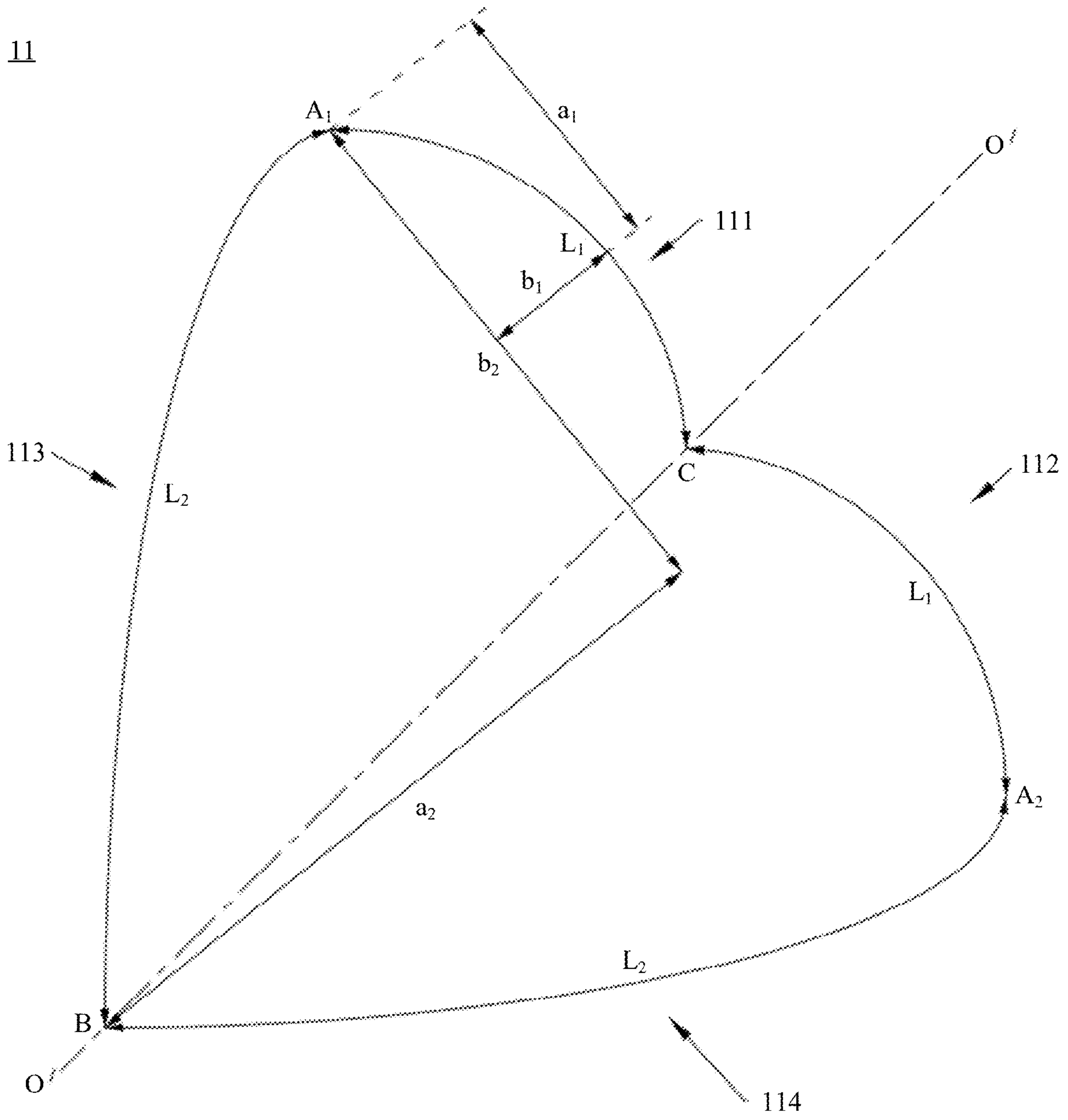
FIG. 10 is a schematic top view of a structure of a radiator in a broadside antenna shown in FIG. 9.

FIG. 10 is a schematic top view of a structure of the radiator 11 in the broadside antenna 722 shown in FIG. 9.

In this embodiment, the four radiators 11 are of a same structure, and the four radiators 11 are arranged in a four-leaf clover shape. Specifically, each radiator 11 is heart-shaped. The radiator 11 has a center line O/–O/, and the radiator 11 is mirror-symmetric relative to the center line O/–O/. The radiator 11 has a first edge point $A_1$, a second edge point $A_2$, a third edge point B, and a fourth edge point C. The third edge point B and the fourth edge point C are both on the center line O/–O/, and the first edge point $A_1$ and the second edge point $A_2$ are mirror-symmetric relative to the center line O/–O/. It should be understood that, the same structure mentioned in embodiments of this application means a same shape and size.

The radiator 11 has two outer edges (11 and 112 shown in FIG. 10) and two inner edges (113 and 114 shown in FIG. 10). It should be noted that the orientation terms "inner" and "outer" mentioned in this embodiment of this application are described based on the orientation shown in the structure in FIG. 9. Being close to the center line O-O is described as "inner", and being away from the center line O-O is described as "outer". The orientation terms "inner" and "outer" mentioned below may be understood in the same way. In this case, the inner edge of the radiator 11 is an edge of the radiator 11 for forming the first gap 101 or the second gap 102. Specifically, the two outer edges of the radiator 11 are respectively a first outer edge 111 and a second outer edge 112, and the two inner edges of the radiator 11 are respectively a first inner edge 113 and a second inner edge 114. The first edge point $A_1$ and the fourth edge point C are respectively two endpoints of the first outer edge 11, and an edge line between the first edge point $A_1$ and the fourth edge point C forms the first outer edge 11. The second edge point $A_1$ and the fourth edge point C are respectively two endpoints of the second outer edge 112, and an edge line between the second edge point $A_1$ and the fourth edge point C forms the second outer edge 112. Both the first outer edge 11 and the second outer edge 112 are elliptical arcs, and are mirror-symmetric relative to the center line O/–O/. For both the first outer edge 11 and the second outer edge 112, a semi-major axis is $a_1$, and a semi-minor axis is $b_1$. Lengths of both the first outer edge 11 and the second outer edge 112 are $L_1$.

The first edge point $A_1$ and the third edge point B are respectively two endpoints of the first inner edge 113, and an edge line between the first edge point $A_1$ and the third edge point B forms the first inner edge 113. The second edge point $A_1$ and the third edge point B are respectively two endpoints of the second inner edge 114, and an edge line between the second edge point $A_1$ and the third edge point B forms the second inner edge 114. Both the first inner edge 113 and the second inner edge 114 are elliptical arcs, and are mirror-symmetric relative to the center line O/–O/. For both the first inner edge 113 and the second inner edge 114, a semi-major axis is $a_2$, and a semi-minor axis is $b_2$. Lengths of both the first inner edge 113 and the second inner edge 114 are $L_2$.

Figure 11:
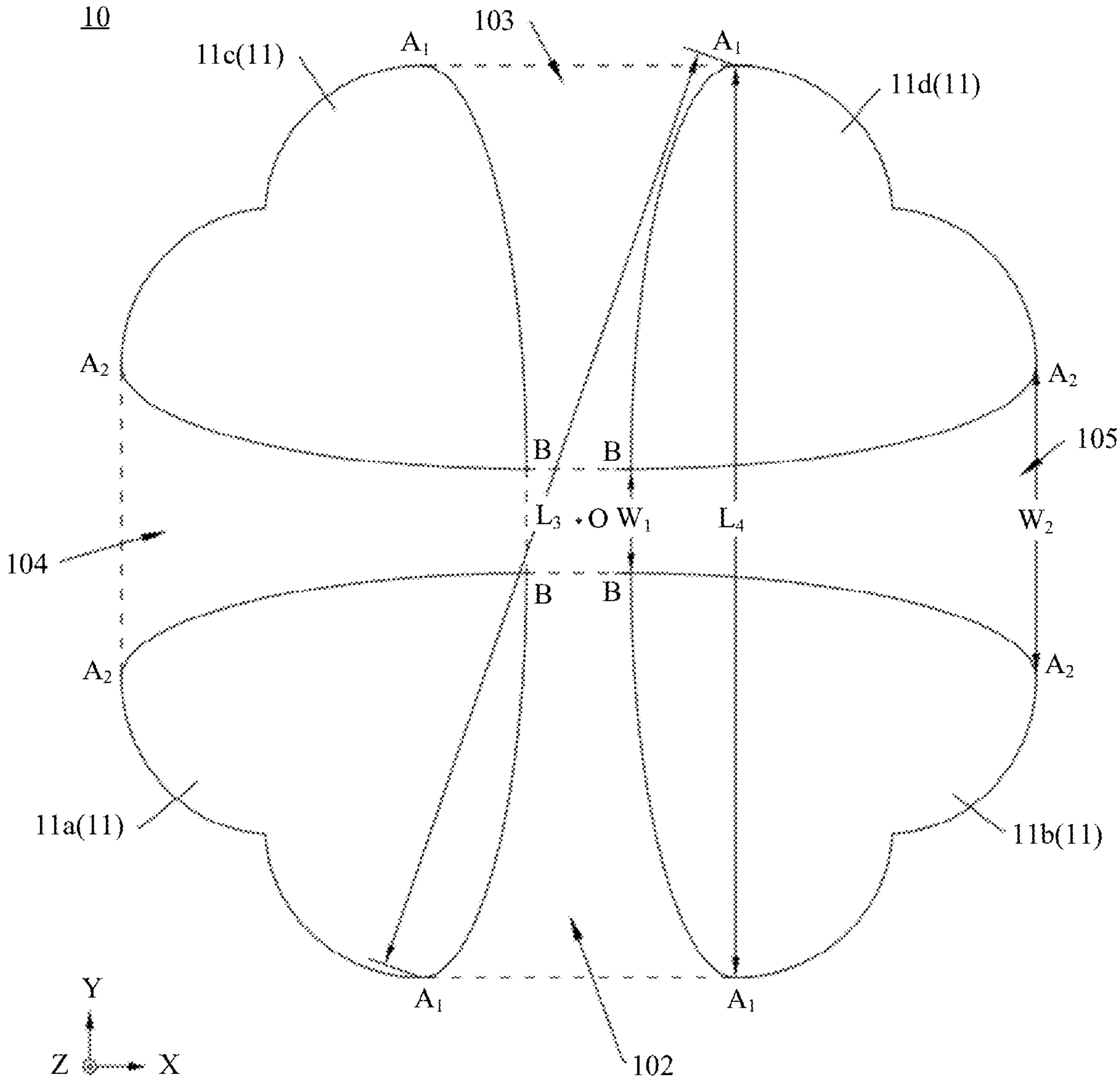
FIG. 11 is a schematic top view of a structure of a radiation element group in the broadside antenna shown in FIG. 9.

FIG. 11 is a schematic top view of a structure of the radiation element group 10 in the broadside antenna 722 shown in FIG. 9.

The radiation element group 10 has four sub-gaps, each sub-gap is between two adjacent radiators 11, and an interval between two adjacent radiators 11 forms a sub-gap. In a direction from an inner side to an outer side of each sub-gap and in a direction from the center line O-O to an edge of the radiation element group 10, a width of each sub-gap gradually increases, to improve impedance matching of the broadside antenna 722 and improve bandwidth of the broadside antenna 722.

The four sub-gaps are respectively the first sub-gap 102, the second sub-gap 103, the third sub-gap 104, and the fourth sub-gap 105. Specifically, the first sub-gap 102 is formed between the first radiator 11*a* and the second radiator 11*b*, the third sub-gap 104 is formed between the first radiator 11*a* and the third radiator 11*c*, the second sub-gap 103 is formed between the third radiator 11*c* and the fourth radiator 11*d*, and the fourth sub-gap 105 is formed between the fourth radiator 11*d* and the second radiator 11*b*.

For example, a distance between a third edge point B of the third radiator 11*c* and a third edge point B of the fourth radiator 11*d* is $W_1$, a distance between a second edge point $A_2$ of the third radiator 11*c* and a second edge point $A_2$ of the fourth radiator 11*d* is $W_2$, and $W_2$ is greater than $W_1$. It should be understood that the first inner edge 113 and the second inner edge 114 of the radiator 11 are not limited to the elliptical arcs shown in the figure, and may alternatively be circular arcs or straight lines. In some other embodiments, in a direction from the center line O-O to an edge of the radiation element group 10, a distance between two adjacent radiators 11 may not change. In this case, $W_2$ is equal to $W_1$. This is not specifically limited in this application.

Figure 12:
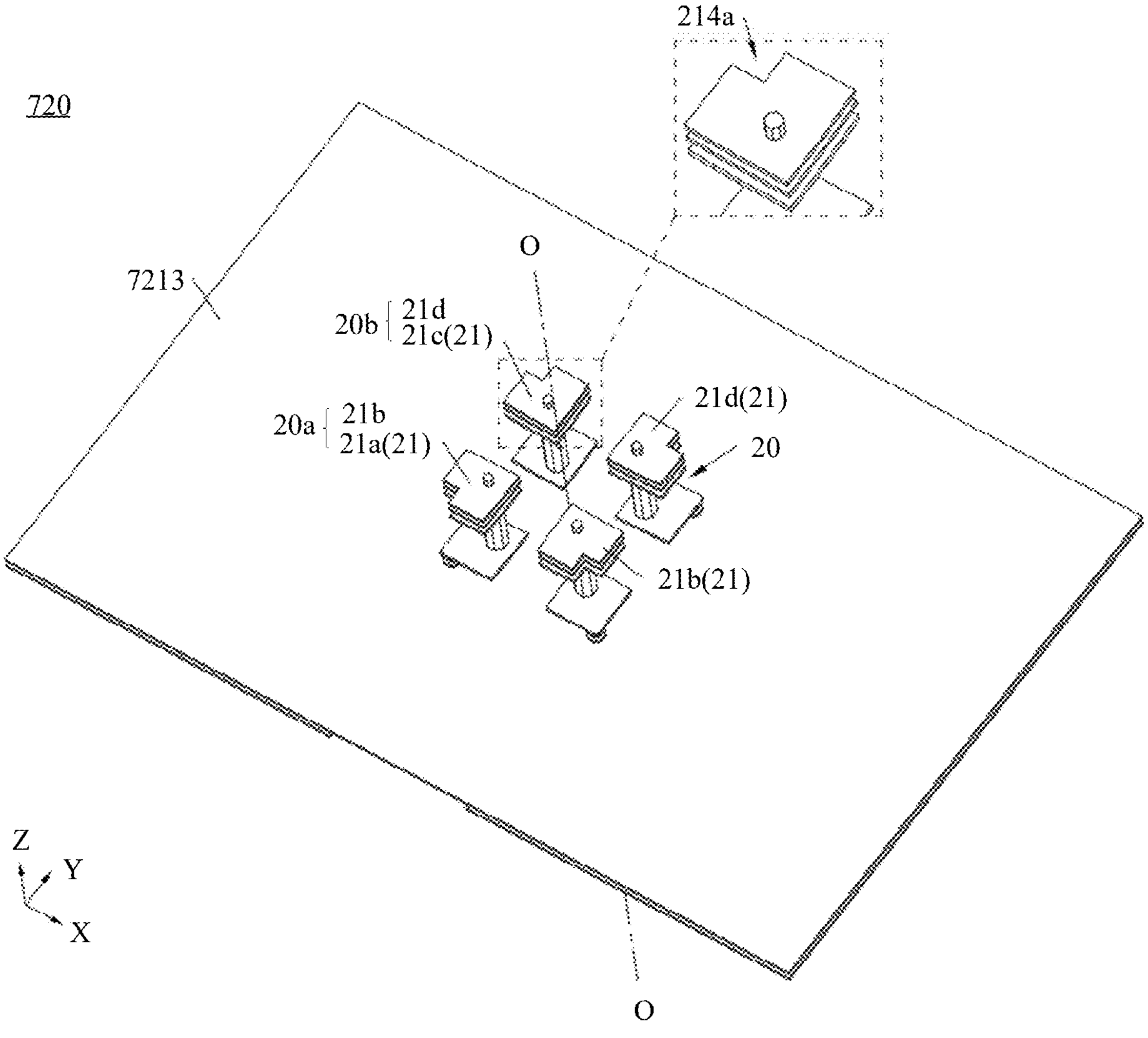
FIG. 12 is a schematic diagram of a partial structure of the antenna module shown in FIG. 9.
Figure 13:
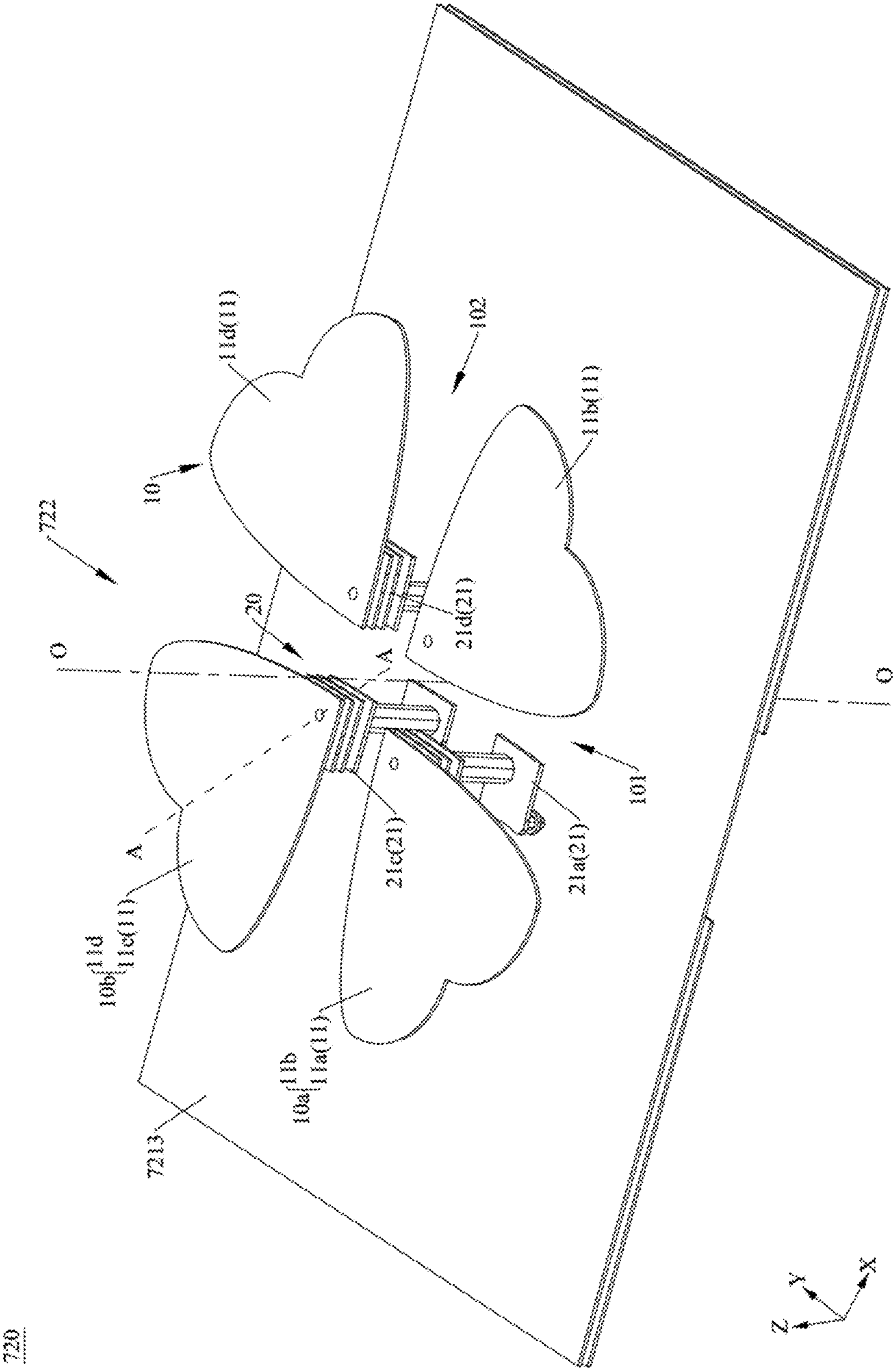
FIG. 13 is a schematic diagram of a partial structure of the antenna module shown in FIG. 9.

FIG. 12 is a schematic diagram of a partial structure of the antenna module 720 shown in FIG. 9, and FIG. 13 is a schematic diagram of a partial structure of the antenna module 720 shown in FIG. 9. The broadside antenna 722 in the antenna module 720 shown in FIG. 12 shows only the grounding element group 20, and the broadside antenna 722 in the antenna module 720 shown in FIG. 13 shows only the radiation element group 10 and the grounding element group 20.

The grounding element group 20 is connected between the radiation element group 10 and the grounding surface 7213. The grounding element group 20 is centrosymmetric relative to the center line O-O. The grounding element group 20 includes four grounding stubs 21, and the four grounding stubs 21 surround the center line O-O and are arranged at intervals. The four grounding stubs 21 are of a same structure. Each grounding stub 21 is fixedly connected to one radiator 11. Specifically, each grounding stub 21 is fixedly connected to a side that is of one radiator 11 and that is close to the center line O-O. Each grounding stub 21 is fixedly connected to a side that is of one radiator 11 and that is close to the third edge point B (shown in FIG. 10).

The four grounding stubs 21 are respectively a first grounding stub 21*a*, a second grounding stub 21*c*, a third grounding stub 21$b$, and a fourth grounding stub 21$d$. The first grounding stub 21$a$, the second grounding stub 21$c$, the third grounding stub 21$b$, and the fourth grounding stub 21$d$ are arranged in a rectangular or square shape around the center line O-O (which allows a small deviation, and may be arranged in an approximately rectangular or square shape). One end of the first grounding stub 21$a$ is connected to a side that is of the first radiator 11$a$ and that is close to the second radiator 11$b$, and the other end is connected to the grounding surface 7213. One end of the second grounding stub 21$c$ is connected to a side that is of the second radiator 11$b$ and that is close to the first radiator 11$a$, and the other end is connected to the grounding surface 7213. One end of the third grounding stub 21$b$ is connected to a side that is of the third radiator 11$c$ and that is close to the fourth radiator 11$d$, and the other end is connected to the grounding surface 7213. One end of the fourth grounding stub 21$d$ is connected to a side that is of the fourth radiator 11$d$ and that is close to the third radiator 11$c$, and the other end is connected to the grounding surface 7213.

In an implementation, the grounding element group 20 includes a first grounding element 20$a$ and a second grounding element 20$b$, and the first grounding element 20$a$ and the second grounding element 20$b$ are arranged at an interval in the first direction. The first grounding element 20$a$ and the second grounding element 20$b$ are respectively located on two opposite sides of the first gap 101. One end of the first grounding element 20$a$ is connected to a side that is of the first radiation element 10$a$ and that is close to the second radiation element 10$b$, and the other end is connected to the grounding surface 7213. One end of the second grounding element 20$b$ is connected to a side that is of the second radiation element 10$b$ and that is close to the first radiation element 10$a$, and the other end is connected to the grounding surface 7213. The first grounding element 20$a$ includes the first grounding stub 21$a$ and the second grounding stub 21$c$ that are arranged at an interval in the second direction, and the second grounding element 20$b$ includes the third grounding stub 21$b$ and the fourth grounding stub 21$d$ that are arranged at an interval in the second direction.

Figure 14:
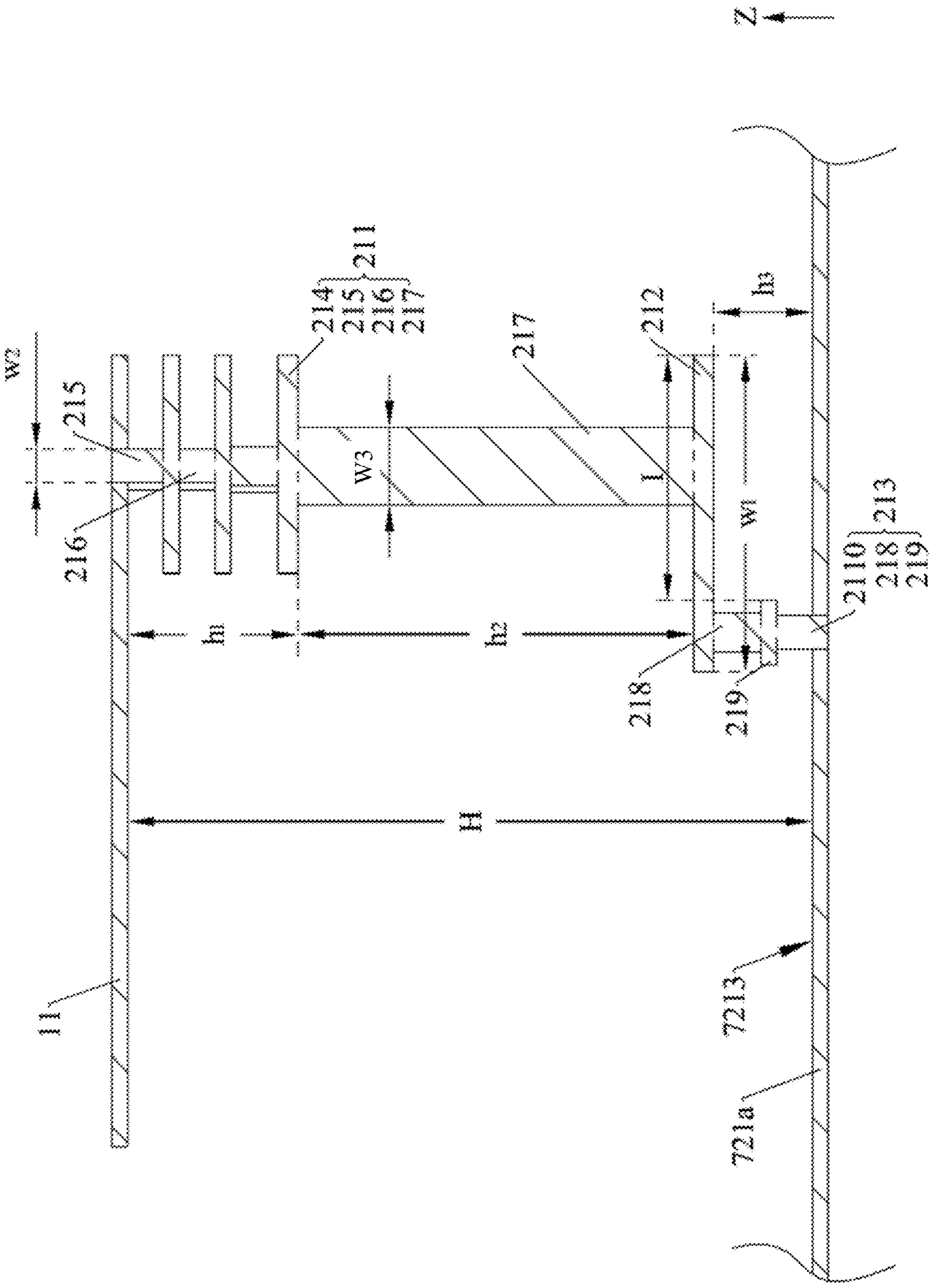
FIG. 14 is a schematic diagram of a cross-sectional structure of the structure shown in FIG. 13 that is cut along A-A.

FIG. 14 is a schematic diagram of a cross-sectional structure of the structure shown in FIG. 13 that is cut along A-A. The "cutting along A-A" means cutting along a plane on which the A-A line is located. Similar descriptions below may be understood in the same way.

The grounding stub 21 includes a first part 211, a second part 212, and a third part 213 that are sequentially connected. The first part 211 is located on a side that is of the second part 212 and that faces away from the grounding surface 7213. An end that is of the first part 211 and that is away from the second part 212 is connected to the radiator 11. The third part 213 is located on a side that is of the second part 21 and that faces the grounding surface 7213. In a third direction, the first part 211 is misaligned with the third part 213. An end that is of the third part 213 and that is away from the second part 212 is connected to the grounding surface 7213. A misalignment distance between the first part 211 and the third part 213 is $w_1$. The third direction is different from the first direction and the second direction. For example, the third direction is the Z-axis direction.

In some other implementations, the first part 211 may be partially misaligned with the third part 213. It should be noted that, that the first part 211 is completely misaligned with the third part 213 means that projections of the first part 211 and the third part 213 on the grounding surface 7213 do not overlap. It may be understood that, that the first part 211 is partially misaligned with the third part 213 means that the projections of the first part 211 and the third part 213 on the grounding surface 7213 partially overlap.

The first part 211 is connected to an end that is of the second part 212 and that is close to the center line O-O. The first part 211 includes a first grounding layer 214, a first connection component 215, a second connection component 216, and a third connection component 217. There are a plurality of first grounding layers 214, and the plurality of first grounding layers 214 are arranged at intervals in the Z-axis direction. The first grounding layer 214 may be a metal layer made of a metal material such as copper, silver, aluminum, magnesium, or tin. It should be understood that a shape of the first grounding layer 214 is not limited to the rectangle shown in FIG. 12, and may alternatively be another polygon or special shape.

In an implementation, a notch 214$a$ is provided at the first grounding layer 214, and the notch 214$a$ runs through the first grounding layer 214 in a thickness direction of the first grounding layer 214. The notch 214$a$ is provided at an end that is of the first grounding layer 214 and that faces away from the center line O-O, and runs through a circumferential surface of the first grounding layer 214. Existence of the notch 214$a$ is to avoid a rapid change of impedance of the grounding stub 21, and improve impedance matching of the broadside antenna 722.

The first connection component 215 is connected between the radiator 11 of the radiation element group 10 and the first grounding layer 214, to implement a connection between the grounding stub 21 of the grounding element group 20 and the radiator 11 of the radiation element group 10. A width of the first connection component 215 is $w_2$. There are a plurality of second connection components 216, and each second connection component 216 is connected between two adjacent first grounding layers 214, to implement connections between the plurality of first grounding layers 214. A sum of heights of the plurality of first grounding layers 214, the first connection component 215, and the plurality of second connection components 217 is $h_1$. The third connection component 217 is connected between the first grounding layer 214 and the second part 212, to implement a connection between the grounding stub 21 and the second part 212. A width of the third connection component 217 is $w_3$, and a height is $h_2$.

The plurality of first grounding layers 214 and the metal layer inside the substrate 721 may be formed in a same process, to simplify a manufacturing process of the broadside antenna 722. Specifically, the substrate 721 is provided with a first connection hole, a second connection hole, and a third grounding hole (not shown in the figure). The first connection hole communicates the radiator 11 and the first grounding layer 214. The first connection hole is a via hole or a buried hole. For example, the first connection hole runs through the radiator 11. In some other implementations, the first connection hole may not run through the radiator 11. The first connection component 215 is located in the first connection hole, to connect the radiator 11 and the first grounding layer 214. For example, the first connection component 215 may be a solid metal column formed by filling the first connection hole with a metal material, or the first connection component 215 may be a metal layer formed by partially or completely covering a hole wall of the first connection hole with a metal material.

There are a plurality of second connection holes, and each second connection hole communicates two adjacent first grounding layers 214. The second connection hole is a via hole or a buried hole. For example, the second connection hole does not run through the first grounding layer 214. In some other implementations, the second connection hole may run through the first grounding layer 214. Specifically, each second connection component 216 is located in one second connection hole, to connect two adjacent first grounding layers 214. For example, the second connection component 216 may be a solid metal column formed by filling the second connection hole with a metal material, or the second connection component 216 may be a metal layer formed by partially or completely covering a hole wall of the second connection hole with a metal material.

The third grounding hole communicates the first grounding layer 214 and the second part 212. The third grounding hole is a via hole or a buried hole. For example, the third grounding hole does not run through the second part 212. In some other embodiments, the third grounding hole may run through the second part 212. Specifically, the third connection component 217 is located in the third grounding hole, to connect the first grounding layer 214 and the second part 212. For example, the third connection component 217 may be a solid metal column formed by filling the third grounding hole with a metal material, or the third connection component 217 may be a metal layer formed by partially or completely covering a hole wall of the third grounding hole with a metal material.

The second part 212 is parallel to the X-Y axis plane (where a small deviation is allowed). A distance between the second part 212 and the grounding surface 7213 is $h_3$, and a width of the second part 212 is $w_1$. In an implementation, the second part 212 may be a metal layer. In this case, a metal layer of the substrate 721 forms the second part 212. In other words, the second part 212 and the metal layer inside the substrate 721 may be formed in a same process, to simplify a manufacturing process of the broadside antenna 722.

The third part 213 is connected to an end that is of the second part 212 and that is away from the center line O-O. The third part 213 includes a second radiation layer 218, a fourth connection component 219, and a fifth connection component 2110. The second radiation layer 218 is located between the second part 212 and the grounding surface 7213. The second radiation layer 218 may be a metal layer made of a metal material such as copper, silver, aluminum, magnesium, or tin. It should be understood that a shape of the second radiation layer 218 is not limited to the rectangle shown in FIG. 12, and may alternatively be another polygon or special shape. The fourth connection component 219 is connected between the second part 212 and the second radiation layer 218, to implement a connection between the third part 213 and the second part 212. The fifth connection component 2110 is connected between the second radiation layer 218 and the grounding surface 7213, to implement grounding of the grounding stub 21.

The second radiation layer 218 and the metal layer inside the substrate 721 may be formed in a same process, to simplify a manufacturing process of the broadside antenna 722. Specifically, the substrate 721 is provided with a fourth connection hole and a fifth connection hole (not shown in the figure). The fourth connection hole communicates the second part 212 and the second radiation layer 218. The fourth connection hole is a via hole or a buried hole. For example, the fourth connection hole does not run through the second part 212 and the second radiation layer 218. In some other implementations, the fourth connection hole may run through the second part 212, or the fourth connection hole may run through the second grounding stub 218. The fourth connection component 219 is located in the fourth connection hole, to connect the second part 212 and the second radiation layer 218. For example, the fourth connection component 219 may be a solid metal column formed by filling the fourth connection hole with a metal material, or the fourth connection component 219 may be a metal layer formed by partially or completely covering a hole wall of the fourth connection hole with a metal material.

The fifth connection hole communicates the second radiation layer 218 and the grounding surface 7213. The fifth connection hole is a via hole or a buried hole. For example, the fifth connection hole does not run through the second radiation layer 218, but runs through the grounding layer 721*a*. In some other implementations, the fifth connection hole may run through the second radiation layer 218, or the fifth connection hole may not run through the grounding layer 721*a*. Specifically, the fifth connection component 2110 is located in the fifth connection hole, to connect the second radiation layer 218 and the grounding surface 7213. For example, the fifth connection component 2110 may be a solid metal column formed by filling the fifth connection hole with a metal material, or the fifth connection component 2110 may be a metal layer formed by partially or completely covering a hole wall of the fifth connection hole with a metal material.

Figure 15:
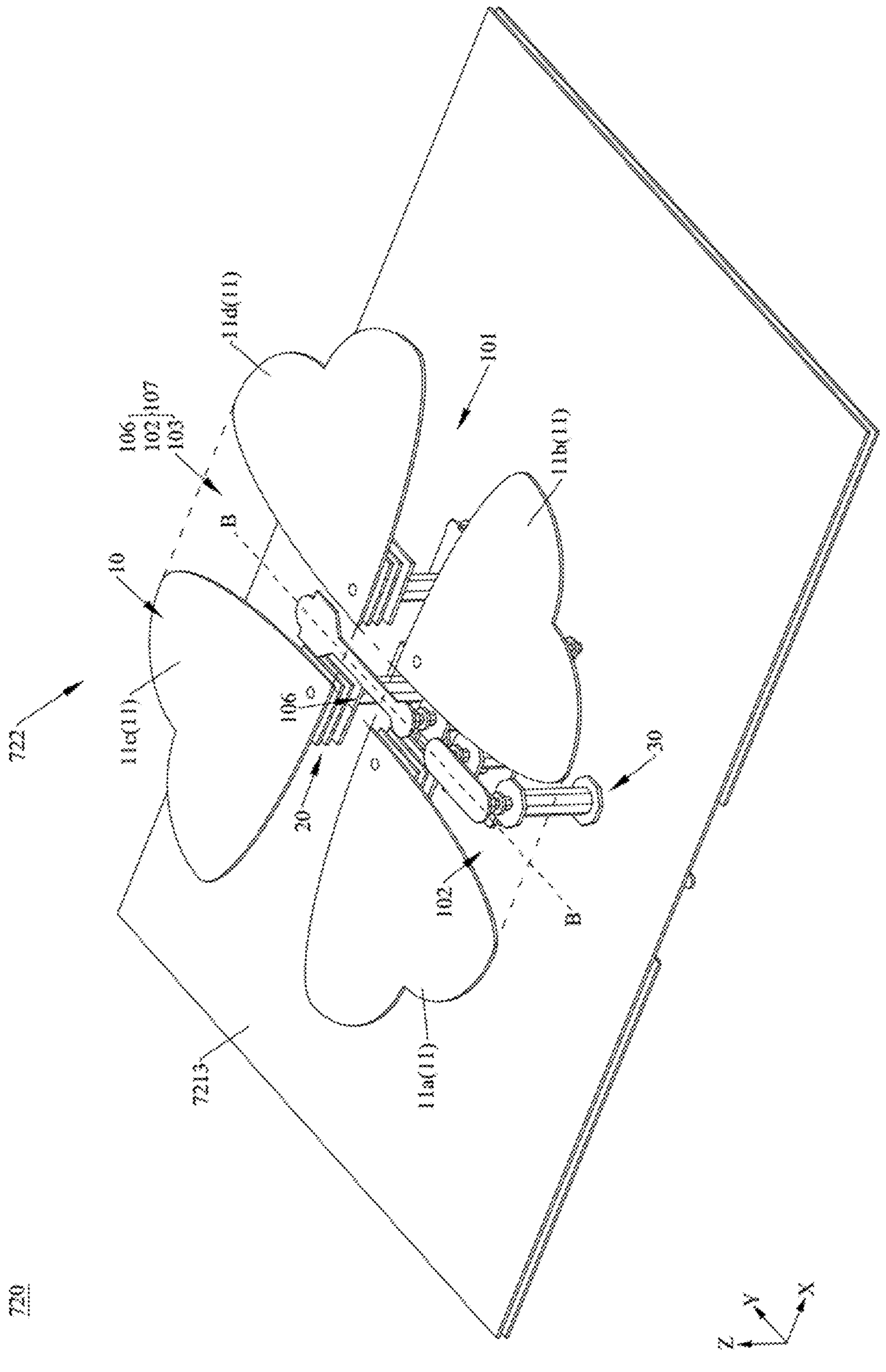
FIG. 15 is a schematic diagram of a partial structure of the antenna module shown in FIG. 9.
Figure 16:
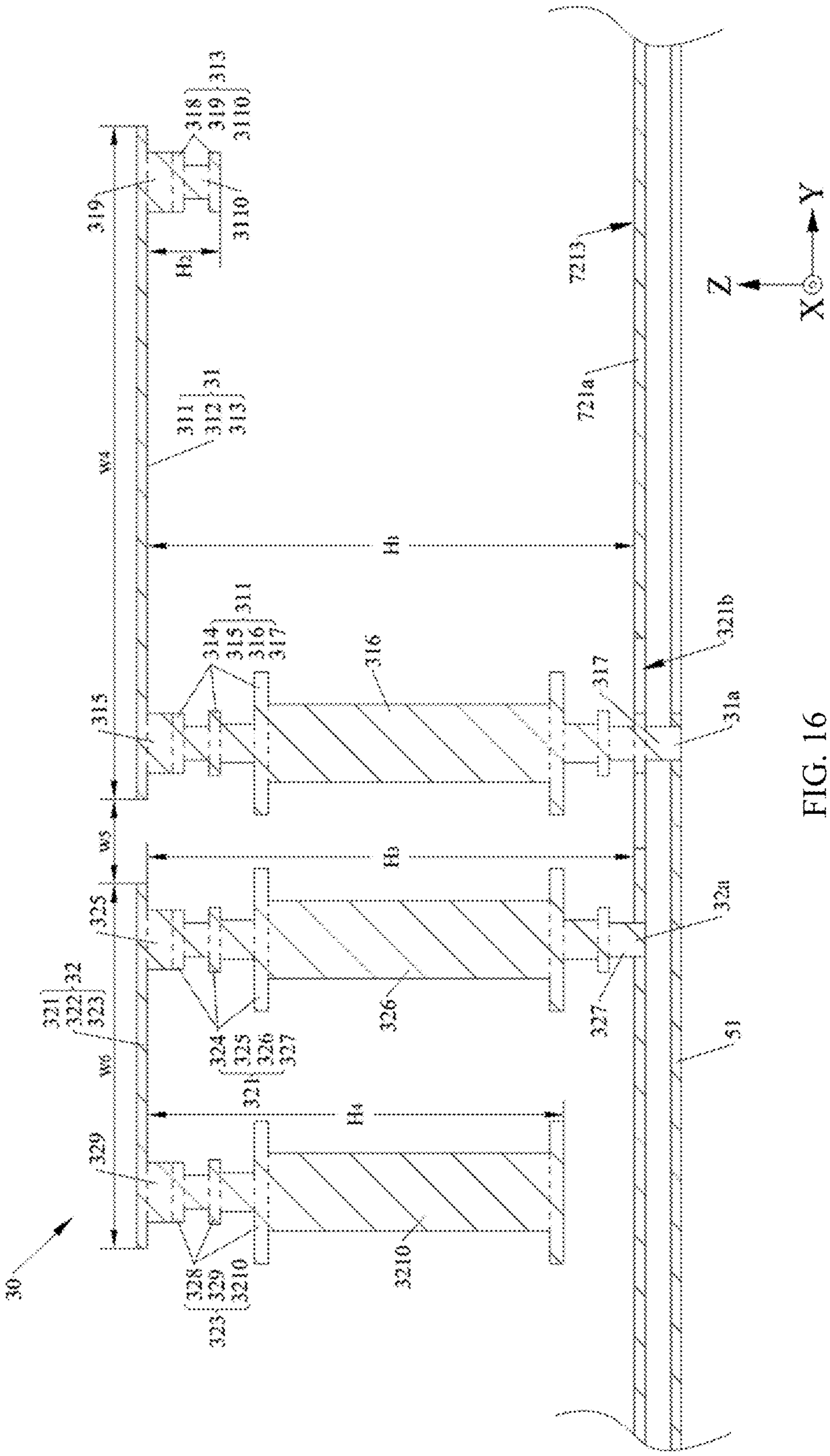
FIG. 16 is a schematic diagram of a cross-sectional structure of the structure shown in FIG. 15 that is cut along B-B.

FIG. 15 is a schematic diagram of a partial structure of the antenna module 720 shown in FIG. 9, and FIG. 16 is a schematic diagram of a cross-sectional structure of the structure shown in FIG. 15 that is cut along B-B. The broadside antenna 722 in the antenna module 720 shown in FIG. 15 shows only the radiation element group 10, the grounding element group 20, and the first excitation element 30, and the broadside antenna 722 in the antenna module 720 shown in FIG. 16 shows only the first excitation element 30.

The first excitation element 30 is located in the second gap 107. The first excitation element 30 is a first polarization excitation element, and is configured to excite the first radiation element 10*a* and the second radiation element 10*a* to generate an electric field in the first direction. The first excitation element 30 includes a first feeding structure 31 and a first extension stub 32, and the first feeding structure 31 and the first extension stub 32 are arranged at an interval in the first direction. The first feeding structure 31 includes a first feed-in end 31*a* connected to a feed source. Specifically, the first feed-in end 31*a* is electrically connected to a radio frequency port of the transmitter and/or receiver chip 710 (shown in FIG. 2), to implement a connection to the feed source. The first feeding structure 31 is electrically connected to the radio frequency port of the transmitter and/or receiver chip 710 by using a first feeder 51. For example, the first feeder 51 may be a microstrip line. The first extension stub 32 is located on a side that is of the first feeding structure 31 and that is close to the first feed-in end 31*a*. The first extension stub 32 includes a first grounding end 32*a* close to the first feed-in end 31*a*, and the first grounding end 32*a* is electrically connected to the grounding surface 7213. The first grounding end 32*a* of the first extension stub 32 is electrically connected to the grounding layer 721*a*, to implement grounding.

The first feeding structure 31 is in a "Γ" shape. The first feeding structure 31 includes a first feed-in part 311, a first feeding part 312, and a first auxiliary part 313 that are sequentially connected. Both the first feed-in part 311 and the first auxiliary part 313 are located on a side that is of the first feeding part 312 and that faces the grounding surface 7213. The first feed-in part 311 and the first auxiliary part 313 are spaced from each other in the first direction. The first feeding part 312 extends in the first direction, both the first feed-in part 311 and the first auxiliary part 313 extend in the third direction, and the first feed-in part 311 is connected to the feed source, to implement feeding of the first feeding structure 31.

The first feed-in part 311 is connected to a side that is of the first feeding part 312 and that is close to the first extension stub 32. An end that is of the first feed-in part 311 and that is away from the first feeding part 312 is the first feed-in end 31*a*. Specifically, one end of the first feed-in part 311 is connected to an end that is of the first feeding part 312 and that is close to the first extension stub 32, and the other end is connected to the first feeder 51, to implement an electrical connection between the first feeding structure 31 and the first feeder 51. The first feed-in part 311 is located in the first sub-gap 102. Specifically, the grounding layer 721*a* is provided with a first through hole 721*b*, and the first through hole 721*b* runs through the grounding layer 721*a* in a thickness direction of the grounding layer 721*a*. The other end of the first feed-in part 311 passes through the first through hole 721*b* and is then connected to the first feeder 51.

A structure of the first feed-in part 311 is approximately the same as a structure of the grounding stub 21. The first feed-in part 311 includes an access layer 314 and an access component. There may be a plurality of access layers 314, and the plurality of access layers 314 are arranged at intervals in the third direction. The access layer 314 may be a metal layer made of a metal material such as copper, silver, aluminum, magnesium, or tin. There may be a plurality of access components. The plurality of access components 315, the plurality of access components 316, and the access component 317 are arranged at intervals in the third direction, and are sequentially connected between the first feeding part 312, the plurality of access layers 314, and the first feeder 51, to implement a connection between the first feed-in part 311 and the first feeding part 312, and a connection between the first feed-in part 311 and the first feeder 51.

In an implementation, the plurality of access layers 314 of the first feed-in part 311 and the metal layer inside the substrate 721 may be formed in a same process, to simplify a manufacturing process of the broadside antenna 722. A manufacturing process of the metal layer in the substrate is similar to the foregoing description, and details are not described herein again.

The first feeding part 312 crosses the first gap 101 in the first direction. A part of the first feeding part 312 is located in the first sub-gap 102, a part of the first feeding part 312 is located in the first gap 101, and a part of the first feeding part 312 is located in the second sub-gap 103. A part of the first feeding part 312 is located in the fifth sub-gap 106. Specifically, the first feeding part 312 is parallel to the X-Y axis plane (where a small deviation is allowed). A distance between the first feeding part 312 and the grounding surface 7213 is $H_1$, and a width of the first feeding part 312 is $w_4$. For example, the first feeding part 312 and the radiator 11 may be located on a same plane. In this case, $H_1=H$. In some other embodiments, the first feeding part 312 and the radiator 11 may not be located on a same plane. The first feeding part 312 may be located on a side that is of the radiator 11 and that faces away from the grounding surface 7213, or may be located on a side that is of the radiator 11 and that faces the grounding surface 7213.

In an implementation, a metal layer of the substrate 721 forms the first feeding part 312.

One end of the first auxiliary part 313 is connected to an end that is of the first feeding part 312 and that is away from the first extension stub 32, and the other end extends in the third direction. Specifically, the first auxiliary part 313 is located in the second sub-gap 103. A height of the first auxiliary part 313 is $H_2$, where $H_2<H_1$.

A structure of the first auxiliary part 313 is approximately the same as a structure of the grounding stub 21. The first auxiliary part 313 includes an auxiliary layer and an auxiliary component. There may be a plurality of auxiliary layers 318, and the plurality of auxiliary layers 318 are arranged at intervals in the third direction. The auxiliary layer 318 may be a metal layer made of a metal material such as copper, silver, aluminum, magnesium, or tin. There may be a plurality of auxiliary components 319. The auxiliary component 319 is connected between the first feeding part 312 and the auxiliary layer 318. An auxiliary component 3110 is connected between two adjacent auxiliary layers 318.

In an implementation, the plurality of auxiliary layers 318 of the first auxiliary part 313 and the metal layer inside the substrate 721 may be formed in a same process, to simplify a manufacturing process of the broadside antenna 722. A manufacturing process of the metal layer in the substrate is similar to the foregoing description, and details are not described herein again.

The first extension stub 32 is in an inverted U shape. The first extension stub 32 is located in the first sub-gap 102. Specifically, the first extension stub 32 is located on a side that is of the first feed-in part 311 and that faces away from the first auxiliary part 313, and is spaced from the first feed-in part 311. A distance between the first extension stub 32 and the first feeding structure 31 is $w_5$. The first extension stub 32 includes a first grounding part 321, a first extension part 322, and a second extension part 323 that are sequentially connected. Both the first grounding part 321 and the second extension part 323 are located on a side that is of the first extension part 322 and that faces the grounding surface 7213. The first grounding part 321 and the second extension part 323 are spaced from each other in the first direction.

The first grounding part 321 is connected to a side that is of the first extension part 322 and that is close to the first feeding structure 31, and an end that is of the first grounding part 321 and that faces away from the first extension part 322 is the first grounding end 32*a*. The first grounding part 321 is close to the first feed-in part 311. Specifically, one end of the first grounding part 321 is connected to a side that is of the first extension part 322 and that is close to the first feeding structure 31, and the other end is connected to the grounding surface 7213, to implement grounding of the first extension stub 32.

A structure of the first grounding part 321 is approximately the same as a structure of the grounding stub 21. The first grounding part 321 includes a grounding layer and a grounding component. There are a plurality of grounding layers 324, and the plurality of grounding layers 324 are arranged at intervals in the third direction. The grounding layer 324 may be a metal layer made of a metal material such as copper, silver, aluminum, magnesium, or tin. There may be a plurality of grounding components. The plurality of grounding components 325, the plurality of grounding components 326, and the grounding component 327 are arranged at intervals in the third direction, and are sequentially connected between the first extension part 322, the plurality of grounding layers 324, and the grounding surface 7213, to implement a connection between the first grounding part 321 and the first extension part 322, and a connection between the first grounding part 321 and the grounding surface 7213.

In an implementation, the plurality of grounding layers 324 of the first grounding part 321 and the metal layer inside the substrate 721 may be formed in a same process, to simplify a manufacturing process of the broadside antenna 722. A manufacturing process of the metal layer in the substrate is similar to the foregoing description, and details are not described herein again.

The first extension part 322 extends in the first direction. The first extension part 322 is located between the first radiator 11*a* and the second radiator 11*b*, and is spaced from the first radiator 11*a* and the second radiator 11*b*. Specifically, the first extension part 322 is parallel to the X-Y axis plane (where a small deviation is allowed). A distance between the first extension part 322 and the grounding surface 7213 is $H_3$, and a width of the first extension part 322 is $w_6$. For example, the first extension part 322 may be located on a same plane as the first feeding part 312, and is spaced from the first feeding part 312 in the first direction. In this case, $H_3=H_1$.

In an implementation, a metal layer of the substrate 721 forms the first extension part 322.

The second extension part 323 is connected to a side that is of the first extension part 322 and that faces away from the first feeding structure 32. Specifically, one end of the second extension part 323 is connected to an end that is of the first extension part 322 and that is away from the first feeding structure 31, and the other end extends in the third direction. A height of the second extension part 323 is $H_4$, where $H_4$ is less than $H_3$.

The second extension part 323 includes a first extension layer 328, a first extension component 329, and a second extension component 3210. There are a plurality of first extension layers 328, and the plurality of first extension layers 328 are arranged at intervals in the Z-axis direction. The first extension layer 328 may be a metal layer made of a metal material such as copper, silver, aluminum, magnesium, or tin. The first extension component 329 is connected between the first extension part 322 and the first extension layer 328, to implement a connection between the first extension part 323 and the second extension part 323. There are a plurality of second extension components 3210, and each second extension component 3210 is connected between two adjacent first extension layers 328, to implement connections between the plurality of first extension layers 328.

In an implementation, the plurality of first extension layers 328 of the second extension part 323 and the metal layer inside the substrate 721 may be formed in a same process, to simplify a manufacturing process of the broadside antenna 722. A manufacturing process of the metal layer in the substrate is similar to the foregoing description, and details are not described herein again.

Figure 17:
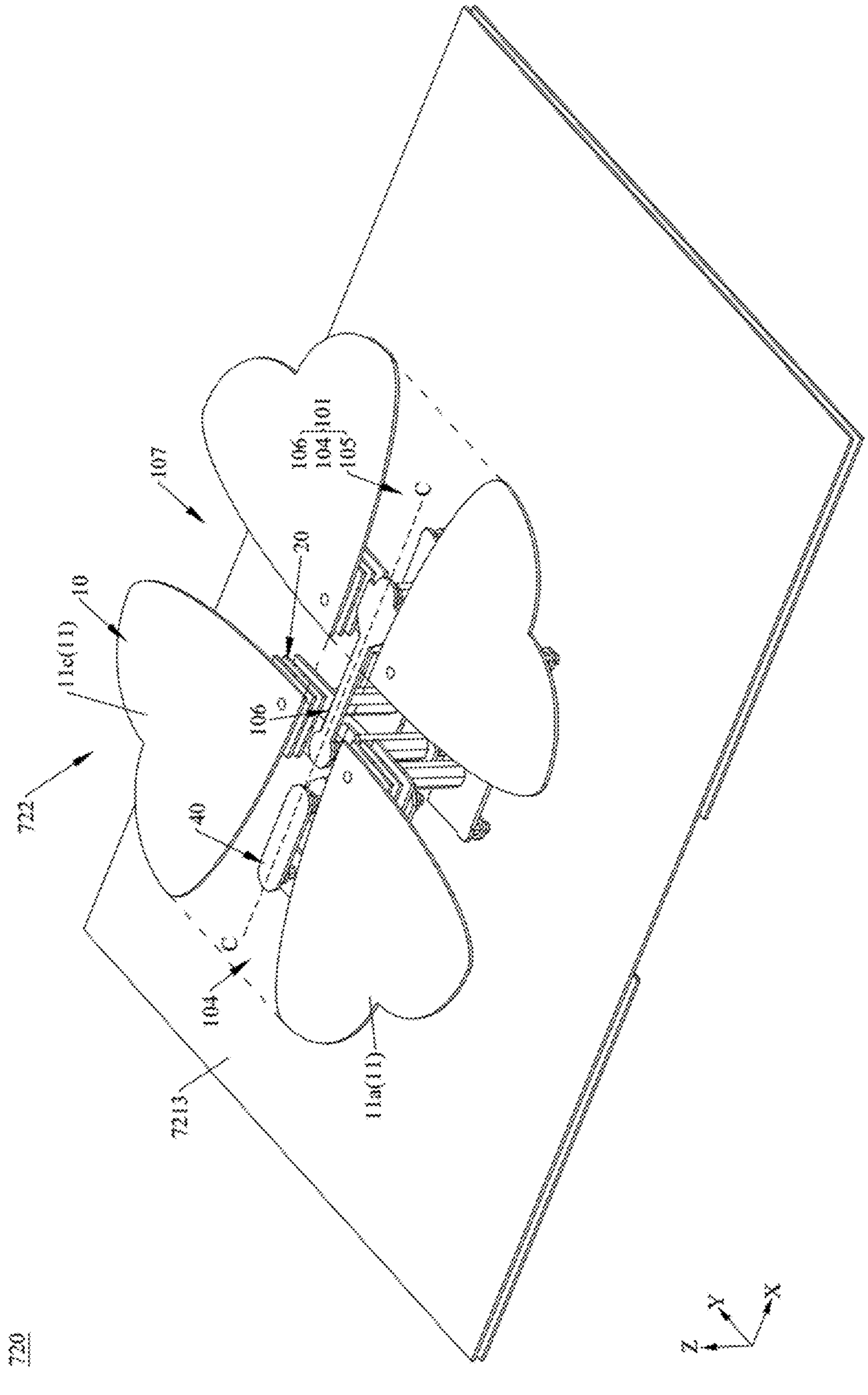
FIG. 17 is a schematic diagram of a partial structure of the antenna module shown in FIG. 9.
Figure 18:
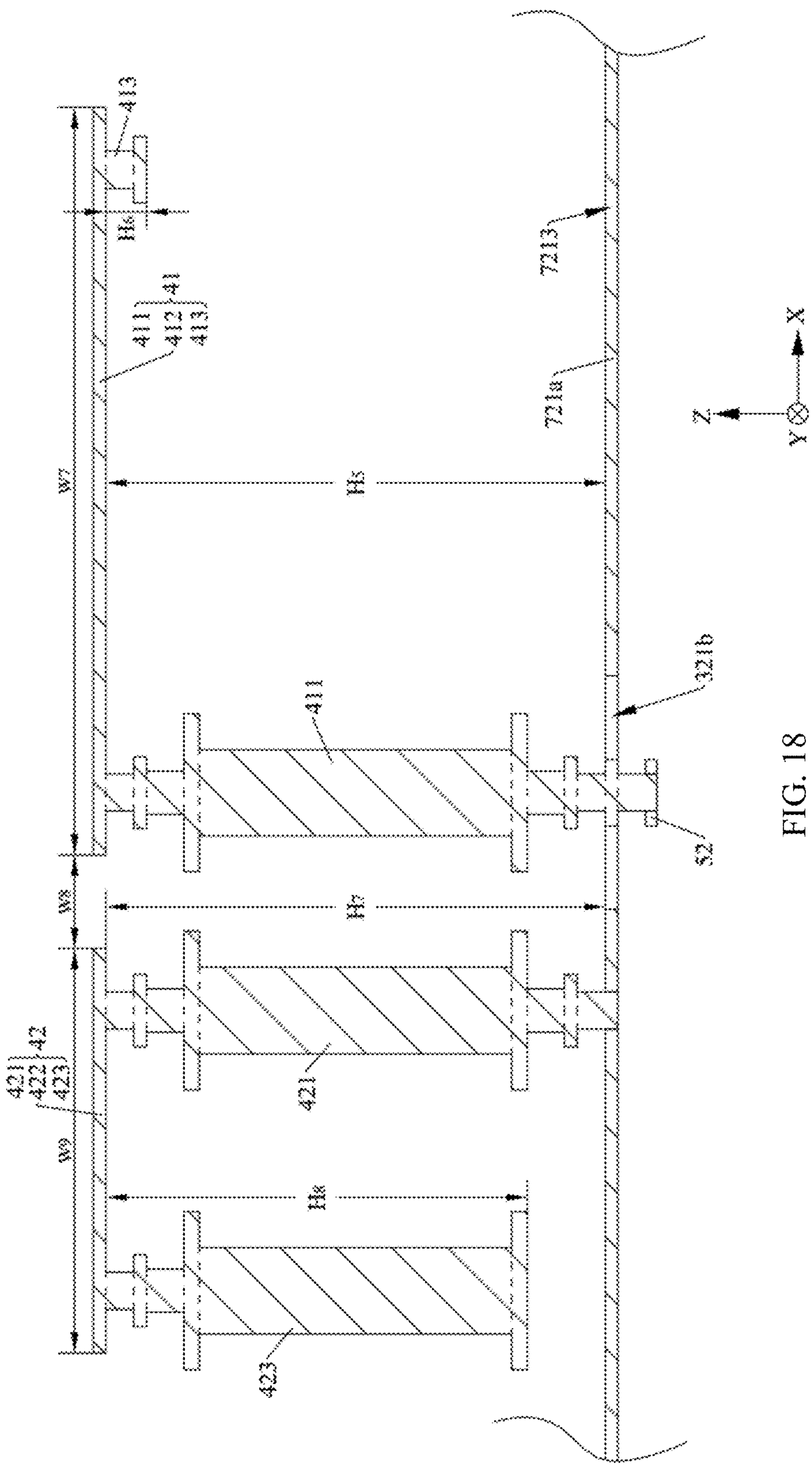
FIG. 18 is a schematic diagram of a cross-sectional structure of the structure shown in FIG. 17 that is cut along C-C.

FIG. 17 is a schematic diagram of a partial structure of the antenna module 720 shown in FIG. 9, and FIG. 18 is a schematic diagram of a cross-sectional structure of the structure shown in FIG. 17 that is cut along C-C. The broadside antenna 722 in the antenna module 720 shown in FIG. 17 shows only the radiation element group 10, the grounding element group 20, and the second excitation element 40, and the broadside antenna 722 in the antenna module 720 shown in FIG. 18 shows only the second excitation element 40.

The second excitation element 40 is located in the first gap 101. The second excitation element 40 is a second polarization excitation element, and is configured to excite the first radiation element 10*a* and the second radiation element 10*b* to generate an electric field in the second direction. The second excitation element 40 includes a second feeding structure 41 and a second extension stub 42, and the second feeding structure 41 and the second extension stub 42 are arranged at an interval in the second direction. The second feeding structure 41 crosses the first feeding structure 31. The second feeding structure 41 includes a second feed-in end 41*a* connected to a feed source. Specifically, the second feed-in end 41*a* is electrically connected to a radio frequency port of the transmitter and/or receiver chip 710 (shown in FIG. 2), to implement a connection to the feed source. The second feed point structure 41 is electrically connected to the radio frequency port of the transmitter and/or receiver chip 710 by using a second feeder 52. For example, the second feeder 52 may be a microstrip line. The second extension stub 42 is located on a side that is of the second feeding structure 41 and that is close to the second feed-in end 41*a*. The second extension stub 42 includes a second grounding end 42*a* close to the second feed-in end 41*a*, and the second grounding end 42*a* is electrically connected to the grounding surface 7213. The second grounding end 42*a* of the second extension stub 42 is electrically connected to the grounding layer 721*a*, to implement grounding.

The second feeding structure 41 is in a "Γ" shape. A structure of the second feeding structure 41 is approximately the same as a structure of the first feeding structure 31. The second feeding structure 41 includes a second feed-in part 411, a second feeding part 412, and a second auxiliary part 413 that are sequentially connected, and structures of the second feed-in part 411, the second feeding part 412, and the second auxiliary part 413 are respectively the same as or similar to structures of the first feed-in part 311, the first feeding part 312, and the first auxiliary part 313 of the first feeding structure 31. Details are not described herein again.

The second feed-in part 411 is connected to a side that is of the second feeding part 412 and that is close to the second extension stub 42. An end that is of the second feed-in part 411 and that is away from the second feeding part 412 is the second feed-in end 41*a*. Specifically, one end of the second feed-in part 411 is connected to an end that is of the second feeding part 412 and that is close to the second extension stub 42, and the other end is connected to the second feeder 52, to implement an electrical connection between the second feeding structure 41 and the second feeder 52. The second feed-in part 411 is located between the first grounding stub 21*a* and the second grounding stub 21*c* of the grounding element group 20 (as shown in FIG. 12), and is spaced by the third sub-gap 104 from the first grounding stub 21*a* and the second grounding stub 21*c*. Specifically, the grounding layer 721 is provided with a second through hole 721*c*, and the second through hole 721*c* runs through the grounding layer 721*a* in a thickness direction of the grounding layer 721*a*. The other end of the second feed-in part 411 passes through the second through hole 721*c* and is then connected to the second feeder 52. A structure of the second feed-in part 411 is approximately the same as a structure of the first feed-in part 311, and details are not described herein again.

The second feeding part 412 is located on a side that is of the first feeding part 312 and that faces the grounding surface 7213. The second feeding part 412 crosses the second gap 102 in the second direction. A part of the second feeding part 412 is located in the third sub-gap 104, a part of the second feeding part 412 is located in the second gap 102, and a part of the second feeding part 412 is located in the fourth sub-gap 105. A part of the second feeding part 412 is located in the fifth sub-gap 106. Specifically, the second feeding part 412 is parallel to the X-Y axis plane (where a small deviation is allowed). A distance between the second feeding part 412 and the grounding surface 7213 is $H_5$, and a width of the second feeding part 412 is $w_7$. In addition, $H_5<H_1$. In some other embodiments, the first feeding part 312 may alternatively be located on a side that is of the second feeding part 412 and that faces the grounding surface 7213. In this case, $H_5>H_1$.

One end of the second auxiliary part 413 is connected to an end that is of the second feeding part 412 and that is away from the second extension stub 42, and the other end extends in the third direction. Specifically, the second auxiliary part 413 is located in the fourth sub-gap 105. A height of the second auxiliary part 413 is $H_6$, where $H_6<H_1$. A structure of the second auxiliary part 413 is approximately the same as a structure of the first auxiliary part 313, and details are not described herein again.

The second extension stub 42 is in an inverted U shape. A structure of the second extension stub 42 is the same as or similar to a structure of the first extension stub 32. The second extension stub 42 is located in the third sub-gap 104. Specifically, the second extension stub 42 is located on a side that is of the second feed-in part 411 and that faces away from the second auxiliary part 413, and is spaced from the second feed-in part 411. A distance between the second extension stub 42 and the second feeding structure 42 is $w_8$. The second extension stub 42 includes a second grounding part 421, a third extension part 422, and a fourth extension part 423 that are sequentially connected. Both the second grounding part 421 and the fourth extension part 423 are located on a side that is of the third extension part 422 and that faces the grounding surface 7213. The second grounding part 421 and the fourth extension part 423 are spaced from each other in the second direction.

The second grounding part 421 is connected to a side that is of the third extension part 422 and that is close to the second feeding structure 41. An end that is of the second grounding part 421 and that is away from the third extension part 422 is the second grounding end **42*a*. The second grounding part 421 is close to the second feed-in part 311. Specifically, one end of the second grounding part 421 is connected to an end that is of the third extension part 422 and that is close to the second feeding structure 41, and the other end is fixedly connected to the grounding surface 7213, to implement grounding of the second extension stub 42. A structure of the second grounding part 421 is approximately the same as a structure of the first grounding part 321**, and details are not described herein again.

The third extension part 422 extends in the second direction. The third extension part 422 is located between the first radiator **11*a* and the third radiator 11*c*, and is spaced from the first radiator 11*a* and the third radiator 11*c*. Specifically, the third extension part 422 is parallel to the X-Y axis plane (where a small deviation is allowed). A distance between the third extension part 422 and the grounding surface 7213 is $H_7$, and a width of the third extension part 422 is $w_9$. For example, the third extension part 422 may be located on a same plane as the second feeding part 412**, and is spaced from the second feeding part in the second direction. In this case, $H_7=H_5$.

The fourth extension part 423 is connected to a side that is of the third extension part 422 and that faces away from the second feeding structure 42. Specifically, one end of the fourth extension part 423 is connected to an end that is of the third extension part 422 and that is away from the second feeding structure 41, and the other end extends in the third direction. A height of the fourth extension part 423 is $H_8$, where $H_8$ is less than $H_7$. A structure of the fourth extension part 423 is approximately the same as a structure of the second extension part 323, and details are not described herein again.

In this embodiment, both the first excitation element 30 and the second excitation element 40 are coupling-capacitor excitation structures, and both the first excitation element 30 and the second excitation element 40 excite the radiation element group 10 in a coupled feeding manner. It should be understood that, in this implementation, both the first excitation element 30 and the second excitation element 40 perform excitation at the antenna aperture 701 close to the broadside antenna 722. The antenna aperture 701 is a high impedance point of the antenna in a resonance mode. Therefore, the first excitation element 30 and the second excitation element 40 excite the radiation element group 10 in a coupled feeding manner, so that a loss caused by an impedance mismatch can be avoided, and radiation efficiency of the broadside antenna 722 can be improved.

Next, characteristics of the broadside antenna 722 in this embodiment are analyzed in detail. For example, in the first excitation element 30 of the broadside antenna 722, as shown in FIG. 16, in the first feeding structure 31, the distance $H_1$ between the first feeding part 312 and the grounding surface 7213 is 0.865 mm, the width $w_4$ of the first feeding part 312 is 1.2 mm, and the height $H_2$ of the first auxiliary part 313 is 0.13 mm. The distance $w_5$ between the first extension stub 32 and the first feeding structure 31 is 0.15 mm. In the first extension stub 32, the distance $H_3$ between the first extension part 322 and the grounding surface 7213 is 0.865 mm, the width $w_6$ of the first extension part 322 is 0.65 mm, and the height $H_4$ of the second extension part 323 is 0.74 mm.

In the second excitation element 40 of the broadside antenna 722, as shown in FIG. 18, in the second feeding structure 41, the distance $H_5$ between the second feeding part 412 and the grounding surface 7213 is 0.8 mm, the width $w_7$ of the second feeding part 412 is 1.2 mm, and the height $H_6$ of the second auxiliary part 413 is 0.065 mm. The distance $w_8$ between the second extension stub 42 and the second feeding structure 41 is 0.15 mm, the width $w_9$ of the third extension part 422 is 0.65 mm, and the height $H_8$ of the fourth extension part 423 is 0.65 mm.

The thickness ($H_0$ shown in FIG. 12) of the substrate 721 is 1.093 mm. In the radiation element group 10 of the broadside antenna 722, as shown in FIG. 10, for the first outer edge 11 and the second outer edge 112 of the radiator 11, the semi-major axis $a_1$ is 0.6 mm, and the semi-minor axis $b_1$ is 0.58 mm. For the first inner edge 113 and the second inner edge 114 of the radiator 11, the semi-major axis $a_2$ is 1.55 mm, and the semi-minor axis $b_2$ is 0.4 mm. As shown in FIG. 11, a distance $L_1$ between the first edge point A1 of the third radiator **11*c* and the first edge point A1 of the fourth radiator 11*d* is 3.5 mm, and the distance $W_1$ between the third edge point B of the third radiator 11*c* and the third edge point B of the fourth radiator 11*d*** is 0.4 mm.

In the grounding element group 20 of the broadside antenna 722, as shown in FIG. 14, the distance H between the radiator 11 and the grounding surface 7213 is 0.865 mm, a width $w_1$ of the second radiation layer **218*b* is 0.4 mm, a width $w_2$ of the third connection component 213*a* is 0.07 mm, and a width $w_3$ of the fourth connection component 213*b*** is 0.14 mm. In addition, a height $h_1$ of the first part is 0.215 mm, a height $h_2$ of the second part is 0.5 mm, and a height $h_3$ of the third part is 0.15 mm.

Figure 19:
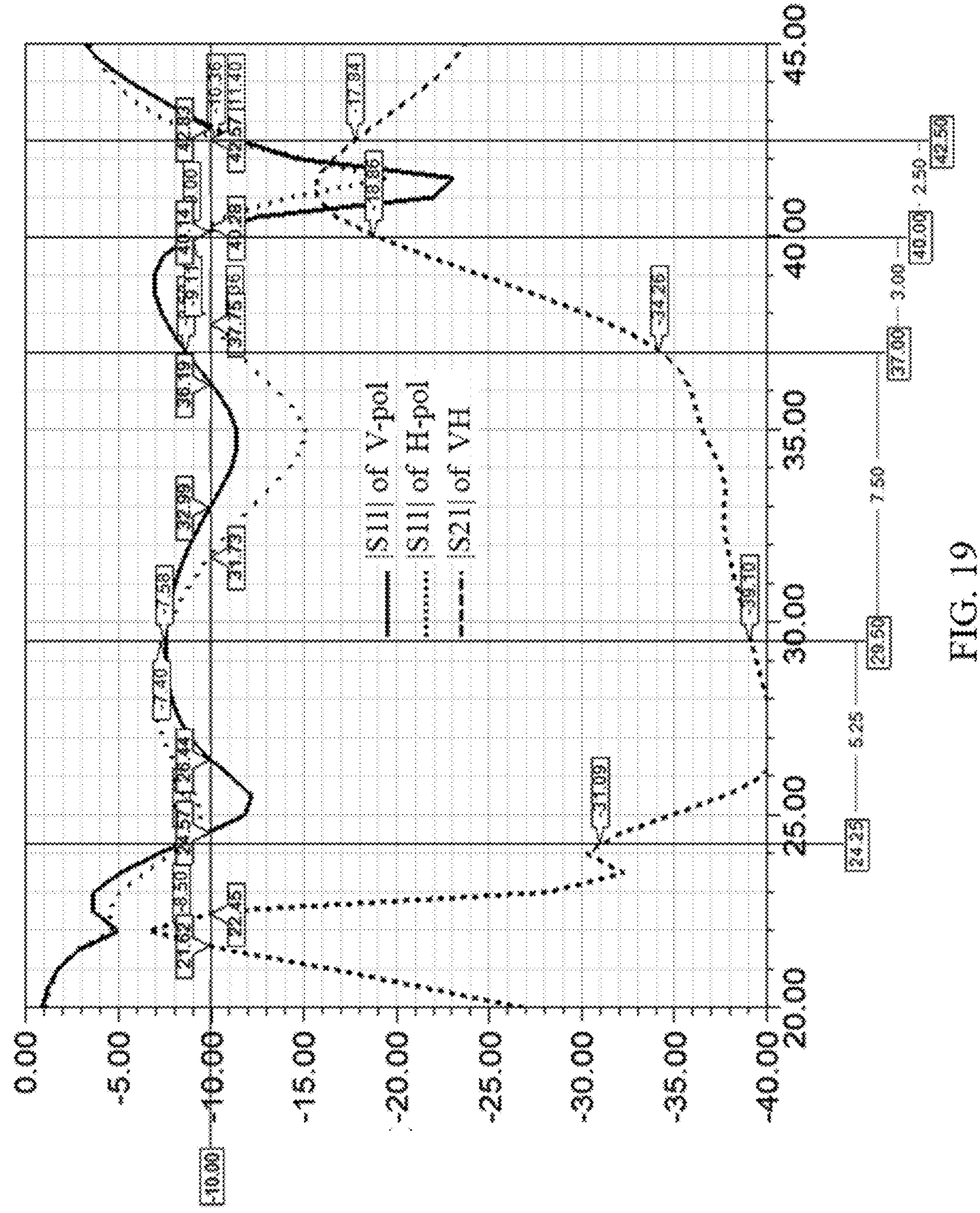
FIG. 19 is a curve graph of a return loss coefficient of the broadside antenna in the antenna module shown in FIG. 9.
Figure 20:
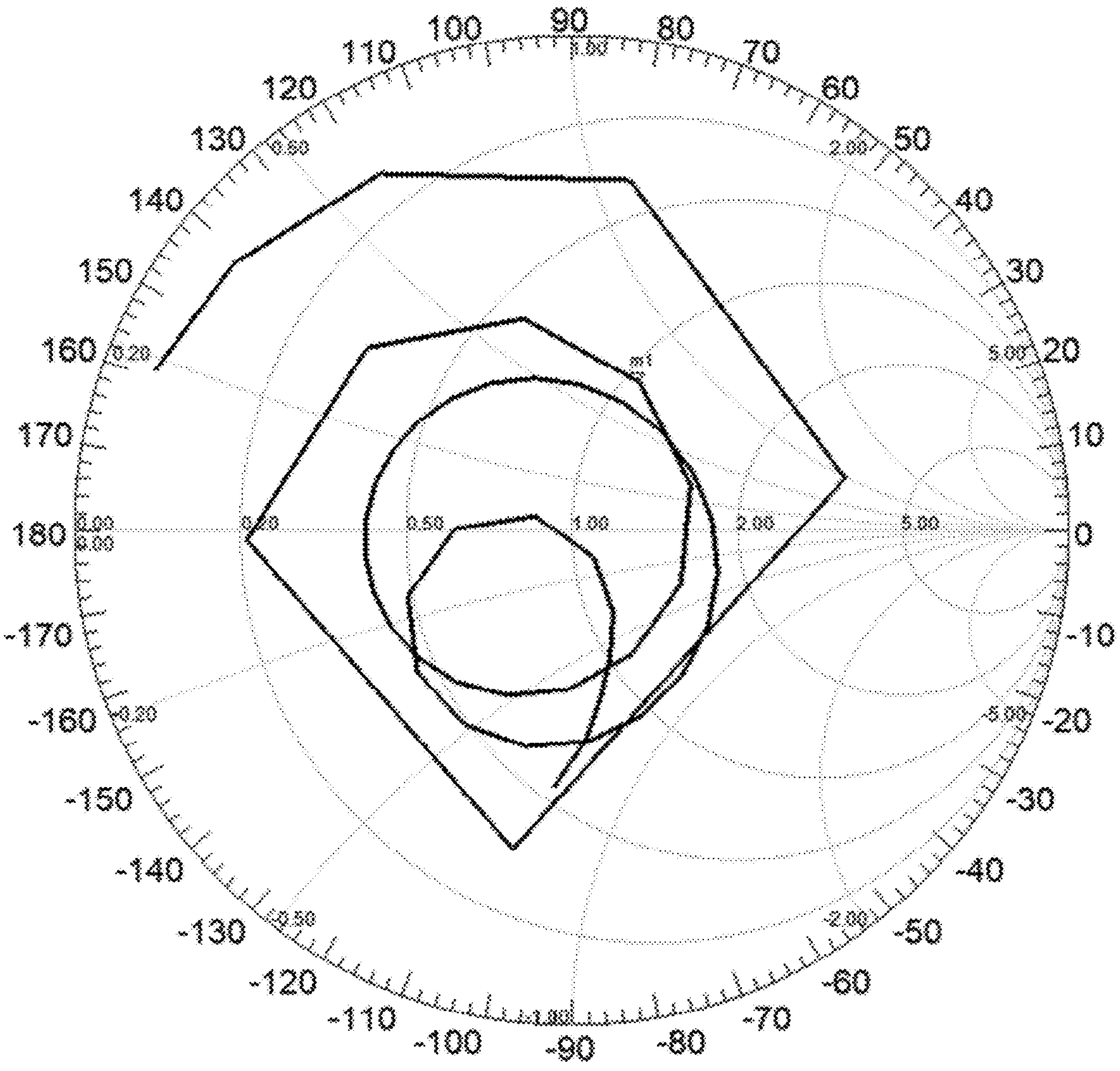
FIG. 20 is a Smith chart corresponding to the curve graph of the return loss coefficient shown in FIG. 19.

FIG. 19 is a curve graph of a return loss coefficient (S11) of the broadside antenna 722 in the antenna module 720 shown in FIG. 9, and FIG. 20 is a Smith chart corresponding to the curve graph of the return loss coefficient shown in FIG. 19. As shown in FIG. 19, horizontal coordinates are frequencies (in GHz), and vertical coordinates are return loss (return loss) coefficients (in dB).

In FIG. 19, a solid line represents a return loss coefficient curve of first polarized radiation of the broadside antenna 722, a dotted line represents a return loss coefficient curve of second polarized radiation of the broadside antenna 722, and a dashed line represents an S21 curve of the first polarized radiation and the second polarized radiation of the broadside antenna 722. The first polarization is vertical polarization, and the second polarization is horizontal polarization.

It can be learned from FIG. 19 that a working frequency band (a support frequency band) of the broadside antenna 722 is 24.25 GHz to 42.5 GHz, can support n257, n258, n259, n260, and n261, and can cover a 5G millimeter wave full band. In some other implementations, the working frequency band of the broadside antenna 722 may support one or more of bands n257, n258, n259, n260, and n261.

Fractional bandwidth (Fractional Bandwidth, FBW) of the broadside antenna 722=18.25/33.375=54.7%. The broadside antenna 722 shown in this embodiment of this application can reach ultra-wideband. In this case, at the lowest operating frequency 24.25 GHz, a reflection coefficient of the broadside antenna 722 is close to −10 dB. It should be noted that disposing of the first extension stub 32 and the second extension stub 42 greatly improves the reflection coefficient of the broadside antenna 722 at the lowest operating frequency 24.25 GHz, and reduces a requirement of the broadside antenna 722 for a clearance height.

With reference to the Smith chart in FIG. 20, it can be learned that, when impedance at the lowest operating frequency 24.25 GHz falls outside a band of a lower frequency, an over-high impedance point at 23 GHz is strongly filtered, and therefore the 50 ohm impedance point in the center of the Smith chart is forcibly pulled close. Therefore, the disposing of the first extension stub 32 and the second extension stub 42 improves the impedance matching and the reflection coefficient at the lowest operating frequency 24.25 GHz.

It can be learned from FIG. 19 that, in this embodiment of this application, the broadside antenna 722 is effectively excited to obtain magnetoelectric dipoles in three basic modes, which are respectively an electric dipole first mode (E-dipole 1st mode) in a first frequency band, a magnetic dipole first mode (M-dipole 1st mode) in a second frequency band, and an electric dipole second mode (E-dipole 2st mode) in a third frequency band. A minimum frequency in the second frequency band is higher than a maximum frequency in the first frequency band, and a minimum frequency in the third frequency band is higher than a maximum frequency in the second frequency band.

In the electric dipole first mode, an electromagnetic wave wavelength corresponding to the first frequency band is $\lambda_1$. In this case, in the broadside antenna 722, a distance $L_3$ (as shown in FIG. 11) between the first edge point $A_1$ of the fourth radiator 11*d* and the first edge point $A_1$ of the first radiator 11*a* of the radiation element group 10 is between $0.4\lambda_1$ and $0.6\lambda_1$, for example, $0.5\lambda_1$. The profile height (as shown in FIG. 14) H is between $0.1\lambda_1$, and $0.2\lambda_1$, for example, $0.12\lambda_1$. A length of the first extension stub 32 is a sum of $H_3+w_6+H_4$ (as shown in FIG. 16), and the sum of $H_3+w_6+H_4$ is between $0.3\lambda_1$ and $0.4\lambda_1$. A length of the second extension stub 42 is a sum of $H_7+w_9+H_8$ (as shown in FIG. 18), and the sum of $H_7+w_9+H_8$ is between $0.3\lambda_1$ and $0.4\lambda_1$.

Figure 21:
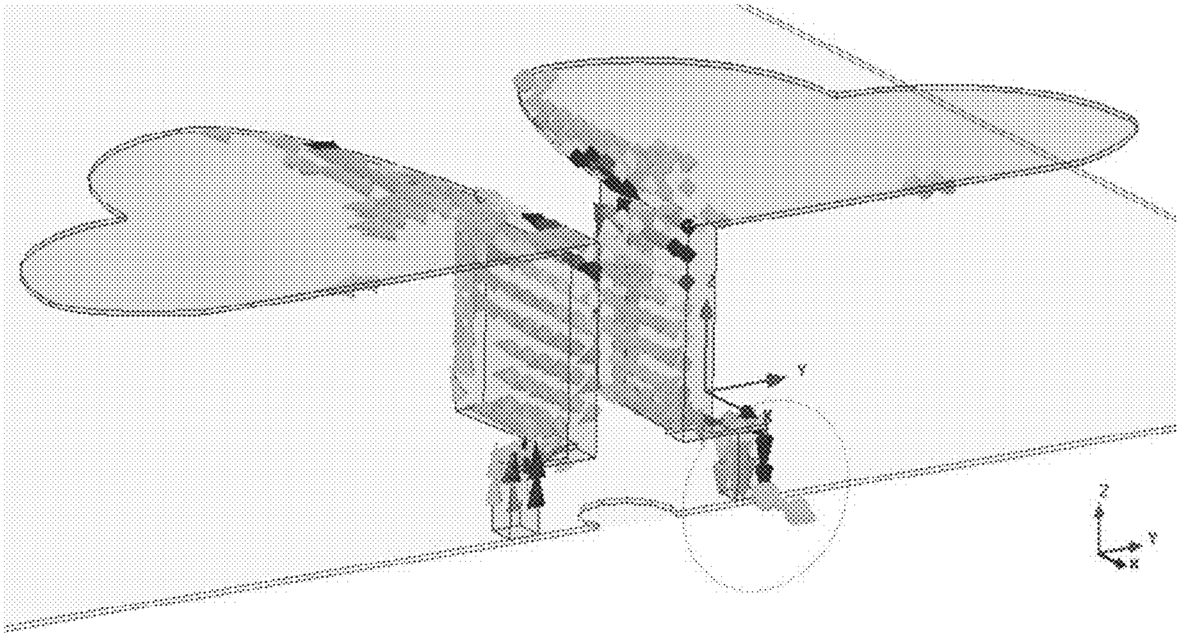
FIG. 21 is a current mode diagram of a partial structure of the broadside antenna in the antenna module shown in FIG. 9 at 21 GHz.

FIG. 21 is a current mode diagram of a partial structure of the broadside antenna 722 in the antenna module 720 shown in FIG. 9 at 21 GHz. It can be learned from FIG. 21 that, at the frequency of 21 GHz, no return current is formed on the broadside antenna 722, and the broadside antenna 722 is in the electric dipole first mode. In this case, the electromagnetic wave wavelength $\lambda_1$ is 7.6 mm.

In the magnetic dipole first mode, an electromagnetic wave wavelength corresponding to the second frequency band is $\lambda_2$. In this case, in the broadside antenna 722, a distance $L_4$ (as shown in FIG. 11) between the first edge point $A_1$ of the second radiator 11*b* and the first edge point $A_1$ of the fourth radiator 11*d* of the radiation element group 10 is between $0.4\lambda_2$ and $0.6\lambda_2$, for example, $0.5\lambda_2$. The profile height (as shown in FIG. 14) H is between $0.2\lambda_2$ and $0.3\lambda_2$, for example, $0.25\lambda_2$.

Figure 22:
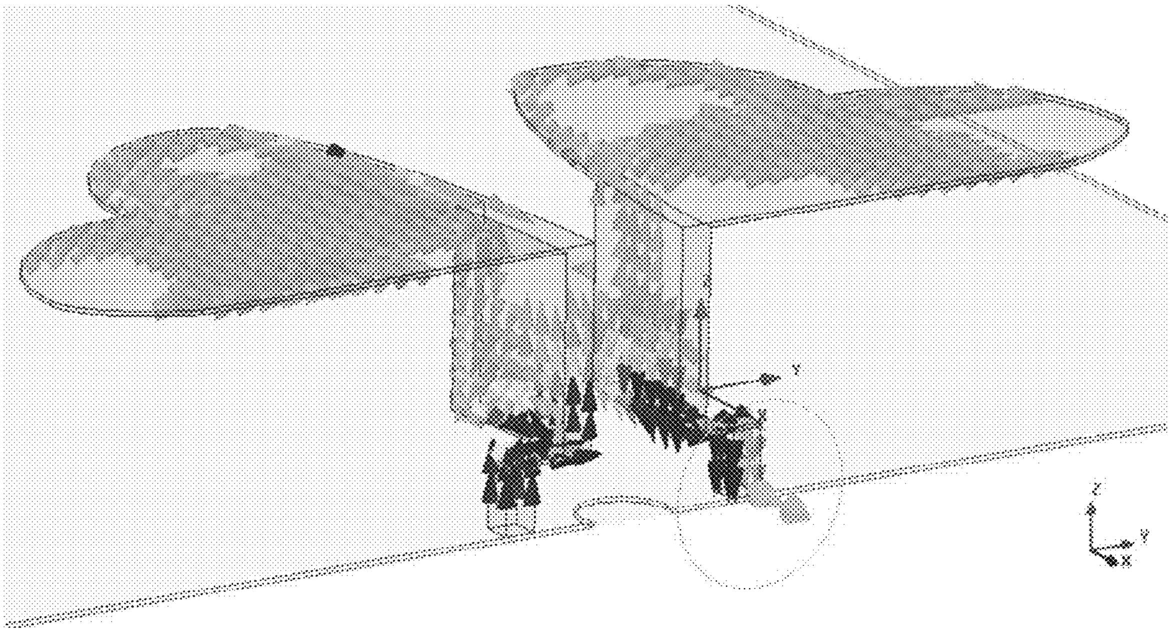
FIG. 22 is a current mode diagram of a partial structure of the broadside antenna in the antenna module shown in FIG. 9 at 29.5 GHz.

FIG. 22 is a current mode diagram of a partial structure of the broadside antenna 722 in the antenna module 720 shown in FIG. 9 at 29.5 GHz. It can be learned from 22 that, at the frequency of 29.5 GHz, a return current is formed on the broadside antenna 722, and the broadside antenna 722 is in the magnetic dipole first mode. In this case, the electromagnetic wave wavelength $\lambda_2$ is 5.4 mm.

In the electric dipole second mode, an electromagnetic wave wavelength corresponding to the third frequency band is $\lambda_3$. In this case, in the broadside antenna 722, the length $L_1$ (as shown in FIG. 10) of the first outer edge 111 and the second outer edge 112 of the radiator 11 of the radiation element group 10 is between $0.2\lambda_3$ and $0.3\lambda_3$, for example, $0.25\lambda_3$. The length $L_2$ (as shown in FIG. 10) of the first inner edge 113 and the second inner edge 114 is between $0.2\lambda_3$ and $0.3\lambda_3$, for example, $0.25\lambda_3$. The profile height (as shown in FIG. 14) H is between $0.2\lambda_3$ and $0.25\lambda 3$, for example, $0.22\lambda_2$. For example, in the electric dipole second mode, a frequency is 40 GHz, and in this case, the electromagnetic wave wavelength $\lambda_3$ is 4.0 mm.

It can be learned that the broadside antenna 722 shown in this embodiment of this application has an advantage of ultra-wideband, which can implement a design of a low-profile and dual-polarized antenna in a 5G millimeter wave full band.

Figure 23:
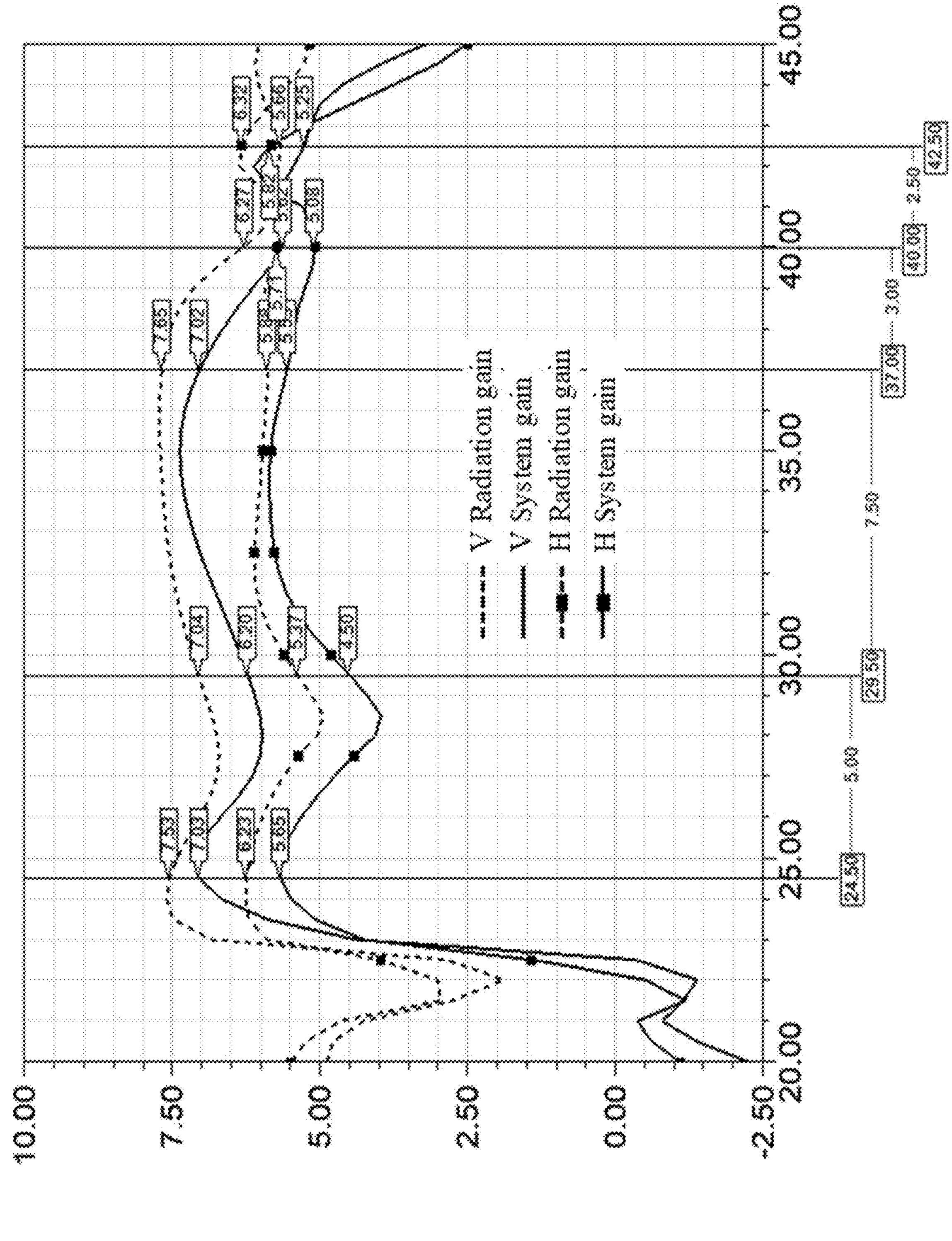
FIG. 23 is an efficiency curve graph of the broadside antenna in the antenna module shown in FIG. 9.
Figure 24A:
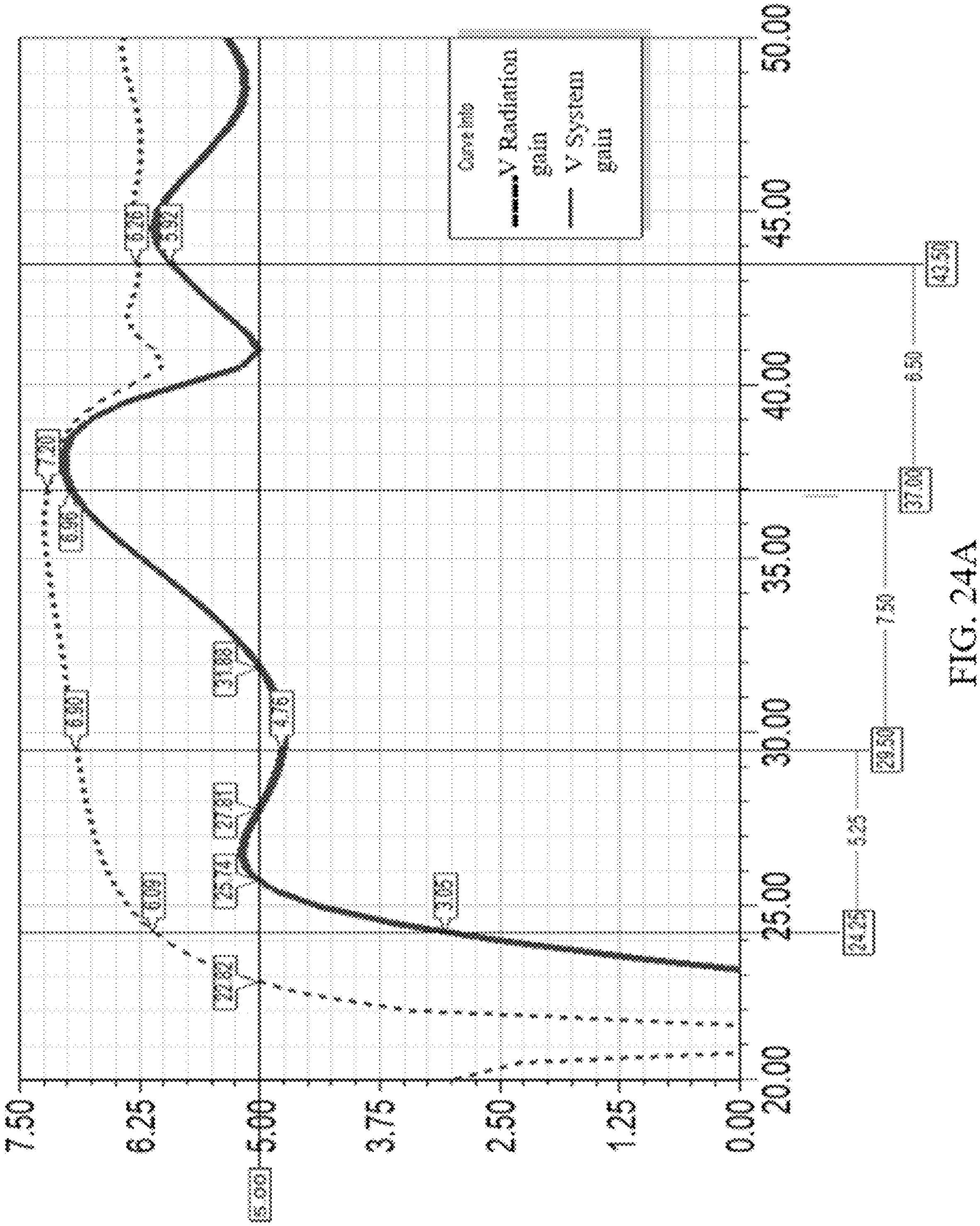
FIGS. 24(*a*)-(*c*) are efficiency curve graphs when the broadside antenna in the antenna module shown in FIG. 9 generates first polarized radiation and FIG. 24B shows a radiation pattern of the broadside antenna at a plurality of frequencies.
Figure 24B:
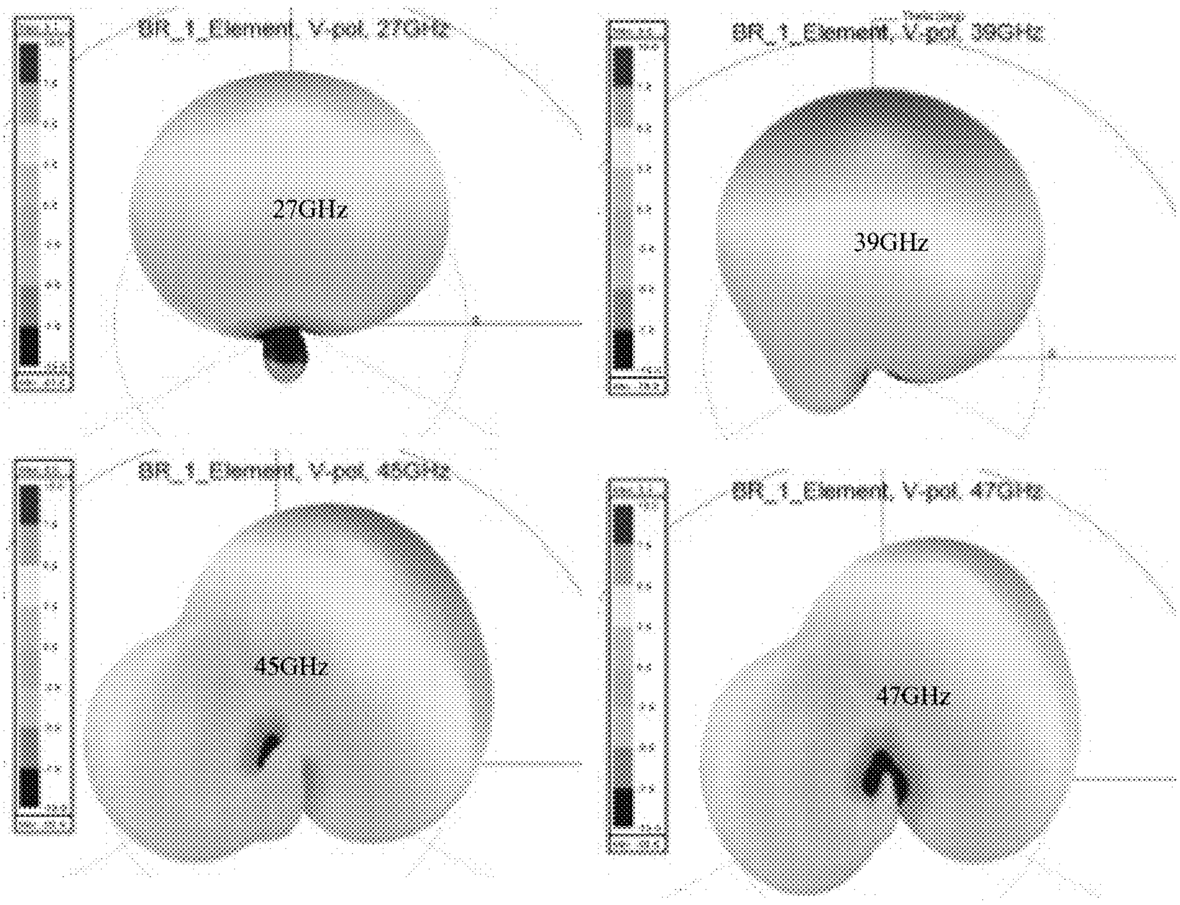

FIG. 23 is an efficiency curve graph of the broadside antenna 722 in the antenna module 720 shown in FIG. 9, and FIGS. 24(*a*)-(*c*) are efficiency curve graph when the broadside antenna 722 in the antenna module 720 shown in FIG. 9 generates first polarized radiation and FIG. 24B shows a radiation pattern of the broadside antenna 722 at a plurality of frequencies. As shown in FIG. 23 and FIGS. 24(*a*)-(*c*), horizontal coordinates are frequencies (in GHz), and vertical coordinates are efficiency parameters (in dB). The first polarization is vertical polarization.

It can be learned from FIG. 23 that a system gain of the broadside antenna 722 at the lowest frequency 24.0 GHz is greater than 6 dB, which helps improve signal transmission stability of the broadside antenna 722 during operation. It can be learned from FIGS. 24(*a*)-(*c*) that, at frequencies 27 GHZ, 39 GHz, 45 GHZ, and 47 GHz, a radiation pattern of the broadside antenna 722 shown in this application can maintain a vertical radiation pattern, and the radiation pattern of the broadside antenna 722 has no vertical pattern null. In this case, the broadside antenna 722 has an advantage of pattern consistency at a plurality of frequencies, and can perform antenna array pattern combination, which helps improve an antenna gain, and meets requirements of an antenna array subunit.

Figure 25A:
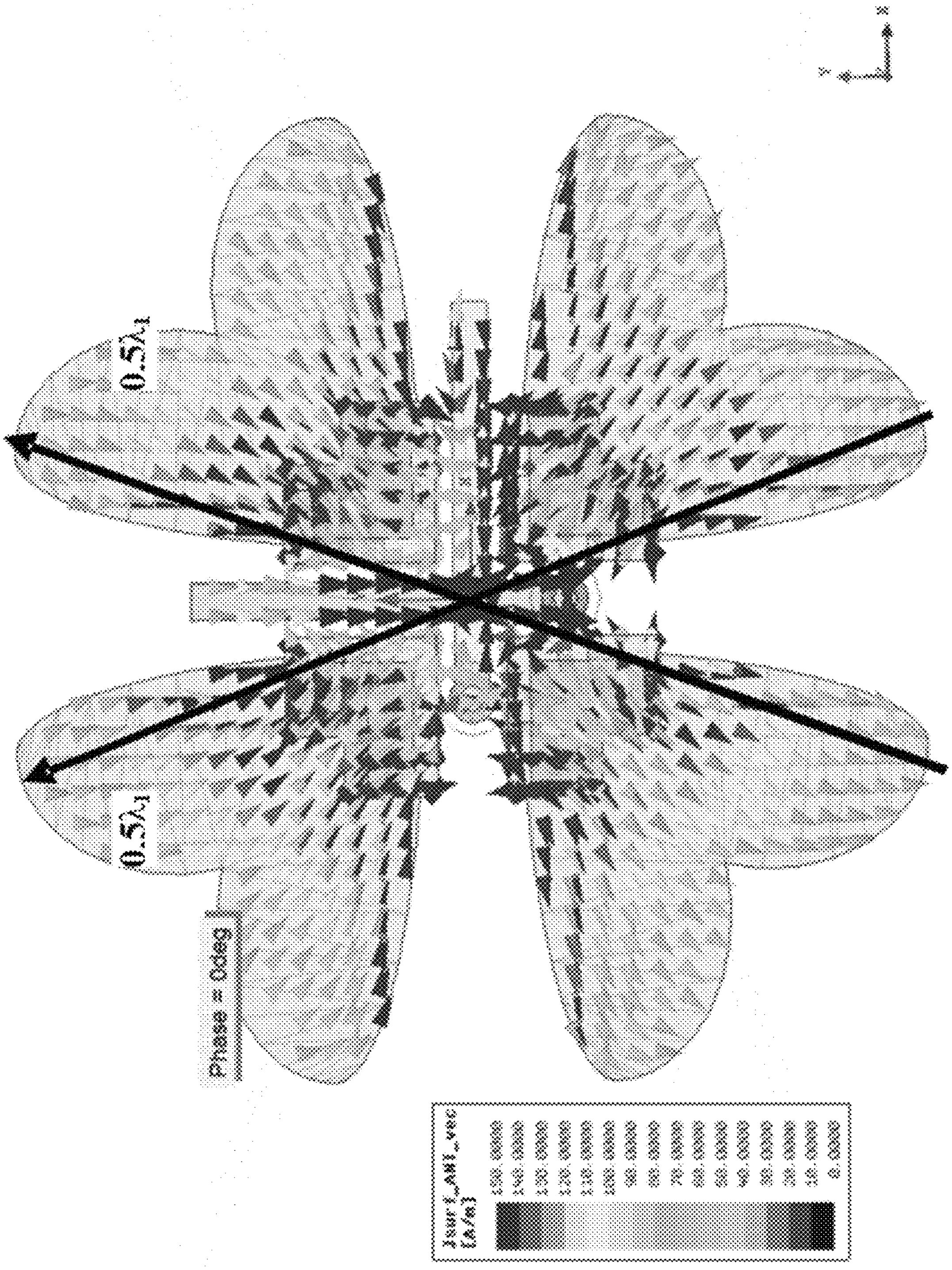
FIGS. 25(*a*)-25(*c*) are first polarized antenna current mode diagrams of the broadside antenna in the antenna module shown in FIG. 9 in three basic modes.
Figure 25B:
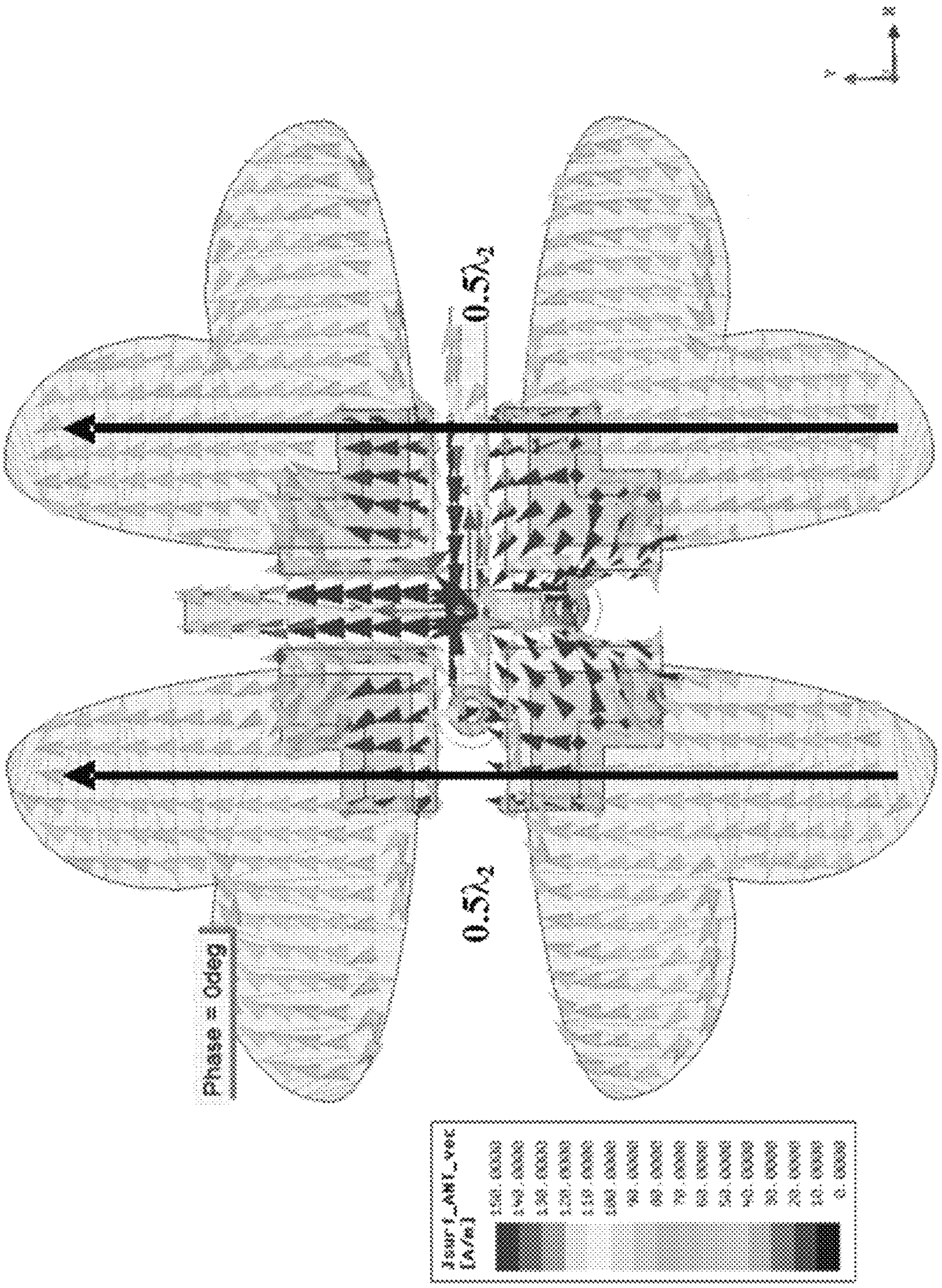
Figure 25C:
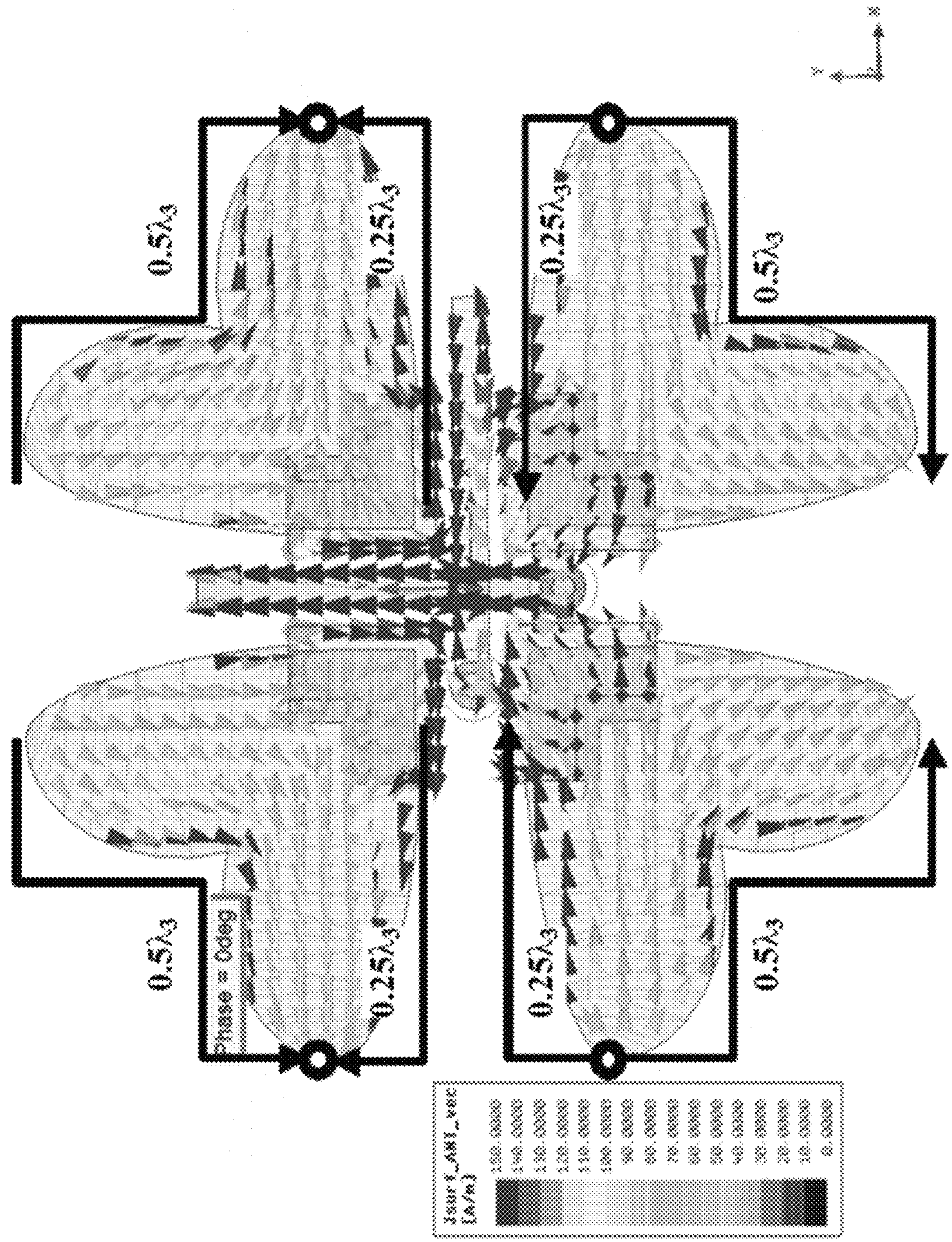
Figure 26A:
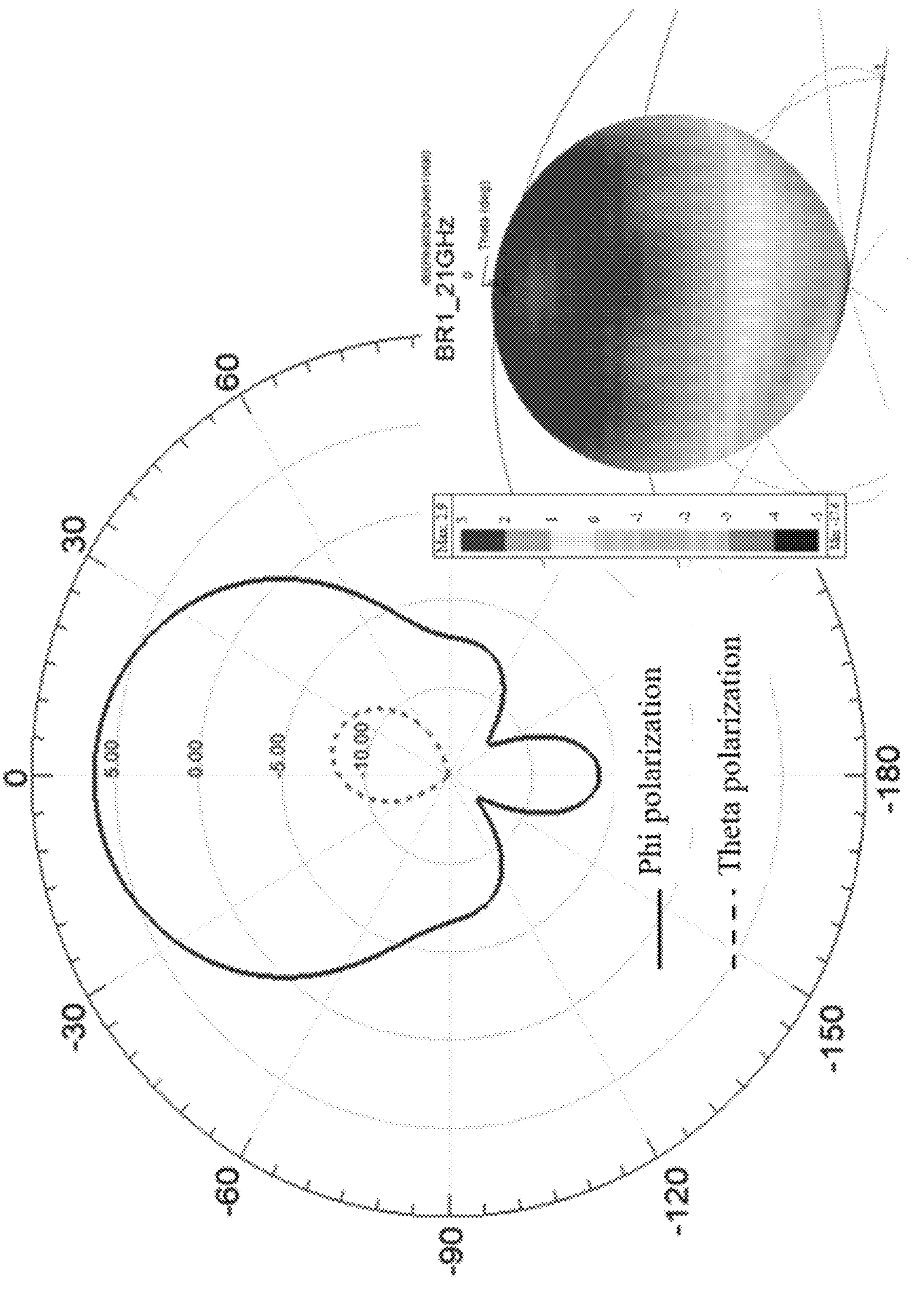
FIGS. 26(*a*)-(*c*) are schematic diagrams of radiation patterns corresponding to the first polarized current mode diagrams shown in FIGS. 25(*a*)-25(*c*)
Figure 26B:
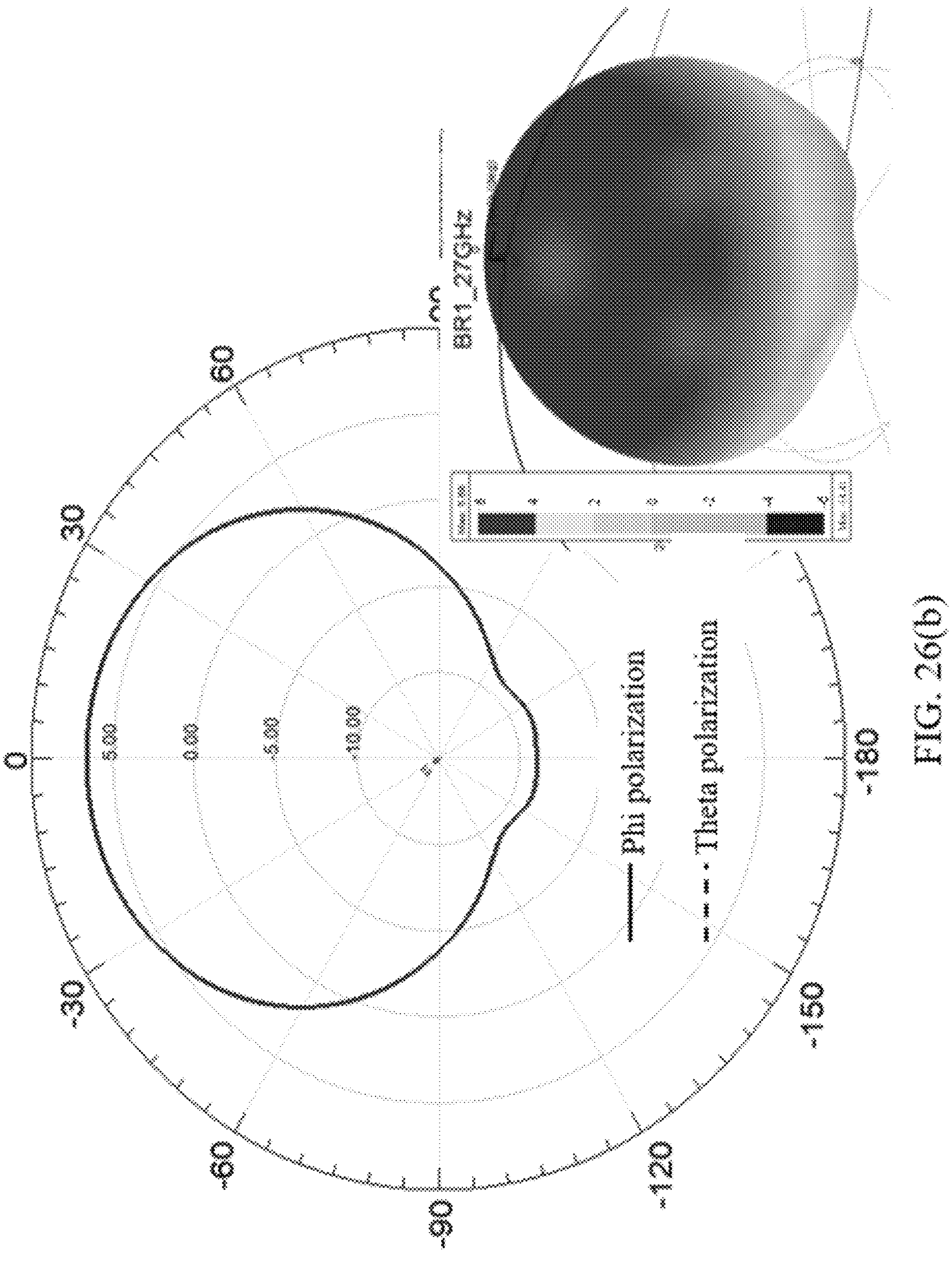
Figure 26C:
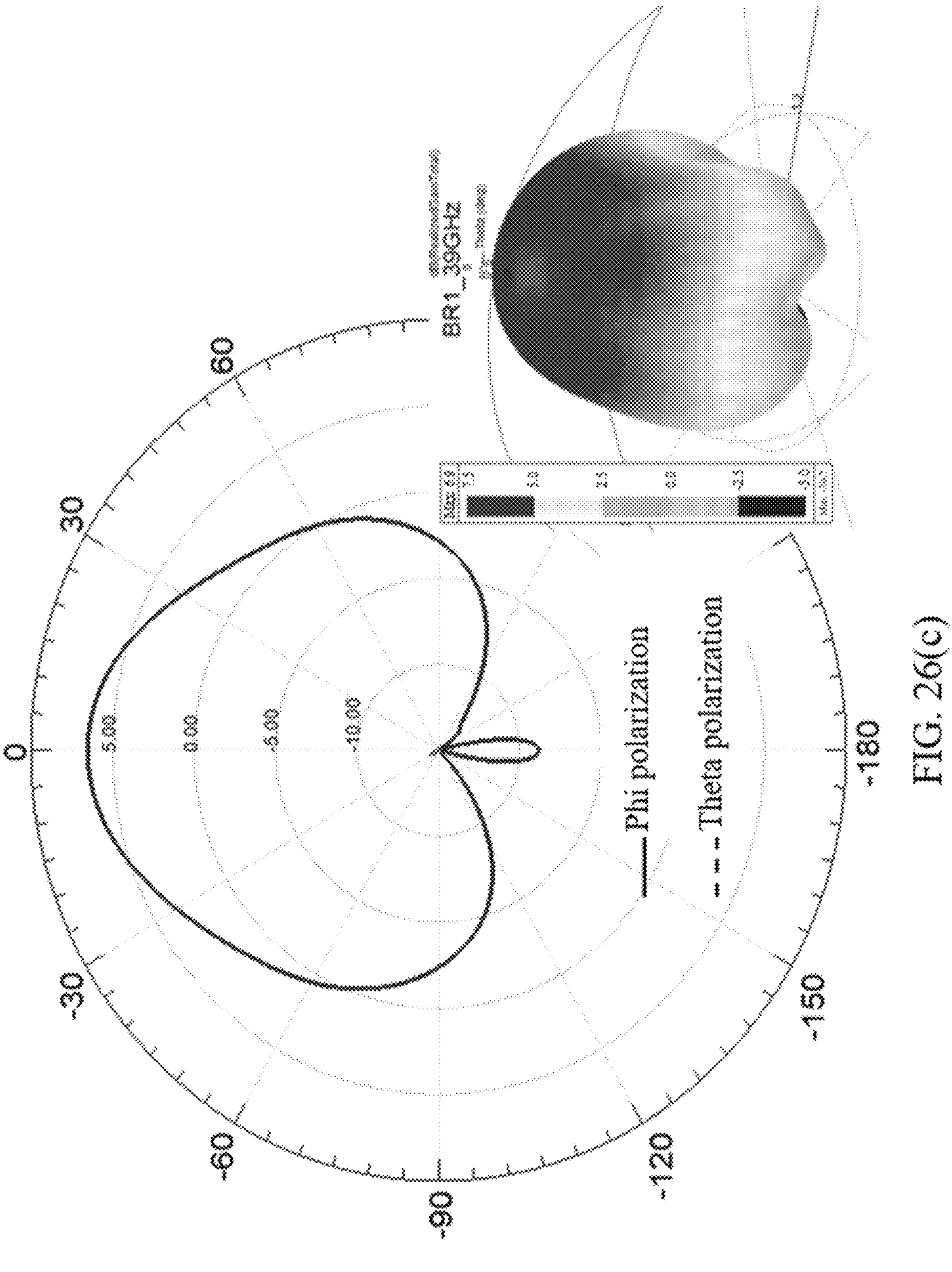

FIGS. 25(*a*)-(*c*) are first polarized antenna current mode diagrams of the broadside antenna 722 in the antenna module 720 shown in FIG. 9 in three basic modes, and FIGS. 26(*a*)-(*c*), are schematic diagrams of a radiation pattern corresponding to the first polarized antenna current mode diagram shown in FIGS. 25(*a*)-(*c*). FIG. 25(*a*) and FIG. 26(*a*) are schematic diagrams diagram at a frequency of 21 GHz, FIG. 25(*b*) and FIG. 26(*b*) are schematic diagrams diagram at a frequency of 29.5 GHZ, and FIG. 25(*c*) and FIG. 26(*c*) are schematic diagrams diagram at a frequency of 40 GHz. The first polarization is vertical polarization.

It can be learned from FIGS. 25(*a*)-(*c*) and FIGS. 26(*a*)-(*c*) that both the electric dipole first mode and the magnetic dipole first mode are basic modes, and radiation currents of left and right lobes on the radiator 10 are in a same direction, to form a uniform vertical radiation pattern. However, the electric dipole second mode is a second-order frequency multiplication mode of the electric dipole first mode. Due to a convection current, it is not easy to form a uniform vertical radiation pattern. However, in the broadside antenna 722 shown in this embodiment of this application, currents (with a current path length of 0.5λ3) generated by two codirectional electric dipoles of upper and lower lobes mainly contribute a current in the first direction, and a magnetic dipole structure in the middle is designed into a structure in which reverse currents (with a current path length of 0.25λ3) in the second direction above and below a groove cancel each other, so that pure polarized radiation in the first direction can be obtained, and the uniform vertical radiation pattern can be maintained.

Figure 27A:
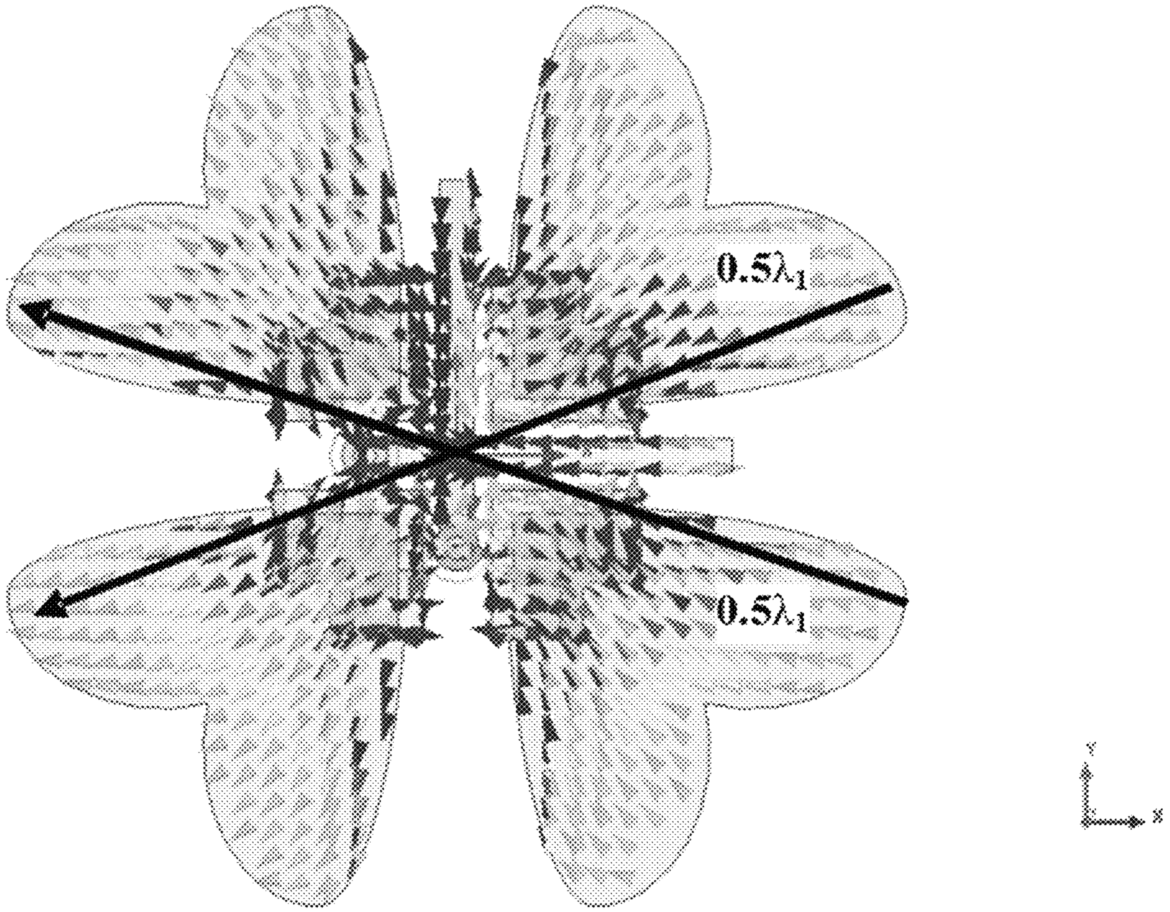
FIGS. 27(*a*)-(*c*) are second polarized antenna current mode diagrams of the broadside antenna in the antenna module shown in FIG. 9 in three basic modes.
Figure 27B:
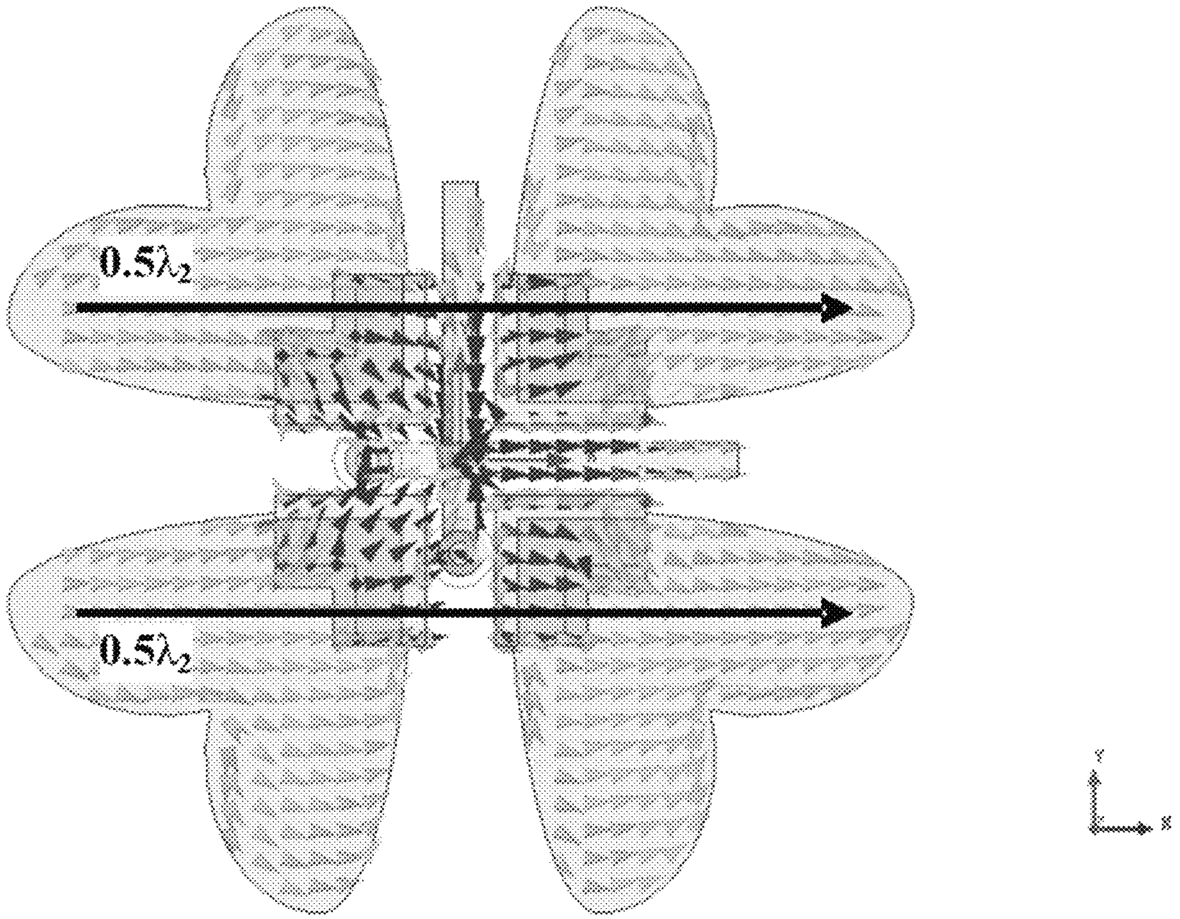
Figure 27C:
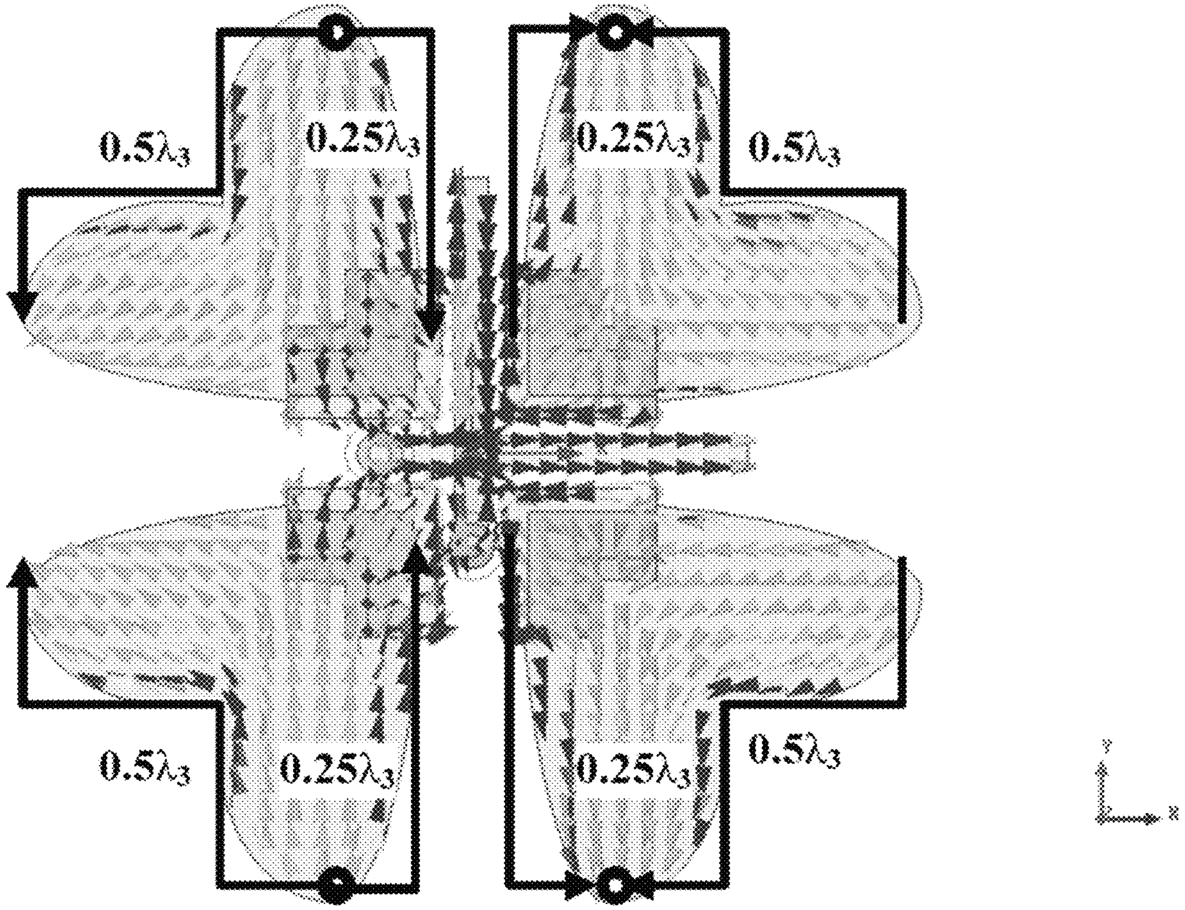
Figure 28A:
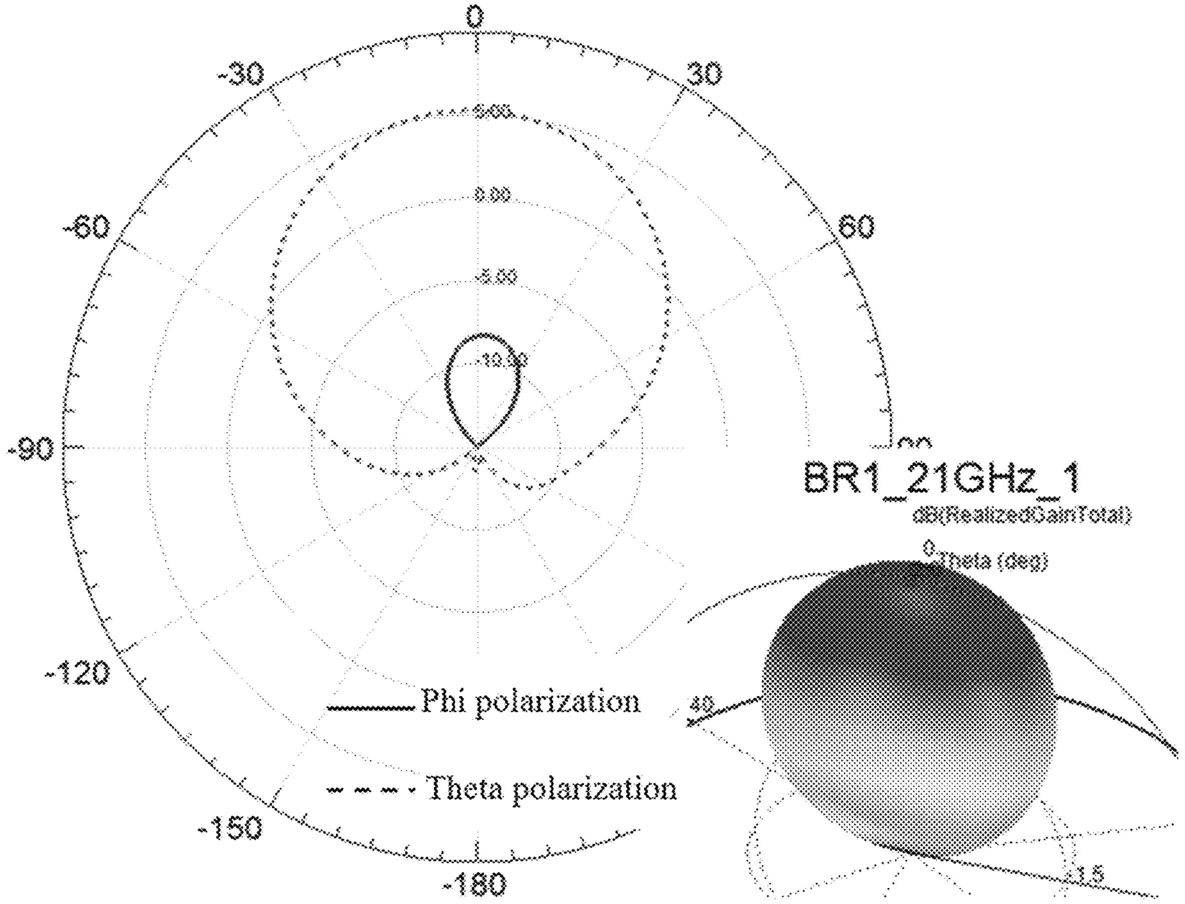
FIGS. 28(*a*)-(*c*) are schematic of a radiation pattern corresponding to the second polarized antenna current mode diagrams shown in FIGS. 27(*a*)-(*c*)
Figure 28B:
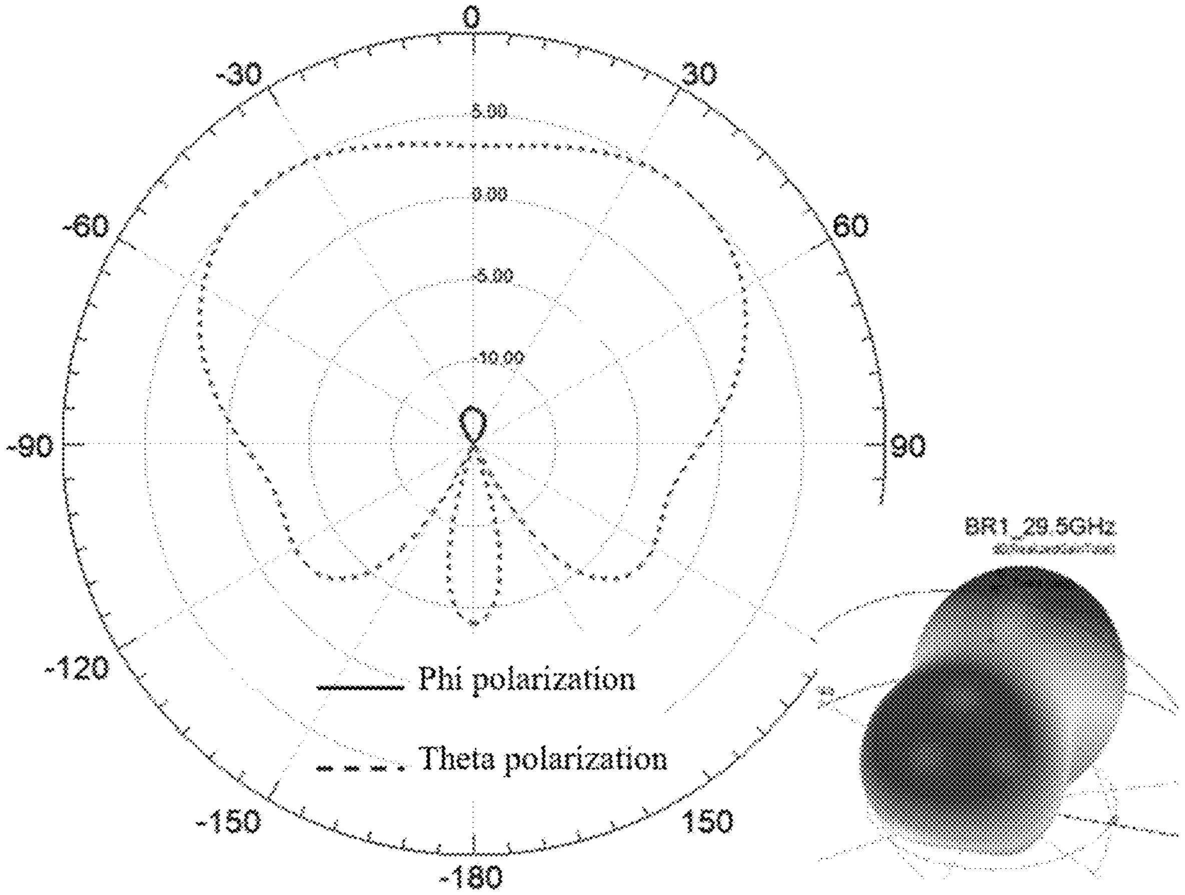
Figure 28C:
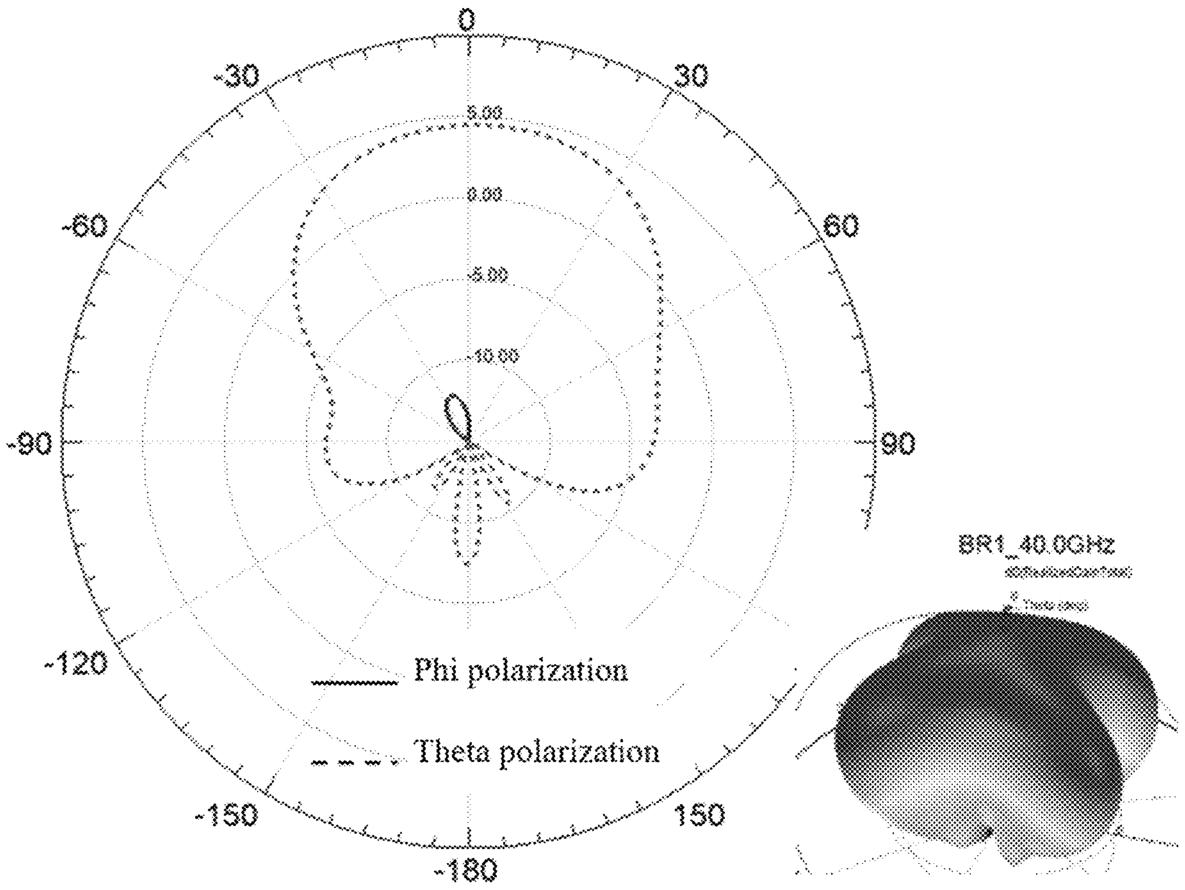

FIGS. 27(*a*)-(*c*) are second polarized antenna current mode diagrams of the broadside antenna 722 in the antenna module 720 shown in FIG. 9 in three basic modes, and FIGS. 28A, 28B and 28C are schematic diagrams of a radiation pattern corresponding to the second polarized antenna current mode diagrams shown in FIGS. 27(*a*)-(*c*). FIG. 27(*a*) and FIG. 28(*a*) are schematic diagrams at a frequency of 21 GHz, FIG. 27(*b*) and 28(*b*) are schematic diagrams at a frequency of 29.5 GHZ, and FIG. 27(*c*) and FIG. 28(*c*) are schematic diagrams at a frequency of 40 GHz. The second polarization is horizontal polarization.

It can be learned from FIGS. 27(*a*)-(*c*) and FIGS. 28(*a*)-(*c*) that both the electric dipole first mode and the magnetic dipole first mode are basic modes, and radiation currents of upper and lower lobes on the radiator 10 are in a same direction, to form a uniform vertical radiation pattern. However, the electric dipole second mode second-order frequency multiplication mode of the electric dipole first mode. Due to a convection current, it is not easy to form a uniform vertical radiation pattern. However, in the broadside antenna 722 shown in this embodiment of this application, currents (with a current path length of 0.5λ3) generated by two codirectional electric dipoles of left and right lobes mainly contribute a current in the second direction, and a magnetic dipole structure in the middle is designed into a structure in which reverse currents (with a current path length of 0.25λ3) in the first direction on the left and right of a groove cancel each other, so that pure polarized radiation in the second direction can be obtained, and the uniform vertical radiation pattern can be maintained.

Figure 29:
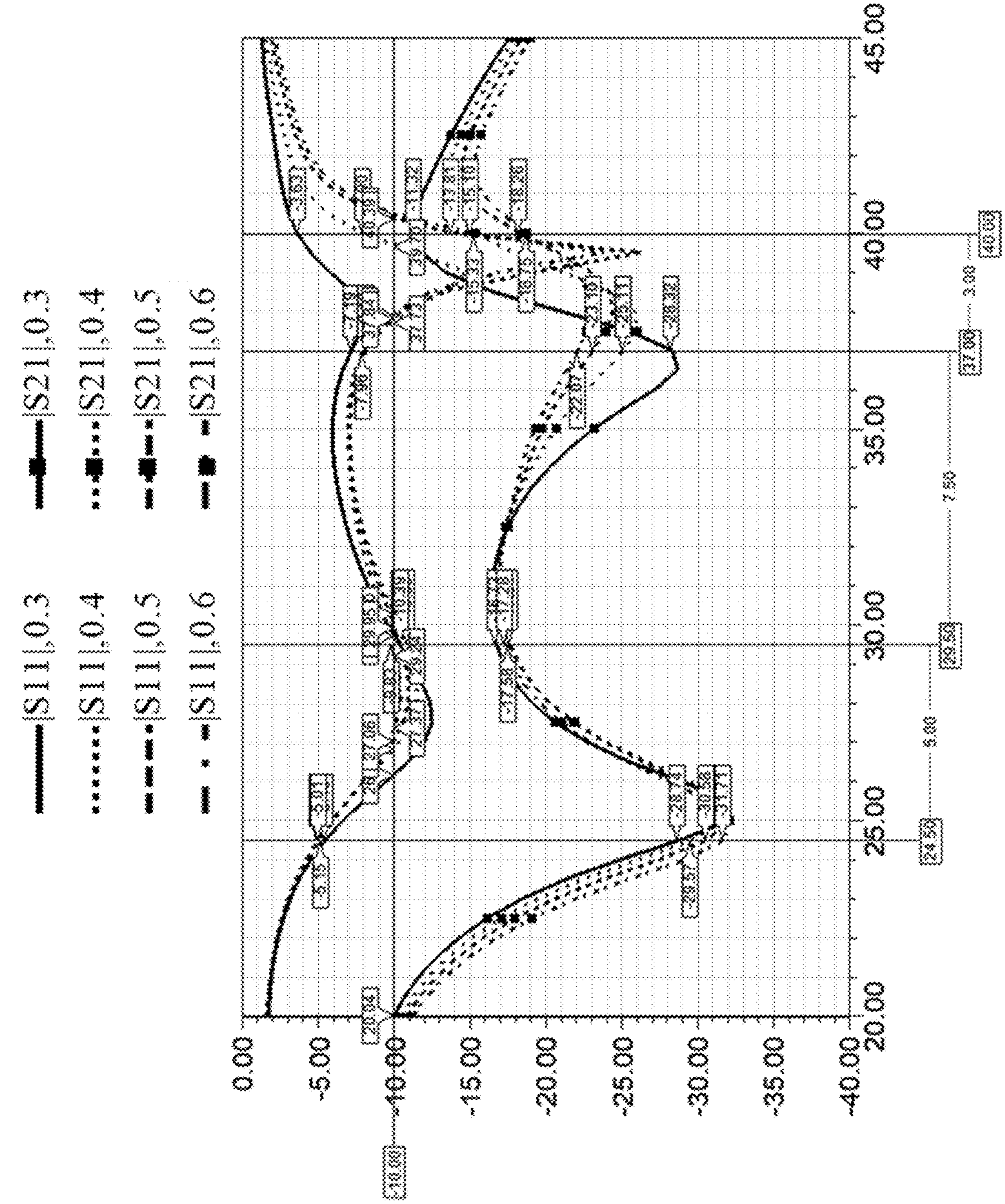
FIG. 29 is a curve graph of a return loss coefficient of the broadside antenna when a semi-minor axis of a first edge of the radiator of the broadside antenna in the antenna module shown in FIG. 9 is of different sizes.
Figure 30:
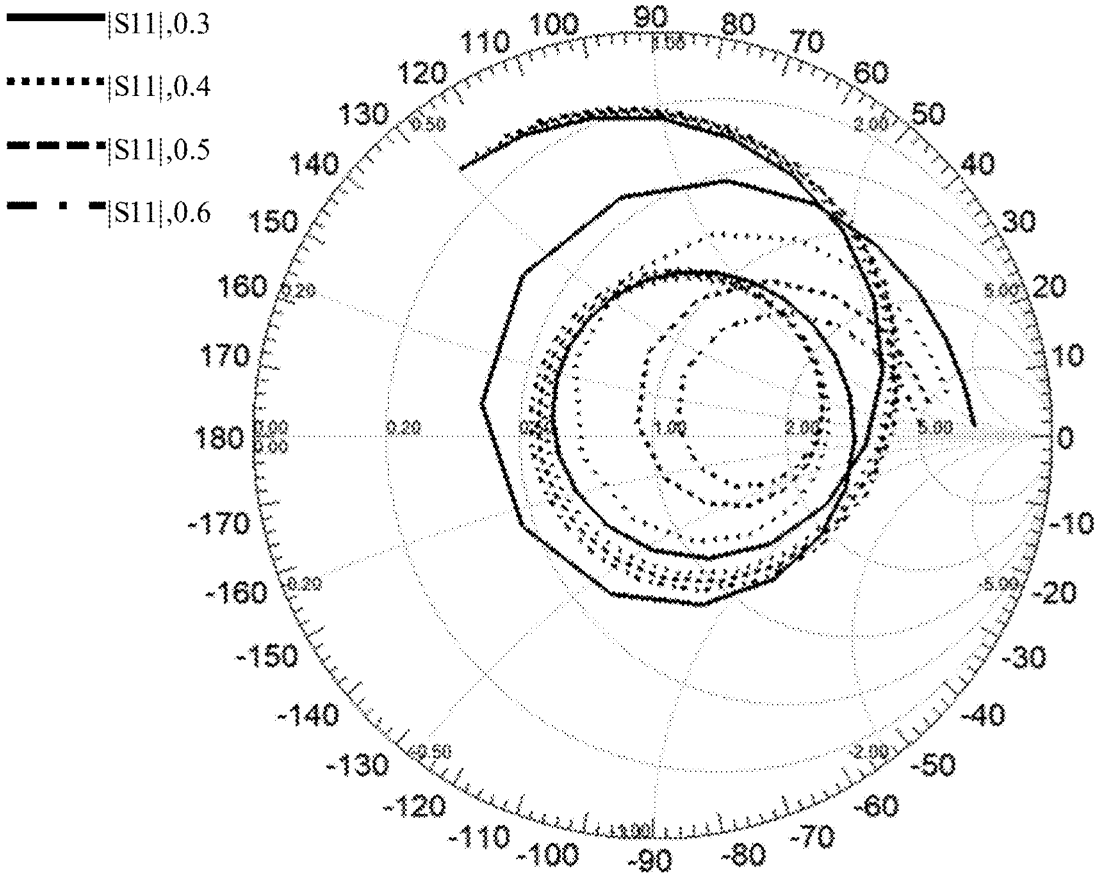
FIG. 30 is an impedance chart corresponding to the curve graph of the return loss coefficient shown in FIG. 29.

FIG. 29 is a curve graph of a return loss coefficient of the broadside antenna 722 when the semi-minor axis $b_1$ of the first outer edge 111 of the radiator 11 of the broadside antenna 722 in the antenna module 720 shown in FIG. 9 is of different sizes, and FIG. 30 is an impedance chart corresponding to the curve graph of the return loss coefficient shown in FIG. 29.

In FIG. 29, horizontal coordinates are frequencies (in GHz), and vertical coordinates are return loss coefficients (in dB). It can be learned from FIG. 29 that, when a size of the semi-minor axis $b_1$ of the first outer edge 111 changes among four sizes: 0.3 mm, 0.4 mm, 0.5 mm, and 0.6 mm, a frequency of the electric dipole first mode of the broadside antenna 722 correspondingly changes. Specifically, as the semi-minor axis of the first edge gradually increases, the frequency of the electric dipole first mode of the broadside antenna 722 gradually increases.

Figure 31:
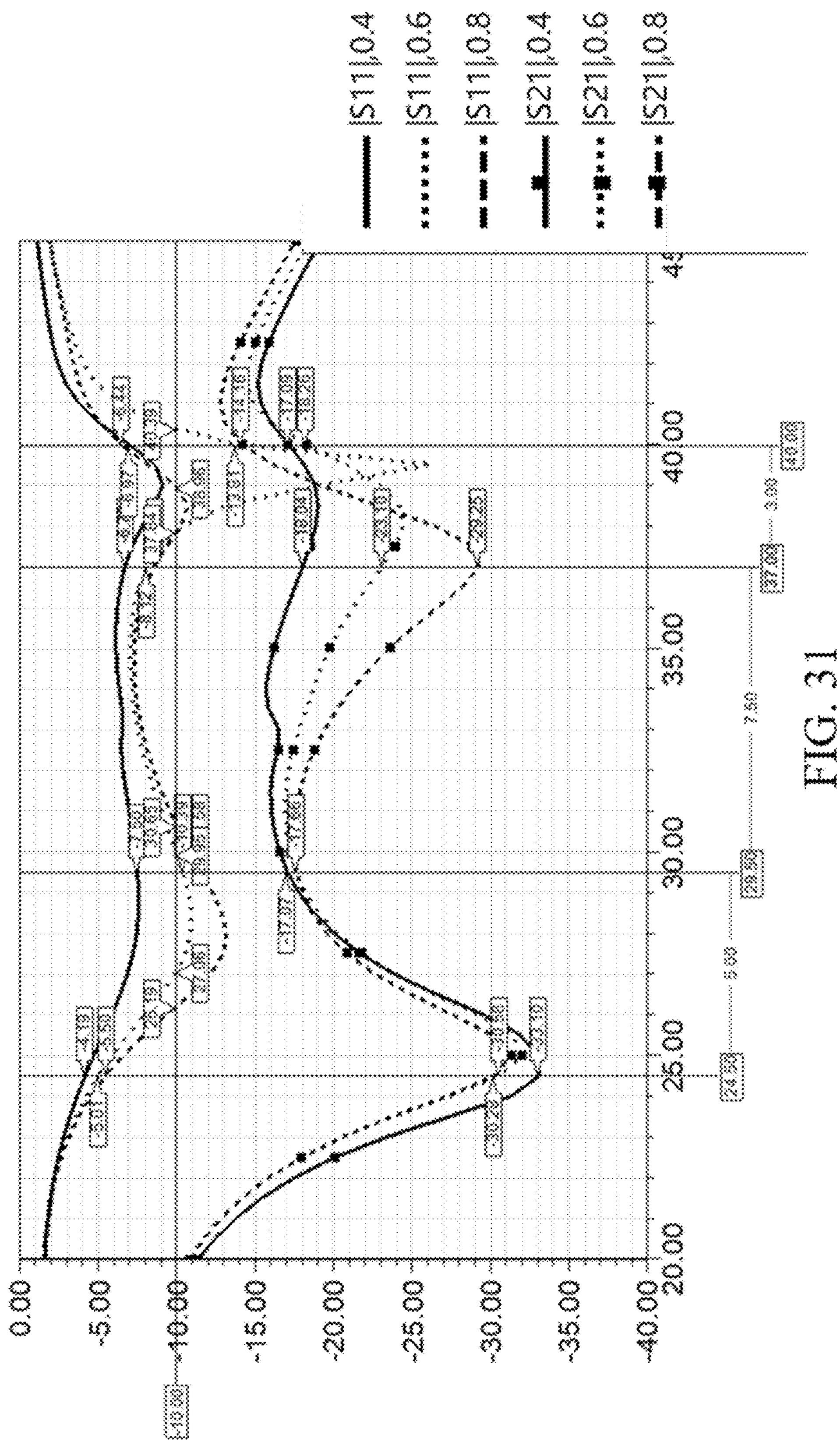
FIG. 31 is a curve graph of a return loss coefficient of the broadside antenna when a semi-minor axis of a third edge of the radiator of the broadside antenna in the antenna module shown in FIG. 9 is of different sizes.
Figure 32:
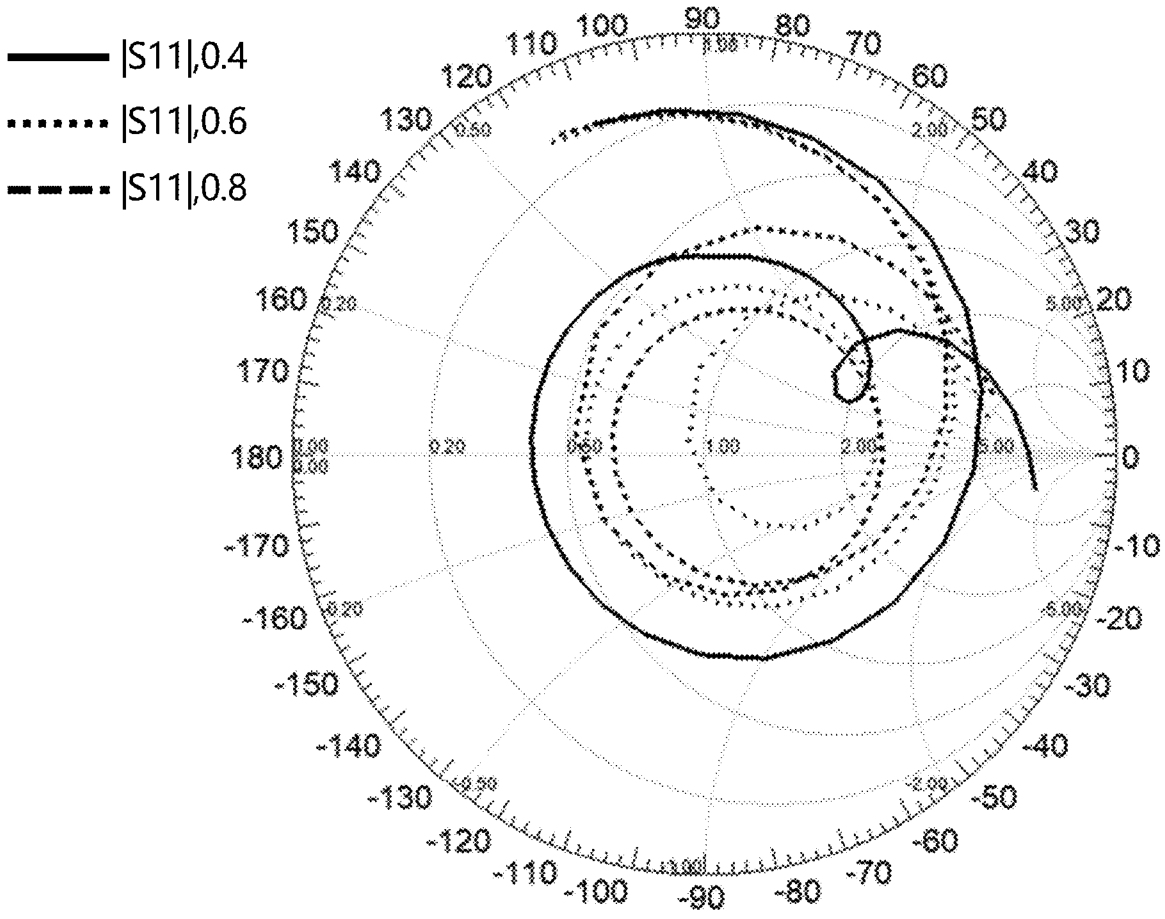
FIG. 32 is an impedance chart corresponding to the curve graph of the return loss coefficient shown in FIG. 31.

FIG. 31 is a curve graph of a return loss coefficient of the broadside antenna 722 when the semi-minor axis $b_2$ of the first inner edge 113 of the radiator 11 of the broadside antenna 722 in the antenna module 720 shown in FIG. 9 is of different sizes, and FIG. 32 is an impedance chart corresponding to the curve graph of the return loss coefficient shown in FIG. 31.

In FIG. 31, horizontal coordinates are frequencies (in GHz), and vertical coordinates are return loss coefficients (in dB). It can be learned from FIG. 29 that, when a size of the semi-minor axis $b_2$ of the first inner edge 113 changes among three sizes: 0.4 mm, 0.6 mm, and 0.8 mm, a return loss coefficient of a frequency of the electric dipole second mode of the broadside antenna 722 correspondingly changes.

Figure 33:
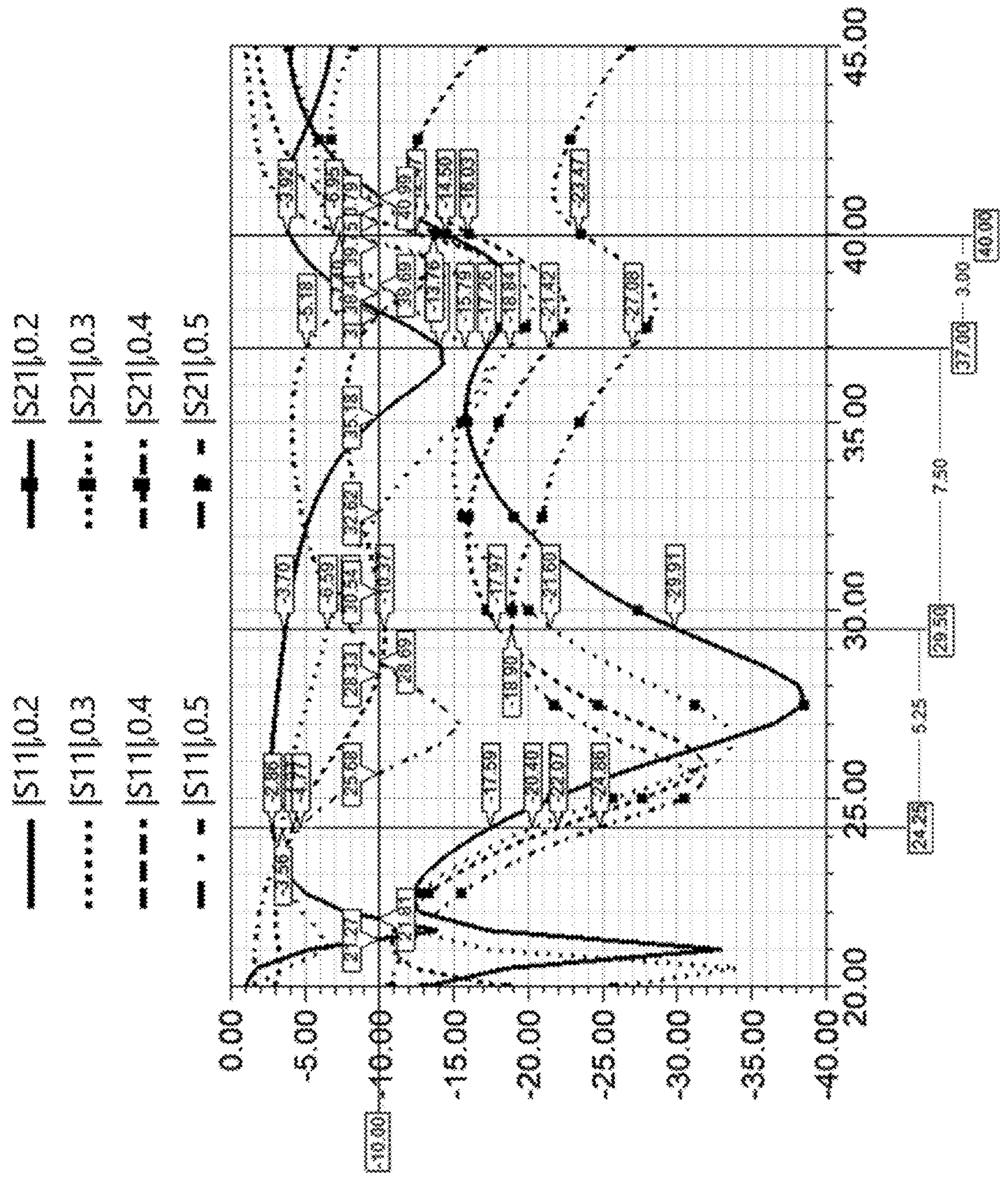
FIG. 33 is a curve graph of a return loss coefficient of the broadside antenna when a misalignment distance of a grounding stub of the broadside antenna in the antenna module shown in FIG. 9 is of different sizes.
Figure 34:
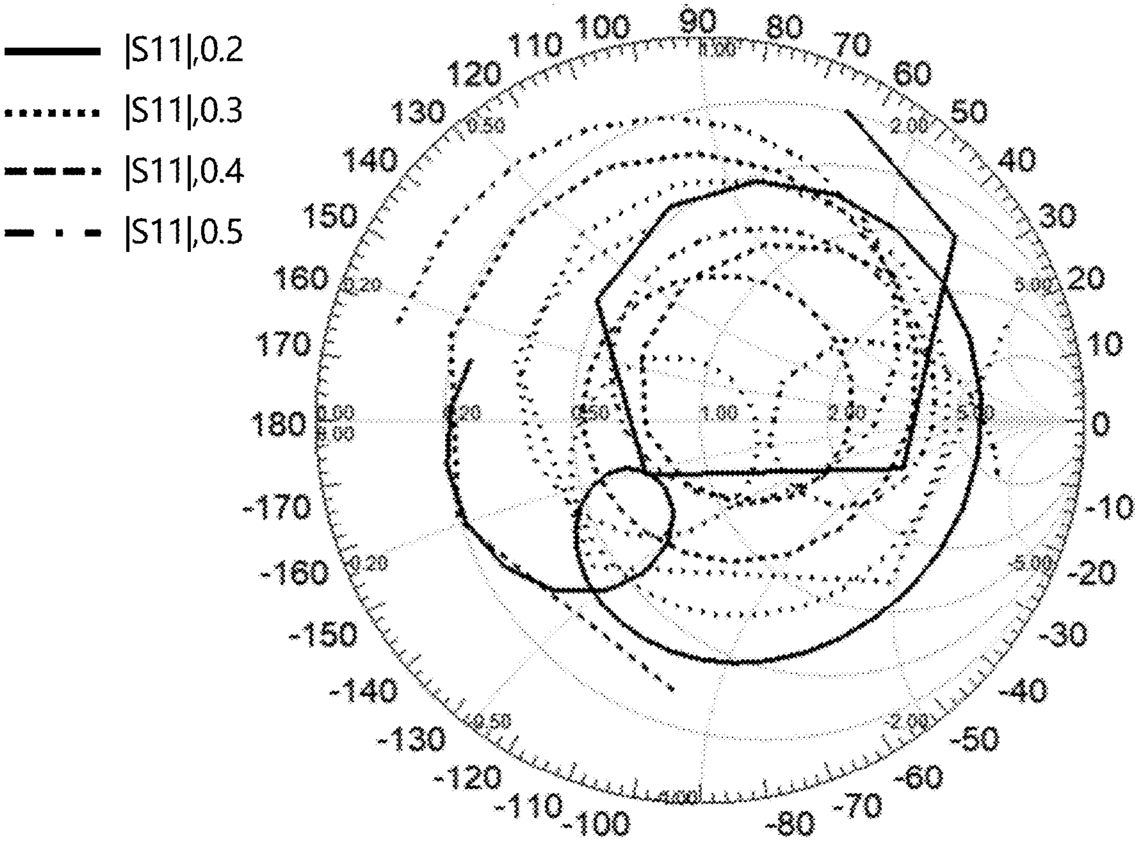
FIG. 34 is an impedance chart corresponding to the curve graph of the return loss coefficient shown in FIG. 33.

FIG. 33 is a curve graph of a return loss coefficient of the broadside antenna 722 when the misalignment distance $w_1$ of the grounding stub 21 of the antenna module 720 shown in FIG. 9 is of different sizes, and FIG. 34 is an impedance chart corresponding to the curve graph of the return loss coefficient shown in FIG. 33.

In FIG. 33, horizontal coordinates are frequencies (in GHz), and vertical coordinates are return loss coefficients (in dB). It can be learned from FIG. 29 that, when a size of the misalignment distance $w_1$ of the grounding stub 21 of the grounding element group 20 changes among four sizes: 0.2 mm, 0.3 mm, 0.4 mm, and 0.5 mm, a frequency of the electric dipole second mode of the broadside antenna 722 correspondingly changes.

Figure 35:
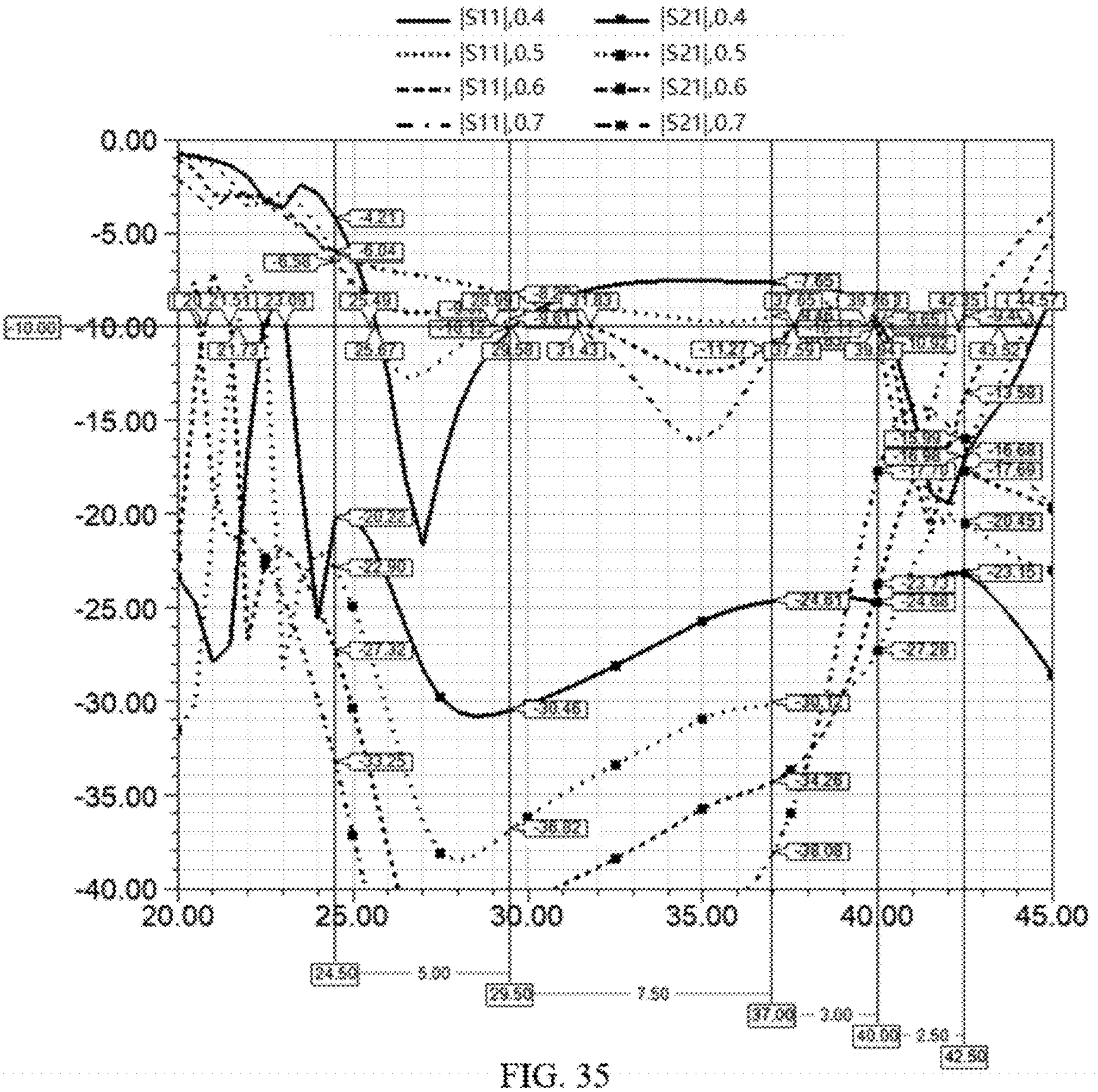
FIG. 35 is a curve graph of a return loss coefficient of the broadside antenna when a width of a second extension part of a second excitation element of the broadside antenna in the antenna module shown in FIG. 9 is of different sizes.
Figure 36:
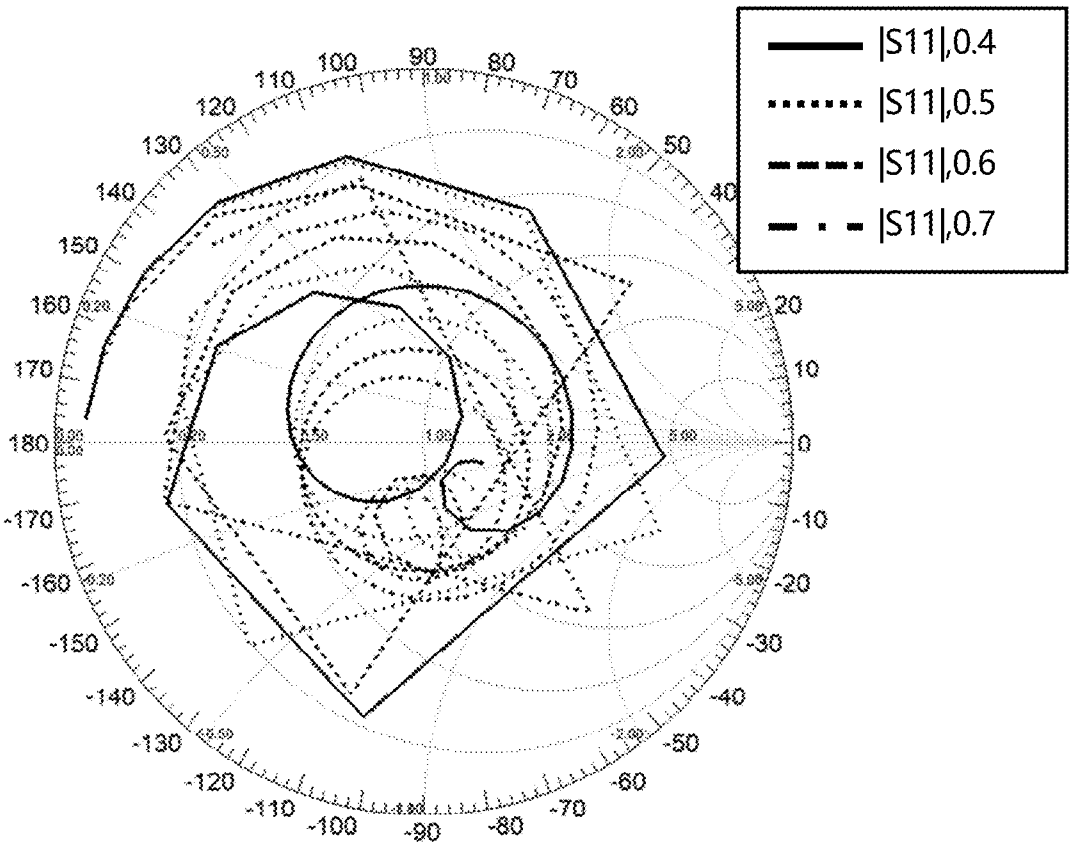
FIG. 36 is an impedance chart corresponding to the curve graph of the return loss coefficient shown in FIG. 35.

FIG. 35 is a curve graph of a return loss coefficient of the broadside antenna 722 when the width $w_9$ of the second extension part 422 of the second excitation element 40 of the broadside antenna 722 in the antenna module 720 in FIG. 9 is of different sizes, and FIG. 36 is an impedance chart corresponding to the curve graph of the return loss coefficient shown in FIG. 35.

In FIG. 35, horizontal coordinates are frequencies (in GHz), and vertical coordinates are return loss coefficients (in dB). It can be learned from FIG. 35 and FIG. 36 that, when the width $w_9$ of the second extension part 422 changes among four sizes: 0.4 mm, 0.5 mm, 0.6 mm, and 0.7 mm, a frequency of the electric dipole first mode of the broadside antenna 722 correspondingly changes. It should be understood that, by adjusting the width $w_9$ of the second extension part 422, not only a resonance frequency mode that is not required by the operating band can be adjusted, but also impedance matching of the electric dipole first mode of the broadside antenna 722 can be improved, which improves a reflection coefficient, and further expands support bandwidth of the broadside antenna 722.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Embodiments of this application and features in embodiments may be mutually combined provided that no conflict occurs. Therefore, the protection scope of this application shall be subject to the protection scope of the claims.

What is claimed is:

1. A broadside antenna, comprising:

a first radiation element;

a second radiation element, wherein the first radiation element and the second radiation element are arranged at a first interval in a first direction, a first gap extending in a second direction is formed between the first radiation element and the second radiation element, the second direction is different from the first direction, the first radiation element is provided with a first sub-gap in connection with the first gap, the second radiation element is provided with a second sub-gap in connection with the first gap, and both the first sub-gap and the second sub-gap extend in the first direction;

a first grounding element and a second grounding element arranged at a second interval in the first direction, wherein a first end of the first grounding element is connected to a side of the first radiation element adjacent to the second radiation element, a second end of the first grounding element is configured to connect to a grounding surface, a first end of the second grounding element is connected to a side of the second radiation element adjacent to the first radiation element, and a second end of the second grounding element is configured to connect to the grounding surface; and a first excitation element comprising a first feeding structure and a first extension stub arranged at a third interval in the first direction, wherein the first feeding structure comprises a first feed-in part and a first feeding part, the first feed-in part is connected to a side of the first feeding part facing the grounding surface, the first feed-in part is located in the first sub-gap and is configured to connect to a feed source, a first part of the first feeding part is located in the first gap, a second part of the first feeding part is located in the second sub-gap, the first extension stub is located in the first sub-gap, the first extension stub comprises a first grounding part adjacent to the first feed-in part, and the first grounding part is configured to connect to the grounding surface.

2. The broadside antenna according to claim 1, wherein:

the first extension stub further comprises a first extension part and a second extension part;

both the first grounding part and the second extension part are located on a side of the first extension part facing the grounding surface; and the first grounding part is connected to a side of the first extension part adjacent to the first feeding structure, and the second extension part is connected to a side of the first extension part facing away from the first feeding structure.

3. The broadside antenna according to claim 1, wherein:

the first radiation element comprises a first radiator and a second radiator arranged at a fourth interval in the second direction, the first sub-gap is formed between the first radiator and the second radiator, the second radiation element comprises a third radiator and a fourth radiator arranged at a fifth interval in the second direction, and the second sub-gap is formed between the third radiator and the fourth radiator;

a third sub-gap extending in the second direction is formed between the first radiator and the third radiator, a fourth sub-gap extending in the second direction is formed between the second radiator and the fourth radiator, the first gap comprises the third sub-gap, the fourth sub-gap, and a fifth sub-gap, and the fifth sub-gap communicates the first sub-gap and the second sub-gap and communicates the third sub-gap and the fourth sub-gap; and the broadside antenna further comprises a second excitation element comprising a second feeding structure and a second extension stub that are arranged at a sixth interval in the second direction, the second feeding structure comprises a second feed-in part and a second feeding part, the second feed-in part is connected to a side of the second feeding part facing a connection surface, the second feed-in part is located in the third sub-gap and is configured to connect to the feed source, a first part of the second feeding part is located in the fifth sub-gap and crosses the first feeding part, a second part of the second feeding part is located in the fourth sub-gap, the second extension stub is located in the third sub-gap, the second extension stub comprises a second grounding part adjacent to the second feed-in part, and the second grounding part is configured to connect to the grounding surface.

4. The broadside antenna according to claim 3, wherein:

the second extension stub further comprises a third extension part and a fourth extension part;

both the second grounding part and the fourth extension part are located on a side of the third extension part facing the grounding surface;

the second grounding part is connected to a side of the third extension part adjacent the second feeding structure; and a first end of the second grounding part facing away from the third extension part is a second grounding end, and the fourth extension part is connected to a side of the third extension part facing away from the second feeding structure.

5. The broadside antenna according to claim 3, wherein the first radiator, the second radiator, the third radiator, and the fourth radiator are of a same structure.

6. The broadside antenna according to claim 5, wherein the first radiator, the second radiator, the third radiator, and the fourth radiator are arranged in a configuration having a shape of a four-leaf clover.

7. The broadside antenna according to claim 3, wherein a width of the first sub-gap gradually increases in a direction from an inner side to an outer side of the first sub-gap;

a width of the second sub-gap gradually increases in a direction from an inner side to an outer side of the second sub-gap;

a width of the third sub-gap gradually increases in a direction from an inner side to an outer side of the third sub-gap; and a width of the fourth sub-gap gradually increases in a direction from an inner side to an outer side of the fourth sub-gap.

8. The broadside antenna according to claim 3, wherein:

the first grounding element comprises a first grounding stub and a second grounding stub arranged at a seventh interval in the second direction, a first end of the first grounding stub is connected to a side of the first radiator adjacent to the second radiator, a second end of the first grounding stub is configured to connect to the grounding surface, a first end of the second grounding stub is connected to a side of the second radiator adjacent to the first radiator, and a second end of the second grounding stub is configured to connect to the grounding surface; and the second grounding element comprises a third grounding stub and a fourth grounding stub arranged at an eighth interval in the second direction, a first end of the third grounding stub is connected to a side of the third radiator adjacent to the fourth radiator, a second end of the third grounding stub is configured to connect to the grounding surface, the fourth grounding stub is connected to a side the fourth radiator adjacent to the third radiator, and a second end of the fourth grounding stub is configured to connect to the grounding surface.

9. The broadside antenna according to claim 8, wherein the first grounding stub, the second grounding stub, the third grounding stub, and the fourth grounding stub are of a same structure.

10. The broadside antenna according to claim 9, wherein the first grounding stub comprises a first part, a second part, and a third part that are sequentially connected, the first part is located on a side of the second part facing away from the grounding surface, an end of the first part facing away from the second part is connected to the first radiator, the third part is located on a side of the second part facing the grounding surface, an end of the third part facing away from the second part is configured to connect to the grounding surface, and the first part is misaligned with the third part in a third direction, wherein the third direction is different from the first direction and the second direction.

11. The broadside antenna according to claim 3, wherein the broadside antenna has an electric dipole first mode in a first frequency band, a wavelength corresponding to the first frequency band is $\lambda_1$, and a profile height of the broadside antenna is between $0.1\lambda_1$ and $0.2\lambda_1$.

12. The broadside antenna according to claim 11, wherein the broadside antenna has a magnetic dipole first mode in a second frequency band, and a minimum frequency in the second frequency band is higher than a maximum frequency in the first frequency band.

13. The broadside antenna according to claim 12, wherein the broadside antenna has an electric dipole second mode in a third frequency band, and a minimum frequency in the third frequency band is higher than a maximum frequency in the second frequency band.

14. The broadside antenna according to claim 13, wherein a wavelength corresponding to the third frequency band is $\lambda_3$, the first radiator is heart-shaped, the first radiator has two inner edges and two outer edges, both the inner edges and the outer edges have an elliptical arc shape, and lengths of both the inner edges and the outer edges are between $0.2\lambda_3$ and $0.3\lambda_3$.

15. The broadside antenna according to claim 1, wherein a working frequency band of the broadside antenna supports at least one of bands n257, n258, n259, n260, or n261.

16. An antenna in package, comprising:

a broadside antenna comprising:

a first radiation element and a second radiation element arranged at a first interval in a first direction, a first gap extending in a second direction is formed between the first radiation element and the second radiation element, the second direction is different from the first direction, the first radiation element is provided with a first sub-gap in connection with the first gap, the second radiation element is provided with a second sub-gap in connection with the first gap, and both the first sub-gap and the second sub-gap extend in the first direction, a first grounding element and a second grounding element arranged at a second interval in the first direction, wherein a first end of the first grounding element is connected to a side of the first radiation element adjacent to the second radiation element, a second end of the first grounding element is configured to connect to a grounding surface, a first end of the second grounding element is connected to a side of the second radiation element adjacent to the first radiation element, and a second end of the second grounding element is configured to connect to the grounding surface, and a first excitation element comprising a first feeding structure and a first extension stub that are arranged at a third interval in the first direction, wherein the first feeding structure comprises a first feed-in part and a first feeding part, the first feed-in part is connected to a side of the first feeding part facing the grounding surface, the first feed-in part is located in the first sub-gap and is configured to connect to a feed source, a first part of the first feeding part is located in the first gap, a second part of the first feeding part is located in the second sub-gap, the first extension stub is located in the first sub-gap, the first extension stub comprises a first grounding part adjacent to the first feed-in part, and the first grounding part is configured to connect to the grounding surface; and a transmitter or receiver chip configured to send an electromagnetic wave signal to the broadside antenna or receive an external electromagnetic wave signal received by the broadside antenna.

17. The antenna in package according to claim 16, wherein the antenna in package further comprises a substrate, and the broadside antenna is embedded inside the substrate.

18. A communication device, comprising:

a housing; and an antenna in package located on an inner side of the housing, the antenna in package comprising:

a broadside antenna comprising:

a first radiation element and a second radiation element, wherein the first radiation element and the second radiation element are arranged at a first interval in a first direction, a first gap extending in a second direction is formed between the first radiation element and the second radiation element, the second direction is different from the first direction, the first radiation element is provided with a first sub-gap in connection with the first gap, the second radiation element is provided with a second sub-gap in connection with the first gap, and both the first sub-gap and the second sub-gap extend in the first direction;

a first grounding element and a second grounding element arranged at a second interval in the first direction, wherein a first end of the first grounding element is connected to a side of the first radiation element adjacent to the second radiation element, a second end of the first grounding element is configured to connect to a grounding surface, a first end of the second grounding element is connected to a side of the second radiation element adjacent to the first radiation element, and a second end of the second grounding element is configured to connect to the grounding surface; and a first excitation element comprising a first feeding structure and a first extension stub that are arranged at a third interval in the first direction, wherein the first feeding structure comprises a first feed-in part and a first feeding part, the first feed-in part is connected to a side of the first feeding part facing the grounding surface, the first feed-in part is located in the first sub-gap and is configured to connect to a feed source, a first part of the first feeding part is located in the first gap, a second part of the first feeding part is located in the second sub-gap, the first extension stub is located in the first sub-gap, the first extension stub comprises a first grounding part close to the first feed-in part, and the first grounding part is configured to connect to the grounding surface, and a transmitter or receiver chip configured to send an electromagnetic wave signal to the broadside antenna or receive an external electromagnetic wave signal received by the broadside antenna.

19. The communication device according to claim 18, wherein an antenna aperture of the broadside antenna faces the housing, and the broadside antenna is configured to transmit the electromagnetic wave signal through the housing or receive the external electromagnetic wave signal through the housing.

20. The communication device according to claim 18, further comprising a display on the housing, wherein an antenna aperture of the broadside antenna faces the display, and the broadside antenna is configured to transmit the electromagnetic wave signal through the display or receive the external electromagnetic wave signal through the display.

* * * * *